US012657491B2

(12) United States Patent
Juola et al.

(10) Patent No.: US 12,657,491 B2
(45) Date of Patent: Jun. 16, 2026

(54) TREND OR PATTERN TRIGGER DEVICE

(71) Applicant: Duquesne University of the Holy Spirit, Pittsburgh, PA (US)

(72) Inventors: Patrick Juola, Pittsburgh, PA (US); Patrick Brennan, Munhall, PA (US)

(73) Assignee: Duquesne University of the Holy Spirit, Pittsburgh, PA (US)

( * ) Notice: Subject to any disclaimer, the term of this patent is extended or adjusted under 35 U.S.C. 154(b) by 529 days.

(21) Appl. No.: 15/444,766

(22) Filed: Feb. 28, 2017

(65) Prior Publication Data

US 2018/0174063 A1 Jun. 21, 2018

Related U.S. Application Data

(63) Continuation of application No. 13/696,100, filed as application No. PCT/US2011/000798 on May 6, 2011, now abandoned.

(60) Provisional application No. 61/395,085, filed on May 7, 2010.

(51) Int. Cl.

| | |
|---|---|
| ***G06N 5/047*** | (2023.01) |
| ***G06N 5/04*** | (2023.01) |
| ***G06Q 10/04*** | (2023.01) |
| ***G06Q 40/04*** | (2012.01) |

(52) U.S. Cl.

CPC ............... *G06N 5/047* (2013.01); *G06N 5/04* (2013.01); *G06Q 10/04* (2013.01); *G06Q 40/04* (2013.01)

(58) Field of Classification Search

None

See application file for complete search history.

(56) References Cited

PUBLICATIONS

Papadimitriou, et al., Streaming Pattern Discovery in Multiple Time-Series, Proceedings of the 31st VLDB Conference, (2005) pp. 1-12 (Year: 2005).*

Hudson, Donna L., and Maurice E. Cohen. "Temporal trend analysis in personal health records." 2008 30th Annual International Conference of the IEEE Engineering in Medicine and Biology Society. IEEE, 2008. https://ieeexplore.ieee.org/stamp/stamp.jsp?tp=&arnumber=4650039 (Year: 2008).*

Marsland, F., Machine Learning: an Algorithmic Perspective, Chapman & Hall, Second edition, CRC Press, 2014, pp. 30-31.

Richert, W. & Coelho, L. P., Building Machine Learning Systems with Python, Second edition, Packt Publishing, 2013, pp. 118-127.

* cited by examiner

*Primary Examiner* — Michael H Hoang

(74) *Attorney, Agent, or Firm* — Barbara E. Johnson, Esq.

(57) ABSTRACT

The present invention implements, in a trend or pattern trigger device or system, the generation of hypotheses automatically while considering any collection of data by automatically assessing with templates or charts the presence of patterns in the data without a priori postulation of what the pattern might be. The trend or pattern examination templates or charts contain quantifiable thresholds for data or change in data so that trends or patterns in data can be discerned inductively and automatically without preconceived notions of what or where the patterns or trends might be.

5 Claims, No Drawings

TREND OR PATTERN TRIGGER DEVICE

BACKGROUND OF THE INVENTION

Field of the Invention

A novel computing approach for non-systematic hypothesis generation forms the basis of a trend or pattern analyzer embodied in a device or system that typically creates an automatic triggering event, such as an alarm, telephone call, electronic transaction, etc.

Description of Related Art

Hypothesis generators of various kinds are known in the art-indeed, hypothesis generation is the very basis of the scientific method. Prior art hypothesis generation has inevitably been rational or at least systematic, so that a plausible potential connection between an envisionable trend and a possible outcome of that trend is first postulated and the postulation is tested. As a single illustrative example of prior art techniques, a financial professional may realize that, based on initial principles, a particular type of stock should move in a particular way. He or she then traditionally tested the idea based on empirical records (or perhaps by investing a small amount of money) to see whether the theory panned out. In other words, there has typically been a traditional path from a plausible or reasonable idea to a reasonable, tested idea which finally leads, when verifiable, to a useful and validated idea for (in this example) stock market investing. This same prior art path has traditionally played out in an unlimited number of fields in which trends are important, thus by definition including without limitation any dynamic system such as weather prediction, celestial dynamics, voter registration and election outcomes, economic forecasting including stock price changes and corporate profitability prognostics, and possibly most importantly medical diagnostics and prognostics based on patient data sets and their dynamic trends.

SUMMARY OF THE INVENTION

The present invention implements, in a trend or pattern trigger device or system, hypothesis generation while removing the heretofore unappreciated "you only ever find what you are looking for" fallacy of prior art hypothesis generation paths. The invention accomplishes this result by automating hypothesis generation with templates or charts to allow—and typically to require—consideration of trends or patterns that might or might not otherwise rationally or plausibly occur to an investigator to consider. The removal of the "you only ever find what you are looking for" fallacy is specifically accomplished by the use of trend or pattern examination templates or charts that register the presence, absence or value of nominal data and/or contain quantifiable thresholds for data or change in data without a priori specific postulation as to which data, thresholds, trends or patterns will prove important. In this way, computational analysis of data sets analyzed parameter thresholds yields trend or pattern analysis results independent of anyone's being able to, or having had to, postulate a potentially significant trend—because the computational analysis not only identifies the trend or pattern but likewise identifies which parameters or indicia are actually important. The invention is not just a computational method, however—the invention is a trend or pattern trigger device or system that takes an analytical approach applied to any given data set which then, upon identification of one or more trends, also reacts to real-world occurrence of events matching those trends by generating a further event, such as an alarm, telephone call or other concrete transaction. The implementation of this novel approach may occur in a wide variety of fields, described more particularly in the ensuing description.

DETAILED DESCRIPTION OF THE INVENTION

The present invention is in part a hypothesis generator in which templates or charts provide the thresholds for various indicia or parameters for analytical software and computational analysis to identify trends in data sets representing dynamic systems. Apart from the above general description of the inventive approach, the following initial examples is illustrative. From a financial perspective, one can use notation like Parsons codes or randomly generated charts to probe whether "stocks whose immediate past history looks like THIS (<insert chart>) will perform better/worse than average or better/worse than stocks that look like THAT (<insert chart>)." It is also possible to use financial data to perform fundamental analysis: "stocks whose value of INDICATOR is between THRESHOLD and THRESHOLD will perform better than average," and any term in ALL CAPITALS can be filled in from a list of standard and not-so-standard financial measurements, or even randomly generated expressions or derived quantities, such as "market capitalization divided by number of employees". The standard and not-so-standard financial measurements may or may not eliminate the seemingly ridiculous and may or may not include empirical or derived terms such as stock price divided by number of employees; sales volume divided by number of doors in factory; change in sales price divided by number of active web pages currently being maintained by the company; and even more far reaching parameters such as sales volume divided by, say, average employee age. The point of the invention is to make sure not to presuppose what the important data and thresholds are, but to investigate a wide variety of data trends or patterns in dynamic or static systems to identify, via templates and a broad if not shot-gun investigation, those trends or patterns that are statistically significant as to one or more outcomes.

At this writing, the inventors have identified approximately 3600 dynamic financial data trends that are all indicators of "buy" or "sell" for the stocks represented in the data sets. Some of these patterns (by no means the majority) are fifteen day patterns that occurred only 13 times in the particular data set. The patterns were tracked by "Parsons code" tracking, but any objective tracking system may be used. Parsons code is a tracking approach originally developed for music which allows for identification of pitch with indicators such as "up a little;" "up a lot;" "down a little;" "down a lot;" "neutral change" and so forth. More detail regarding Parsons code appears in the next paragraph. These particular fifteen day patterns of stock prices—whether up or down a little or a lot or not at all for fifteen consecutive days in the pattern identified—were strong "buy" or "sell" trend signals. However, each and every one of the approximately 3600 trends identified in the software and data set employed by the inventors—out of thousands more possible combinations—was a trend indicating a "buy" or "sell," and thus in the context of a system or device constituted a "buy" or "sell" trigger. In other words, embodied in the system or device of the present invention, the identified trend triggers an event—an alarm, an automatic sale via electronic communication, or some other real world transformational event.

The Parsons code was technically invented for music, but can be applied to any sequence that rises and falls (like stock prices, blood glucose levels, asteroid acceleration, crop growth cycles, human IQ hour by hour throughout a single day, and limitless other examples) at discrete intervals (like musical note value lengths, or hours or days or weeks, without limitation). Each datum is either the same as the one before it (r), is higher (u), or is lower (d). For example, the song "Twinkle, Twinkle Little Star" in the key of A major has the following initial pitches: A, A, E, E, F#, F#, E. The starting note is ignored for coding purposes (which the inventors notate with an asterisk) followed by a repeat of the A, followed by an "up" transition to the E, and so forth. The final code for the above listed pitches is therefore "* R U R U R D." A particularly useful aspect of Parsons codes is that they are scale invariant, or in other words if one wrote the song in D major instead of A major, the assigned codes would be the same. Parsons codes can also be assigned to any time values, thus making the codes potentially time invariant also. Parsons codes are also easily computable and can be easily generated at random when desired. For example, the inventors extended the Parsons code for a second set of experiments to include a richer set of transitions. Instead of just "up and "down", the inventors allow for "up a lot" (larger than an arbitrary threshold set at 0.23%), "down a lot," and so forth. So the final set of permitted changes is for stock price trend tracking is: *—ignore; U—up; u—up "a little;" ^—up "a lot;" D—down; d—down "a little;" and v—down "a lot" ('r' is not particularly useful for stock transactions because stock prices generally don't repeat exactly). The results from the first and second experiments discussed in this paragraph appear in the attachment hereto entitled, "Exemplary Resulting Data." The data are exemplary only and identify the trend and the analysis of the significance of the trend (including standard deviation) together with the indicator of action necessary consonant with the identified trend. More particularly, the columns in the data represent, in order, Parsons code, average % change in price, # times occurring, (average change+/standard deviation), and t-test score. The action indicator in the data governs—in the trend trigger device—the ultimate action of alarm, telephone transaction or other real world event. Please bear in mind that all the data represented on the attachment represent either "buy" or "sell" triggers—the trends that did not have enough significance to prompt an event were eliminated completely (or, more precisely, were not derived in the first place) during the computational analysis that forms a part of the present invention.

The invention is by no means limited to financial trends for stock price forecasting, however, and the invention as alluded to above is not really limited to dynamic systems at all. The template-queried data sets can analyze static systems also, such as text analysis—for authorship attribution or even for biological taxonomic or other categorization. For example, by ignoring a priori hypotheses regarding the differences between how men and women speak or write, and using the present invention, the inventors discovered that, empirically, women authors use "scent adjectives" ("fragrant," "stinky," "pungent" and so forth) with greater frequency than men authors do. A posteriori this finding is not surprising, because there is existing evidence that overall women have better olefactory sensitivity and acuity than men, but up until the present invention authorship attribution software did not consider or include the parameter of extent of incidence of scent adjectives as an author sex indicator. Similarly, traditional biological wisdom held that there were two species of elephant—the Asian elephant and the African elephant. Without even plumbing the genetic code of elephants, however, but just by examining various historic textual descriptions of elephants and objectively probing the patterns in the words used to describe them, it is possible to identify three trends of descriptions matching the three actual species of elephant—Asian, African Saharan and African Forest. Armed with trends identified in the textual descriptions, a researcher may then further probe the actual species' genetics for further pattern information consistent with this inventive approach. The point about authorship attribution, biological taxonomic research and other examples in this category is that they do not need to involve change over time. In the case of a static system, therefore, what would be a trend in a dynamic system is a pattern in a static system, with various indications' or parameters' being considered for pattern without the consideration of a time lapse element. Throughout this text, any reference to "trend" may be understood to refer to a pattern in a static system. Trend analysis of dynamic systems virtually always if not always includes a time lapse analysis, by contrast.

As used herein, a template or chart is a collection of one or more data field definitions in which a datum from a database is defined as to registration (presence or absence) of nominal data and/or as to threshold quantity or rate of change of quantifiable data. The template or chart is therefore useful to probe and analyze data in the database as to the presence or absence of data, various threshold quantities or rates of change (or derived quantities or rates of change) of data, and optimally there are more rather than fewer registration or threshold values in the template or chart—to reduce presumption error by having defined too few data or threshold values defined. The choice of fewer and then more threshold values is apparent in the stock price example described above and in the two sets of results shown in the accompanying attachment.

As a single non-limiting example of medical application of the present trend trigger device, the template for heart attack prediction in women over age 50, say, could include any or all of the parameters or thresholds of average blood glucose level, blood glucose level 30 minutes postprandial, average resting pulse, average blood pressure, average blood pressure on rising, length of typical work day in hours, average hours slept, genetic racial makeup, age at prima gravidae and so on. Indeed, the template parameters in this or any other example will often be dictated by the available data in the dataset—patient data that does not include length of a typical work day in hours cannot be probed for trends in which work day length is significant. However, and critically, the invention suggests that all available data be analyzed for trends rather than deciding, before analysis, which data should be considered. In the instant example, then, a patient monitor in a hospital that is cued by the software and analysis of the present invention will monitor the patient and, when the patient's indicator data patterns match a trend identified as critical by the software and device, an alarm will sound to indicate that the patient is at imminent risk of heart attack. Presumably the "alarm" is not styled to be upsetting enough to precipitate heart attack based on adrenaline surge or reaction to the alarm—instead, the "alarm" is the professional informing event or notification that motivates appropriate medical intervention, such as without limitation administration of an appropriate medicine, environmental change and/or treatment designed to intervene and to remove the patient's vital and other signs from matching the alerted trend.

The actual software or algorithm(s) used to probe and track trends or patterns are not critical in the practice of the invention. Any codes, such as the above-described Parsons code, that provide trend or pattern tracking may be used in the software portion of the present invention, and Parsons code is particularly suitable for use for actual trends that include a time element. Patterns, as opposed by trends, can be searched and matched using other software known in the art. The key to the invention is in trending or patterning a wide variety of indicia or parameters, ideally at multiple thresholds, with minimized or no human decision in advance which indicia, parameters or thresholds or even data types are important. Generally speaking, the trend or pattern trigger system or device considers and analyzes at least three indicia or parameters and more preferably at least four indicia or parameters (empiric events or derived parameters, such as stock sales price divided by number of employees). More preferably, for trend triggers the indicia or parameters are tracked and analyzed over at least four and most preferably at least five consecutive repeating time units, such as hours or days. This is not to say that an identified trend will always occur with three or more parameters or over four or more repeating time units, but the present invention will preferably consider such parameters and time units in identifying the triggering trend—which trend may be more simple than three parameters or four time units or may be much more complex.

It is also possible to implement the above analysis and trend or pattern triggering with the partial participation of a human intellect at any point throughout the process. The point of the analytical trend identification and triggering is to remove at least some of the a priori human prejudice from the trend identification, if not all of it.

Finally, it should be borne in mind that the present invention has application to virtually any database. Typically in the prior art, databases are queried with the desired output in mind. In the present invention the software and computational analysis look for trends or patterns in all available data as tied to an outcome (stock price increase or decrease, imminent onset of heart attack, etc.) By extension, then, it will always be possible to design a database as to which the computational analysis of the invention is deployed. In keeping with the idea of the invention, database design of this type is best conducted in an inductive way—including all available data types or fields rather than trying to rationalize which data fields will prove important. This implementation requires a change of mindset from traditional database design. Heretofore, data was included in a database in fields already determined to be important and relevant. In the present invention, however, virtually always any database should be compiled to include all available data or derived data—for example not just the batting histories and ages of the players on the Little League team, say, but also each player's hair color, shoe size, grade point average, runs batted in divided by years on the League, and whatever else in the way of data and thresholds is available. In other words, in order to implement the present invention all potentially available data is analyzed for trends or patterns, not just the data a priori believed to be important. At a macro level, the software and computational analysis of the present invention becomes a hypothesis generator in a way that substitutes for human hypothesis generation. At a practical, real world level the invention institutes pattern or trend identification without limiting human prejudice and deploys such pattern or trend identification to match real world patterns or trends to prompt action in the event of a pattern or trend match. Such a trend or pattern trigger device or system can thus intelligently govern buy or sell orders in an investment portfolio, predict and precipitate the averting of asteroid strikes, or prevent heart attacks or strokes—to name just a few.

Exemplary Resulting Data

*DDDDDDDDDUDUU 0.580928% (2) (0.005809+/−0.001645) 3.532051!

*DDDDDDDUDUUDU −1.249766% (2) (−0.012498+/−0.004544) −2.750236!

*DDDUUUUDDDDDD 2.339151% (3) (0.023392+/−0.006189) 3.779422!

*DDUUUUUDUDDDD −1.012965% (2) (−0.010130+/−0.001773) −5.712390!

*DUDDDDUDUDUDD −1.042046% (2) (−0.010420+/−0.000229) −45.599210!

*UDDDDDDUUUDUU 0.676106% (2) (0.006761+/−0.001111) 6.086344!

*UDDUDUUDDUDUD −1.075682% (3) (−0.010757+/−0.003985) −2.699416!

*UDUUDDUUDUUUD −0.829228% (13) (−0.008292+/−0.003258) −2.545589!

*UUUDDDUDDDDDD 1.788045% (3) (0.017880+/−0.001927) 9.279175!

and the more complex version

*^^^^Ud −2.129542% (2) (−0.021295+/−0.005188) −4.104903!

*U^UUdD^dvuUdD 3.228126% (2) (0.032281+/−0.000000) inf!

*uuvDUU^v −0.811544% (3) (−0.008115+/−0.002257) −3.594943!

*DdDUuU*^*vv 6.150688% (2) (0.061507+/−0.004585) 13.413372!

*DdduvdvDD 1.564246% (2) (0.015642+/−0.000000) inf!

*UduUuvvvU −0.409838% (2) (−0.004098+/−0.000000) −inf!

*uv^uvDDD^ −1.594968% (3) (−0.015950+/−0.006892) −2.314108!

*vv*D^UUvDddd −2.277629% (2) (−0.022776+/−0.000000) −inf!

*Uvv*^DDuuU 2.501327% (2) (0.025013+/−0.000000) inf!

*UvvdduUDvud 2.850777% (2) (0.028508+/−0.000000) inf!

*^Ud^u^*U 2.163893% (2) (0.021639+/−0.002359) 9.174693!

*^^UuD*v^U 3.683082% (3) (0.036831+/−0.007558) 4.873194!

*^D^*^dDUdUD* 1.129646% (2) (0.011296+/−0.001599) 7.066081!

*^UvDvvUu −5.572418% (2) (−0.055724+/−0.012893) −4.321968!

*^v^dDUvDdv −3.574746% (2) (−0.035747+/−0.000000) −inf!

*UDUU^dvUD −2.365054% (3) (−0.023651+/−0.007865) −3.006926!

*Ud^uDDDDUDDuD 0.214284% (2) (0.002143+/−0.000000) inf!

*uuDvUud*udd 2.234371% (2) (0.022344+/−0.003578) 6.244253!

*DUUuvdu^UU 0.363948% (3) (0.003639+/−0.001223) 2.975516!

*dUd^U^DuuD 1.220289% (2) (0.012203+/−0.002584) 4.722238!

*^UvDd^ddU 1.176251% (2) (0.011763+/−0.002044) 5.753518!

*d^vvu^−2.393024% (2) (−0.023930+/−0.005207) −4.595372!

*U*U^uvv^u* −0.929436% (2) (−0.009294+/−0.003072) −3.025584!

*DudU^dU^u 1.273916% (2) (0.012739+/−0.001016) 12.538801!

*Uu^d^U^DDU^D^ −14.484040% (2) (−0.144840+/−0.000000) −inf!

*Uuv^^DdUDd −3.092789% (2) (−0.030928+/−0.000000) −inf!

*duddd*^UUv −0.718076% (2) (−0.007181+/−0.000686) −10.461654!

*DDUdUDUU*Udu^ 3.740645% (2) (0.037406+/−0.008895) 4.205127!

*uu^^DD^*^ −0.849009% (2) (−0.008490+/−0.002696) −3.149208!

*vuDudU^UuU −2.837238% (2) (−0.028372+/−0.010318) −2.749818!

*^DUd^ddu −1.997914% (6) (−0.019979+/−0.007947) −2.513968!

*uDd^v^ −4.719481% (2) (−0.047195+/−0.004976) −9.483893!

*Dddd^UDU^ 4.900698% (2) (0.049007+/−0.004864) 10.075914!

*vUU^*DDUUUu −2.412074% (2) (−0.024121+/−0.004928) −4.894262!

*DD^d^Ud^U −0.893707% (2) (−0.008937+/−0.001111) −8.045953!

*^u^vdv 3.047411% (3) (0.030474+/−0.003361) 9.067386!

*Dvvd^Dv*U 2.547215% (3) (0.025472+/−0.010243) 2.486871!

*UuU*DvuU^D 0.341163% (2) (0.003412+/−0.000943) 3.618484!

*DUU^vduv −0.596993% (2) (−0.005970+/−0.002116) −2.821043!

*^dUv*dudDv 2.525066% (2) (0.025251+/−0.000000) inf!

*DDuduUv^ud 0.726465% (2) (0.007265+/−0.000140) 51.798494!

*dD^^DvUv 3.394098% (2) (0.033941+/−0.005533) 6.134744!

*uuvu^Ddud* −1.228816% (3) (−0.012288+/−0.004688) −2.620942!

*^uvDDUddUD −2.987777% (2) (−0.029878+/−0.000000) −inf!

*v^DudUdv −4.111112% (2) (−0.041111+/−0.011526) −3.566870!

*DD^UvvDuu 2.773372% (2) (0.027734+/−0.010292) 2.694817!

*dUUdvdD^D 1.743936% (2) (0.017439+/−0.000776) 22.487187!

*Uvv*UUdvDU*u^ −2.781938% (2) (−0.027819+/−0.004506) −6.173343!

*Udu^Ddu 1.486769% (2) (0.014868+/−0.005163) 2.879628!

*vud^*DduD 1.565329% (4) (0.015653+/−0.002584) 6.057408!

*u^U^^^ −1.074696% (2) (−0.010747+/−0.001216) −8.834334!

*u^UDvU^UD 0.948752% (2) (0.009488+/−0.001742) 5.447607!

*uuvu^ddv −2.547548% (3) (−0.025475+/−0.003454) −7.376562!

*v^uUDu^Dvd 4.537906% (2) (0.045379+/−0.005662) 8.014532!

*uUd^v*uUudU −0.255534% (2) (−0.002555+/−0.000000) −inf!

*U*u^^uUu^ −1.005478% (2) (−0.010055+/−0.000000) −inf!

*^UUUU*dUvuD −0.824843% (2) (−0.008248+/−0.000000) −inf!

*^u^UvUvU 4.042723% (3) (0.040427+/−0.002898) 13.949946!

*Dv^ud^d*v −1.718524% (2) (−0.017185+/−0.002570) −6.687422!

*DDDDvDvdv −1.303183% (2) (−0.013032+/−0.003505) −3.717805!

*vUvUDd*D^ 1.460443% (3) (0.014604+/−0.004201) 3.476637!

*v^^^Du −2.815324% (5) (−0.028153+/−0.011072) −2.542746!

*D^D*^vD*UUudU −3.656852% (2) (−0.036569+/−0.008134) −4.495751!

*ddUduvuuddv 5.733550% (2) (0.057335+/−0.000000) inf!

*^DduUuvUD −2.807967% (3) (−0.028080+/−0.010807) −2.598171!

*U*DdDDu*vv^ 2.275771% (3) (0.022758+/−0.008895) 2.558493!

*D^dv^U^u −2.955524% (2) (−0.029555+/−0.007264) −4.068793!

*UduDvdU^UU −1.794906% (2) (−0.017949+/−0.002620) −6.849543!

*vud^^Ddu −4.513458% (2) (−0.045135+/−0.000000) −inf!

*UUd^D^uDvD −2.824520% (2) (−0.028245+/−0.009844) −2.869266!

*U^vUDD^^ −4.335396% (4) (−0.043354+/−0.014533) −2.983065!

*Du^udUudv 2.777060% (2) (0.027771+/−0.003134) 8.861745!

*vvvvUU*UU 4.204719% (2) (0.042047+/−0.010251) 4.101723!

*ud*Ddu^^d −1.479936% (3) (−0.014799+/−0.002052) −7.212642!

*v*DddDUdU^^u −0.510302% (2) (−0.005103+/−0.000118) −43.099451!

*vvuvD^DUU* 3.473973% (2) (0.034740+/−0.001063) 32.689785!

*DUvu*vU^U −5.192828% (2) (−0.051928+/−0.008514) −6.099382!

*^DdDDd^^U −1.560692% (3) (−0.015607+/−0.001690) −9.232356!

*UvDUddDUvv 2.381321% (4) (0.023813+/−0.008554) 2.783863!

*uv^UDvU*^U −1.357331% (2) (−0.013573+/−0.001587) −8.550927!

*Dvvv^v^Udd −4.661885% (2) (−0.046619+/−0.000000) −inf!

*du*duvd*DdDDD 1.881932% (2) (0.018819+/−0.005660) 3.324998!

*^DuduuvDd 2.088355% (2) (0.020884+/−0.000000) inf!

*^DD*^^UDdD −1.307631% (2) (−0.013076+/−0.001492) −8.762501!

*uDdU^vuu −2.640933% (3) (−0.026409+/−0.002029) −13.012769!

*uvduDvudu −1.853300% (2) (−0.018533+/−0.006748) −2.746469!

*v^^D^U*uD*D 4.632853% (5) (0.046329+/−0.010107) 4.583623!

*UUD^vvUu −0.940974% (4) (−0.009410+/−0.002069) −4.547291!

*DdDvd^^^ −1.396395% (3) (−0.013964+/−0.004536) −3.078358!

*vDD^dUu^ 1.895880% (2) (0.018959+/−0.007170) 2.644219!
*vvDDv*du −0.585684% (2) (−0.005857+/−0.001494) −3.920749!
*Uv^DDv*du −2.658856% (2) (−0.026589+/−0.002583) −10.292497!
*UuvUUUDvU −0.876736% (2) (−0.008767+/−0.002750) −3.187902!
*uduvDU^DDU −0.674877% (2) (−0.006749+/−0.001119) −6.032627!
*dd^vD*^v 1.396797% (2) (0.013968+/−0.003442) 4.058623!
*U*D^d^*v^Dv 10.422117% (7) (0.104221+/−0.042774) 2.436569!
*UU^^DDddv* −0.862660% (2) (−0.008627+/−0.000455) −18.944873!
*dD^UvUUU^*v −4.267614% (2) (−0.042676+/−0.013098) −3.258160!
*U^vvU*UUu**^ −4.746315% (2) (−0.047463+/−0.005065) −9.370674!
*Uudvd^duUU^ −1.811572% (2) (−0.018116+/−0.001745) −10.383581!
*d^uU*v^Uu** −1.616422% (2) (−0.016164+/−0.000000) −inf!
*uvvu^U*uD 5.659500% (2) (0.056595+/−0.000000) inf!
*DUdDduuUD^ −1.969190% (3) (−0.019692+/−0.004442) −4.433426!
*UDddd^*dUdUD 1.520907% (2) (0.015209+/−0.002883) 5.274967!
**^uu^UUDu −0.610834% (2) (−0.006108+/−0.000350) −17.448836!
*Uuv*vDUuvu −0.651470% (2) (−0.006515+/−0.000000) −inf!
*Ddd^UUDduuDUd −0.598323% (2) (−0.005983+/−0.000000) −inf!
*U*d^UdUDuDDD −3.395185% (2) (−0.033952+/−0.000000) −inf!
*uuvdvvdd 3.126190% (2) (0.031262+/−0.000000) inf!
*^^v^uUDUd** −3.297958% (3) (−0.032980+/−0.013055) −2.526282!
*UDddu^vUu 3.604067% (3) (0.036041+/−0.013394) 2.690888!
*ddDUUuuuv 1.536054% (2) (0.015361+/−0.000265) 57.863428!
*UUUUDvvddU −5.336622% (2) (−0.053366+/−0.000000) −inf!
*uuUuDv^dU*d −0.412042% (2) (−0.004120+/−0.000000) −inf!
*v^dD*vud 1.719190% (2) (0.017192+/−0.006864) 2.504608!
*DD^vvuuuD 1.793177% (2) (0.017932+/−0.003787) 4.735627!
*Dd^DUDuvDU −1.232321% (3) (−0.012323+/−0.002635) −4.676796!
*uvDu^v^vUU −1.941362% (2) (−0.019414+/−0.000000) −inf!
*DdvuD^dUu 1.868691% (2) (0.018687+/−0.000000) inf!
*^*U*d^DUvU^ 4.254911% (2) (0.042549+/−0.004626) 9.198597!
*vDUDUv^vUD 3.841063% (2) (0.038411+/−0.000000) inf!
*DDdUu^U^UUdU 1.464033% (2) (0.014640+/−0.000000) inf!
*DUvdudduuD −0.680188% (2) (−0.006802+/−0.002725) −2.496488!
*DUd^UuddUUuU −1.026772% (2) (−0.010268+/−0.002448) −4.194514!
**udUUuvU^dd 1.440348% (3) (0.014403+/−0.004454) 3.234122!
*^UDuddDUDdD 2.518132% (3) (0.025181+/−0.001482) 16.996831!
*vDd^vDDd −6.482636% (2) (−0.064826+/−0.000000) −inf!
*uUUduvDv 3.206386% (2) (0.032064+/−0.010548) 3.039816!
*vvu^UvDDv 1.529500% (2) (0.015295+/−0.000000) inf!
*^u*dvd*vDU −2.167402% (3) (−0.021674+/−0.002425) −8.937988!
*^^dDd^dv 8.415809% (2) (0.084158+/−0.028145) 2.990146!
*uDvv^vuv 2.854152% (2) (0.028542+/−0.001153) 24.760399!
*vD^D^DvdUD −2.012458% (2) (−0.020125+/−0.000000) −inf!
*vuv^vU*d 3.278712% (4) (0.032787+/−0.012058) 2.719130!
*dvuuvD*v −4.292474% (2) (−0.042925+/−0.012564) −3.416421!
*D^u^^D*vdv 3.510379% (2) (0.035104+/−0.012428) 2.824559!
*vUvduvuU −5.879889% (3) (−0.058799+/−0.006580) −8.936021!
*ddD^vUDDDD −0.088685% (2) (−0.000887+/−0.000000) −inf!
*^D^d^dDU −2.467634% (2) (−0.024676+/−0.004798) −5.143316!
*DdDvDvdvd 1.747408% (2) (0.017474+/−0.006886) 2.537666!
*UdU*uDu^Uv −2.063941% (3) (−0.020639+/−0.003868) −5.336177!
*vDd^uv*v 1.476326% (2) (0.014763+/−0.004689) 3.148659!
*dUDuvD*^^ −2.535311% (2) (−0.025353+/−0.008726) −2.905334!
*uUDUvvUDDv^ −5.626658% (2) (−0.056267+/−0.009947) −5.656462!
*Dvd^v*^u −4.362662% (2) (−0.043627+/−0.008424) −5.178784!
*DuvdudddDu 1.252730% (2) (0.012527+/−0.002754) 4.548410!
*^UUduuvd 1.598828% (2) (0.015988+/−0.005660) 2.824919!
*D*^dUDU^dv* 2.073749% (2) (0.020737+/−0.000820) 25.291944!
*UU^UUDu*vuU 0.086470% (2) (0.000865+/−0.000000) inf!
*^UduDuu^*v −2.862388% (2) (−0.028624+/−0.000000) −inf!
*uuuvuUuduv 1.062614% (2) (0.010626+/−0.000000) inf!
*udUvD^DUDvD 4.648865% (2) (0.046489+/−0.000000) inf!
*uuDUvu*^vD 3.000043% (2) (0.030000+/−0.005838) 5.138812!
*u^Uv*UuvD 1.853211% (2) (0.018532+/−0.007395) 2.505906!
*UUvuvd*Uud 4.064076% (2) (0.040641+/−0.001510) 26.909004!
*^UUvu^u^ −2.195948% (2) (−0.021959+/−0.009445) −2.325003!

*vDdD*UDDDv^ −4.004722% (3) (−0.040047+/−0.010821) −3.700791!
*vu^uudUuu −2.326706% (2) (−0.023267+/−0.006909) −3.367740!
*^duuduvdU 0.811412% (2) (0.008114+/−0.003264) 2.486036!
*vd*Dv^DDU^ 1.819245% (2) (0.018192+/−0.004385) 4.148485!
*d^^^u^ −3.366419% (2) (−0.033664+/−0.003740) −9.001493!
*d^DduU*uDvd 1.098606% (2) (0.010986+/−0.000000) inf!
*uDUUvDuddDU −6.858755% (2) (−0.068588+/−0.000000) −inf!
*ud^^uuDU 0.890191% (5) (0.008902+/−0.003106) 2.866380!
*uvUdDUu*dv 0.673049% (2) (0.006730+/−0.002906) 2.316179!
*^Uudv^UdU −2.757028% (2) (−0.027570+/−0.001809) −15.236562!
*uu^uv*d^ −0.722975% (2) (−0.007230+/−0.001147) −6.301750!
*d^uDD*Dvv 3.478186% (2) (0.034782+/−0.011312) 3.074730!
*^dv^d*^U −3.597942% (3) (−0.035979+/−0.005629) −6.391938!
*D^uUvvvuD^ 1.366285% (2) (0.013663+/−0.005489) 2.489299!
*ud*dDvUvUdU 1.681396% (2) (0.016814+/−0.000170) 98.969683!
*v^Uu^Dd*U*U 2.447183% (2) (0.024472+/−0.000263) 93.162534!
*dv*^vuuvD −3.996225% (2) (−0.039962+/−0.000000) −inf!
*u^duvuddu 0.559041% (2) (0.005590+/−0.001810) 3.088242!
**DDuvvUvDd 7.008097% (2) (0.070081+/−0.030019) 2.334562!
*uddUDuUUdDv −0.321100% (2) (−0.003211+/−0.000000) −inf!
*^^UudDvD −2.903820% (2) (−0.029038+/−0.000000) −inf!
*vUDv^v^uu −1.950391% (3) (−0.019504+/−0.008130) −2.399131!
*^uvdU^*UD^U* −1.090911% (2) (−0.010909+/−0.000000) −inf!
*DUvduUvuv 1.623109% (2) (0.016231+/−0.000000) inf!
*U^UuDU^D*^ −3.022952% (2) (−0.030230+/−0.006261) −4.828354!
*Uvd*udd^d 4.391744% (2) (0.043917+/−0.000000) inf!
*^^DdDv*^*^ −1.658291% (2) (−0.016583+/−0.000000) −inf!
*Uv^^u*U^U 1.859133% (2) (0.018591+/−0.005275) 3.524299!
*vDdDuvduu −3.632594% (2) (−0.036326+/−0.000000) −inf!
*vvD*UUD^DUu*u −4.038208% (2) (−0.040382+/−0.007078) −5.705406!
*UUudDvvvD^U 0.952887% (2) (0.009529+/−0.000000) inf!
*vDUvvdUDD 2.151486% (2) (0.021515+/−0.005749) 3.742348!
*uD^v*DU^^U 4.626947% (2) (0.046269+/−0.000000) inf!
*UUv^DDvUDuD 1.676949% (2) (0.016769+/−0.006038) 2.777330!
*u*UD^vUU*DDD 3.057350% (3) (0.030573+/−0.008933) 3.422455!
*d^d^v*vUu −1.072299% (2) (−0.010723+/−0.000000) −inf!
*dudUUdd**dUuv −0.969971% (2) (−0.009700+/−0.002787) −3.479940!
*^DD^vUuUvvU* −1.028810% (2) (−0.010288+/−0.000000) −inf!
*udDUvUDdD^* −2.524660% (2) (−0.025247+/−0.000000) −inf!
*u^^udUUDuDu −0.270948% (2) (−0.002709+/−0.000000) −inf!
*ddUvUDU^Du −1.413133% (2) (−0.014131+/−0.000058) −242.240903!
*^^vUDUDvUDD 12.660883% (2) (0.126609+/−0.007589) 16.682871!
*uu^dUvuD 0.433089% (2) (0.004331+/−0.001810) 2.392906!
*ddduD^^dD 4.282178% (2) (0.042822+/−0.008092) 5.291849!
*Uvu^dd*vu −2.335338% (2) (−0.023353+/−0.009172) −2.546038!
*vDUD^u^U −5.662806% (2) (−0.056628+/−0.004745) −11.933092!
*v*u^UD^^*d 1.626823% (2) (0.016268+/−0.003530) 4.608874!
*D^^D*D*dD^Dd 0.986972% (2) (0.009870+/−0.000749) 13.173601!
*^v^uUudU −0.749559% (2) (−0.007496+/−0.000000) −inf!
*^U*vvvdv 13.038371% (2) (0.130384+/−0.007155) 18.223957!
*DUuDvu^dvu 1.809684% (2) (0.018097+/−0.005197) 3.482077!
*u^^^vd −0.399682% (2) (−0.003997+/−0.000000) −inf!
*D*dDuu^dUudud 1.872702% (2) (0.018727+/−0.005216) 3.590266!
*u^d^vdDd* −1.530012% (2) (−0.015300+/−0.005351) −2.859222!
*Uvudud^U −1.580219% (2) (−0.015802+/−0.005322) −2.969431!
*u^^d*vdd −1.879521% (2) (−0.018795+/−0.007311) −2.570643!
*u*uuvv^UuU^d −3.331566% (2) (−0.033316+/−0.000000) −inf!
*vvDud*UUv* 3.218129% (4) (0.032181+/−0.011926) 2.698473!
*^v^uuv^D 3.505594% (2) (0.035056+/−0.008274) 4.237075!
*dvuUvDud −2.779337% (2) (−0.027793+/−0.009894) −2.809071!
*duv^dv 0.208957% (2) (0.002090+/−0.000370) 5.642134!
*UDuUvdd*vUD 0.249122% (2) (0.002491+/−0.000708) 3.517452!
*UuUuU^*vuD −1.646654% (2) (−0.016467+/−0.006974) −2.361077!
*U^duU^UDd^ −0.811286% (2) (−0.008113+/−0.000000) −inf!
*^udv^^ −1.732582% (2) (−0.017326+/−0.000790) −21.933999!
*vU^UU*dvv^ −0.464398% (2) (−0.004644+/−0.001607) −2.889578!
*U^DduuUdvD 0.310556% (2) (0.003106+/−0.000000) inf!
**^ddDd*UUdvv 3.508202% (2) (0.035082+/−0.009683) 3.623140!

*dD^Du*uudv 4.353597% (2) (0.043536+/−0.010317) 4.219634!
*U^UvvUu^ −2.003952% (2) (−0.020040+/−0.000000) −inf!
*Uu^*vuu*vu −1.127389% (2) (−0.011274+/−0.000000) −inf!
*Uuv^vdUD 0.753901% (2) (0.007539+/−0.000000) inf!
*v*Uu^D^U^DvuU −3.555044% (2) (−0.035550+/−0.000000) −inf!
*d^*DDu^^^^ −2.736323% (2) (−0.027363+/−0.000000) −inf!
*UdUvuddddu^u −2.476193% (2) (−0.024762+/−0.000000) −inf!
*DuD^^dUUD^ 2.413153% (2) (0.024132+/−0.000000) inf!
*uDDDvuu^ −1.556928% (7) (−0.015569+/−0.006365) −2.446103!
*ULTUUUuuDv^ 0.261863% (2) (0.002619+/−0.000540) 4.853203!
*D^*^uUvDvU −6.516317% (2) (−0.065163+/−0.012215) −5.334530!
*vUuDd^*Uuu −1.207892% (2) (−0.012079+/−0.000404) −29.887845!
*uud*uDuDvuDdu −1.306748% (3) (−0.013067+/−0.005362) −2.437156!
*dU*uD^^vd* 5.006677% (2) (0.050067+/−0.000850) 58.891364!
*^^^UDv^D −2.956132% (4) (−0.029561+/−0.008496) −3.479297!
*d*uuu^uUD^ 0.266318% (2) (0.002663+/−0.000000) inf!
*dUDdU^uvDuD* −3.234105% (2) (−0.032341+/−0.006007) −5.383989!
*du*d^^u^ 0.439000% (3) (0.004390+/−0.000237) 18.543629!
*d^vvd^ 2.316300% (2) (0.023163+/−0.007226) 3.205729!
*DUu*dUUvu^v −0.200032% (2) (−0.002000+/−0.000263) −7.599526!
*vduUvv*^ −0.224011% (2) (−0.002240+/−0.000000) −inf!
*^udu^dvU*u 3.278739% (2) (0.032787+/−0.004171) 7.859975!
*U*Uuvv^Ud −1.013207% (2) (−0.010132+/−0.001887) −5.368771!
*UUvDduvv 1.144276% (2) (0.011443+/−0.000000) inf!
*Uu^uUd^d 2.730734% (2) (0.027307+/−0.005456) 5.004566!
*dU^UdUvu −2.973048% (2) (−0.029730+/−0.010916) −2.723599!
*vvUUuUUD^v 1.858567% (2) (0.018586+/−0.000000) inf!
*udUvvdUu 2.162480% (2) (0.021625+/−0.007950) 2.720154!
*^uDDDd*uduu 0.703592% (3) (0.007036+/−0.000582) 12.084245!
*vUvvDDuv −3.103320% (2) (−0.031033+/−0.000451) −68.812927!
*UUUvvD^ddu −0.450655% (2) (−0.004507+/−0.000000) −inf!
*vdddUd^^ 0.046137% (2) (0.000461+/−0.000000) inf!
*vUDUvU^uD 3.554069% (2) (0.035541+/−0.003454) 10.289476!
*UDdUDUu^ddvd −1.288536% (2) (−0.012885+/−0.000000) −inf!
*^vUUvdvvUu 4.459862% (2) (0.044599+/−0.000000) inf!
*u^vUU*uddU −2.244110% (2) (−0.022441+/−0.006350) −3.534177!
*^U^Uvdvu^^ 0.271739% (2) (0.002717+/−0.000000) inf!
*uud^UUudduUD −1.150763% (2) (−0.011508+/−0.003972) −2.897412!
*v^uvu*uU* −1.914469% (2) (−0.019145+/−0.002778) −6.890460!
*UdD^*D^^^uD −3.100921% (2) (−0.031009+/−0.011005) −2.817834!
*vvddvv 4.159041% (2) (0.041590+/−0.001027) 40.515584!
*D^DDDDu^v*U 7.064687% (2) (0.070647+/−0.014971) 4.718824!
*Udu^vDDd 2.733548% (3) (0.027335+/−0.002151) 12.707215!
*v*dvvuvv 13.705359% (3) (0.137054+/−0.015664) 8.749754!
*^DUD^d^D 4.633172% (3) (0.046332+/−0.011329) 4.089516!
*UuDD^v^Du −4.760803% (2) (−0.047608+/−0.012899) −3.690829!
*uUUDdv^v* 1.975854% (2) (0.019759+/−0.000000) inf!
*uDdDudvUu −1.041345% (3) (−0.010413+/−0.003027) −3.439989!
*DvdU^Uu*v 1.038519% (2) (0.010385+/−0.001150) 9.033004!
*UDd^UDvu −1.967872% (3) (−0.019679+/−0.005278) −3.728124!
*^^^uU^ −3.565060% (4) (−0.035651+/−0.009692) −3.678352!
**UuvDvudd^ 2.967616% (3) (0.029676+/−0.011664) 2.544282!
*DUuDUUvdv^ −1.555284% (2) (−0.015553+/−0.000008) −1870.207956!
*^ud^DDD^u 2.527087% (3) (0.025271+/−0.008271) 3.055464!
*uuvUvdvD −5.345686% (2) (−0.053457+/−0.000610) −87.648694!
*^D^U^Uud 1.173025% (4) (0.011730+/−0.002668) 4.397411!
*ddD^dDUuv −0.682854% (2) (−0.006829+/−0.000000) −inf!
*uU*vD^vuv 3.023571% (4) (0.030236+/−0.002642) 11.446249!
*Dv^^u^dd 2.171651% (2) (0.021717+/−0.008720) 2.490523!
*uu*dDd^^D −1.650736% (2) (−0.016507+/−0.006058) −2.724945!
*vdu^uud^u 0.424729% (2) (0.004247+/−0.000000) inf!
*^DuUvdvv 1.383265% (2) (0.013833+/−0.000000) inf!
*UD^uDuU^v −4.083416% (2) (−0.040834+/−0.007523) −5.427763!
*DUDdv^dv −2.077705% (2) (−0.020777+/−0.004184) −4.965931!
*D^^dDDDdd 0.998169% (2) (0.009982+/−0.002932) 3.403822!
*udDdDuuuvUU 0.307097% (2) (0.003071+/−0.000426) 7.217098!
*ududd^UDu*UUu −2.609730% (2) (−0.026097+/−0.000000) −inf!
*U^uUvUvDuDu* −5.879889% (3) (−0.058799+/−0.006580) −8.936021!
*uUDdvvDDU 7.374882% (4) (0.073749+/−0.017112) 4.309858!
*Du^^DDDuDd −1.886381% (2) (−0.018864+/−0.002677) −7.045960!

*Dd**^duv^u 0.444445% (2) (0.004444+/−0.000000) inf!
*vDDUDUdU^U −2.532188% (5) (−0.025322+/−0.006272) −4.037116!
**DU^UDvDd^uu −0.400200% (2) (−0.004002+/−0.000000) −inf!
*Du^*DddUd^ −1.735839% (2) (−0.017358+/−0.002798) −6.203451!
*UUDd^UDDd^D 1.216417% (2) (0.012164+/−0.001870) 6.504519!
*vddD*Dd^U −1.345671% (2) (−0.013457+/−0.002236) −6.018691!
*^DDdv^vud −1.956793% (2) (−0.019568+/−0.000000) −inf!
*DvuU^^vd −0.399682% (2) (−0.003997+/−0.000000) −inf!
*^U^Uu^Ud −3.342415% (2) (−0.033424+/−0.009102) −3.672209!
*uuvuudUv −1.578197% (3) (−0.015782+/−0.003323) −4.749537!
*DDuuU^v^*d 0.903112% (2) (0.009031+/−0.001277) 7.073965!
*UUd^vUdd −1.722269% (3) (−0.017223+/−0.003226) −5.338874!
*vDdUDU^^u 0.869892% (2) (0.008699+/−0.003103) 2.803228!
*uvD^UD*d*DvU 3.129293% (6) (0.031293+/−0.011471) 2.728076!
*^D^UuDvd 1.480176% (2) (0.014802+/−0.005860) 2.526053!
*DvdD^^uv −3.526286% (2) (−0.035263+/−0.002107) −16.733039!
*UUvDv^dU*U^U −8.726859% (2) (−0.087269+/−0.000000) −inf!
*D*duuuvUDUDv −2.606988% (2) (−0.026070+/−0.007110) −3.666684!
*DuuDdduuUu*D^ −3.014820% (2) (−0.030148+/−0.000000) −inf!
*u^DDuuDvUudU 1.321801% (2) (0.013218+/−0.002231) 5.925209!
*Dvvdvd*d 2.230517% (2) (0.022305+/−0.000054) 415.434835!
*UDDdDUv^Dd 1.017062% (2) (0.010171+/−0.000467) 21.757764!
*^udUvuu^* −5.250349% (2) (−0.052503+/−0.000000) −inf!
*vU^v^UUdDD 1.874644% (2) (0.018746+/−0.000281) 66.706521!
*UUv*vDUu^dUd 1.047805% (2) (0.010478+/−0.000000) inf!
**vdDvudDUd*d 2.707858% (2) (0.027079+/−0.004651) 5.821903!
*^^uvu^ 1.848269% (3) (0.018483+/−0.005243) 3.525449!
*U^^u^^ −3.852472% (2) (−0.038525+/−0.002466) −15.621823!
**DUDvd*UuvDU 3.437383% (2) (0.034374+/−0.013974) 2.459832!
*^*uv^UDuD 4.723311% (2) (0.047233+/−0.004996) 9.454325!
*^DDvu^Dv 3.158891% (2) (0.031589+/−0.008736) 3.616053!
*uUDudDuDDDDUv 0.990609% (2) (0.009906+/−0.003713) 2.668193!
*^vvuDD*UDU* −8.602575% (4) (−0.086026+/−0.008047) −10.690357!
*DuUUdDD^vdUd 0.884336% (2) (0.008843+/−0.000743) 11.901508!
*UuD^*d*u^*^ 4.626947% (2) (0.046269+/−0.000000) inf!
*u^UU^ud^ 1.464033% (2) (0.014640+/−0.000000) inf!
**D^dduuDuv 1.486203% (2) (0.014862+/−0.000000) inf!
*Uvd^dddu 1.689927% (2) (0.016899+/−0.005904) 2.862275!
**dvduvUvU* 1.612931% (3) (0.016129+/−0.001729) 9.331011!
*vUD^D^vu −0.174220% (2) (−0.001742+/−0.000000) −inf!
*Ddd^DD^udU −0.847493% (2) (−0.008475+/−0.002475) −3.424352!
*dvvDU*Dvv 1.893326% (2) (0.018933+/−0.001857) 10.194318!
*^vuDdUD^ 1.526894% (2) (0.015269+/−0.003147) 4.851403!
**uvU^dvDU −2.653851% (3) (−0.026539+/−0.008876) −2.989796!
*uvU*UU^^D −2.370444% (2) (−0.023704+/−0.001781) −13.310172!
*^UuUuvdD 1.931523% (3) (0.019315+/−0.007347) 2.629049!
*^^du^D^ud −3.646239% (2) (−0.036462+/−0.000000) −inf!
*v^duuuU^ −8.726859% (2) (−0.087269+/−0.000000) −inf!
*^U*^DDdvd −3.931777% (2) (−0.039318+/−0.013701) −2.869690!
*D^UduD^DUD −2.461323% (2) (−0.024613+/−0.009659) −2.548287!
*dU^v^DUuDD −0.653594% (2) (−0.006536+/−0.000000) −inf!
*UDUU^dvU^ −3.101696% (3) (−0.031017+/−0.007852) −3.950085!
*uD*v^vv^ −4.863515% (2) (−0.048635+/−0.003776) −12.880746!
*^DdDUUd^^ 0.855131% (2) (0.008551+/−0.000000) inf!
*dDU^D^v*v −0.426990% (2) (−0.004270+/−0.000000) −inf!
*^^^duD^UU 3.982298% (2) (0.039823+/−0.000000) inf!
*^Uv^v^DU −2.614254% (2) (−0.026143+/−0.001679) −15.572063!
*UvddUuUDDU −1.726941% (2) (−0.017269+/−0.000210) −82.361599!
*ddvvD^Du −1.208134% (2) (−0.012081+/−0.002237) −5.400569!
**DuD*^UddDv 1.375248% (2) (0.013752+/−0.003948) 3.483477!
**UuDddv^Uu 0.835478% (2) (0.008355+/−0.003086) 2.707570!
*U**UUD^v^Uu −1.953947% (2) (−0.019539+/−0.007659) −2.551061!
*vDvdvD^U −5.550456% (2) (−0.055505+/−0.002145) −25.870557!
*vvv^dvDUU −1.866991% (2) (−0.018670+/−0.001162) −16.066983!
*DUuddu^vUUDU 2.944421% (2) (0.029444+/−0.000000) inf!
*UvDU^udv −11.381753% (2) (−0.113818+/−0.000000) −inf!
*uDvuD^d*d −0.894937% (2) (−0.008949+/−0.003047) −2.936908!
*DDdDuUddDv 2.867119% (2) (0.028671+/−0.009399) 3.050493!
*vuDDuddDD 1.254574% (4) (0.012546+/−0.003509) 3.575750!

*^DU^DUUdvu*u* 3.418463% (2) (0.034185+/−0.000000) inf!
*dUDDUddUdDv 2.369527% (2) (0.023695+/−0.009495) 2.495503!
*dv^vuddDd −0.088685% (2) (−0.000887+/−0.000000) −inf!
*Duuduu^Ddd −0.750441% (3) (−0.007504+/−0.000466) −16.119091!
*DUdDD^dvDU 1.175307% (2) (0.011753+/−0.001424) 8.253900!
**dUuvvU^D −2.849575% (3) (−0.028496+/−0.010303) −2.765780!
*^vDuU^dU 3.938292% (2) (0.039383+/−0.000000) inf!
*uuuuuvdDv −0.558249% (2) (−0.005582+/−0.000000) −inf!
*d^vvu^ −2.393024% (2) (−0.023930+/−0.005207) −4.595372!
*v^^^du −1.761896% (2) (−0.017619+/−0.005239) −3.363211!
*duDd^Uvd −1.019151% (5) (−0.010192+/−0.004025) −2.532104!
*DDUvd^dDv^ −0.874101% (2) (−0.008741+/−0.003118) −2.803017!
*DuvDvvvu 1.519782% (2) (0.015198+/−0.004855) 3.130253!
*uUDUuvddd −2.636507% (2) (−0.026365+/−0.004638) −5.685116!
*dv*Duv^DdD −5.264499% (2) (−0.052645+/−0.006892) −7.638930!
*udduDU^^d 1.491419% (2) (0.014914+/−0.001566) 9.521918!
*du^^*D*Duu 1.104631% (2) (0.011046+/−0.001625) 6.798838!
*v^d^^vuu −3.472512% (2) (−0.034725+/−0.000760) −45.715196!
*^vvDdD^^ −2.319201% (2) (−0.023192+/−0.000000) −inf!
*d^*vduvd 1.543871% (3) (0.015439+/−0.005566) 2.773966!
**^UD^Dv^^ −5.047020% (4) (−0.050470+/−0.014716) −3.429628!
*D^D^DUDD^^U*D 2.883352% (2) (0.028834+/−0.006685) 4.313340!
*u^^D^vd* 2.659993% (2) (0.026600+/−0.000402) 66.204889!
**uvUDU*UDU^dd 1.183220% (2) (0.011832+/−0.000000) inf!
*D^UdDvduD −4.018797% (2) (−0.040188+/−0.012227) −3.286797!
*^*UduuUvDU 1.615650% (2) (0.016157+/−0.004431) 3.646592!
**DU*dD^^v^ 4.229499% (4) (0.042295+/−0.009651) 4.382616!
*DD^uUU*U^uDU −2.125865% (2) (−0.021259+/−0.007998) −2.658129!
**Dddu^Duv 1.049457% (2) (0.010495+/−0.000977) 10.745260!
*UddUuduDvD 1.796899% (4) (0.017969+/−0.006688) 2.686821!
*uuu*^uvUD −0.901076% (3) (−0.009011+/−0.002186) −4.121834!
*^U^DdDU^v 3.397965% (3) (0.033980+/−0.004527) 7.506772!
*^^^u^^ −3.852472% (2) (−0.038525+/−0.002466) −15.621823!
*DUvUU*dDuvUvD −2.552678% (2) (−0.025527+/−0.000000) −inf!
*uU^uD*u^DD* 2.556611% (2) (0.025566+/−0.009800) 2.608901!
*^u**D^Ddu^ −0.463684% (2) (−0.004637+/−0.000220) −21.084806!
*UD*D*uv^du −1.472404% (3) (−0.014724+/−0.002531) −5.816346!
*vddDD^Dv −2.546789% (4) (−0.025468+/−0.010110) −2.519159!
*dvUUvDuu −3.395917% (2) (−0.033959+/−0.010937) −3.104907!
*DDvu^UD*DUD 0.380109% (2) (0.003801+/−0.000346) 10.979726!
*u^d^^^ −2.708855% (2) (−0.027089+/−0.008138) −3.328560!
**DuuU^ddUDUv −0.103791% (2) (−0.001038+/−0.000000) −inf!
*DUuuvUDuDv −2.606988% (2) (−0.026070+/−0.007110) −3.666684!
*DUDuvDDDuD 1.893809% (2) (0.018938+/−0.007651) 2.475199!
*^^*^uv^DD −4.169231% (2) (−0.041692+/−0.014306) −2.914396!
**u^duUuUdUd −3.010073% (2) (−0.030101+/−0.005028) −5.986239!
*^DUdvuuUDUD −2.471537% (2) (−0.024715+/−0.007902) −3.127714!
*UvDuv^dU 0.988408% (2) (0.009884+/−0.001238) 7.987004!
*uD*^vuDu*Dd 0.926394% (3) (0.009264+/−0.001344) 6.892161!
*d^duUuU**Uud 2.463882% (2) (0.024639+/−0.008022) 3.071274!
*uUUUdUdDuvU −3.180004% (3) (−0.031800+/−0.003092) −10.283302!
*UduU*UuudDvD 1.911408% (3) (0.019114+/−0.006672) 2.864750!
*uvDUUU*uudUv 0.733334% (4) (0.007333+/−0.002156) 3.401837!
*u^v*^Ddduu 3.174485% (2) (0.031745+/−0.001373) 23.114370!
*dv^^*^uv 2.399976% (2) (0.024000+/−0.001168) 20.541582!
*vDU^vudUdDDU −1.702122% (2) (−0.017021+/−0.000000) −inf!
*d^vvu^ −2.393024% (2) (−0.023930+/−0.005207) −4.595372!
**^Uuddv^U* −1.757335% (2) (−0.017573+/−0.003469) −5.065613!
*uvuUuvvdu* −5.187834% (2) (−0.051878+/−0.000000) −inf!
*v**duUuvDd −1.760903% (2) (−0.017609+/−0.006943) −2.536281!
*DUdUUud*vDD 0.794703% (2) (0.007947+/−0.000360) 22.064047!
*dv^uU^*DU 4.671844% (2) (0.046718+/−0.003941) 11.855044!
*vDudDdduu 0.832030% (3) (0.008320+/−0.002945) 2.824867!
*U*UuDvD*^dDu −1.581935% (4) (−0.015819+/−0.004657) −3.397020!
*Ud^vvdUU 2.162480% (2) (0.021625+/−0.007950) 2.720154!
*Uuu^^*^ddU −5.350120% (2) (−0.053501+/−0.000000) −inf!
*UvvDdd*vD^* 0.550377% (2) (0.005504+/−0.000000) inf!

*U^uvUuDv^Dd^ −1.915383% (2) (−0.019154+/−0.007968) −2.403866!
*vu^vuDuuU −0.705530% (2) (−0.007055+/−0.001683) −4.191436!
*uvvud^*dd 0.624998% (2) (0.006250+/−0.000000) inf!
*d^vv^uDd 0.769444% (3) (0.007694+/−0.002801) 2.747102!
*DdUdUdDu^Ud −1.598400% (2) (−0.015984+/−0.000000) −inf!
*^^v^DDDUU 1.050852% (2) (0.010509+/−0.003782) 2.778650!
*uU^u^^uD 2.746898% (2) (0.027469+/−0.000000) inf!
*u^*duuu^ 2.340654% (2) (0.023407+/−0.000000) inf!
*DUv^d*DDD^U 2.848417% (2) (0.028484+/−0.001810) 15.739534!
*dduduDDu^u 3.111335% (4) (0.031113+/−0.010205) 3.048752!
**^udd^udud 0.955371% (2) (0.009554+/−0.002861) 3.339391!
**^Udu^vdU −2.850274% (2) (−0.028503+/−0.002226) −12.803093!
*dv^ddDuu −2.184762% (4) (−0.021848+/−0.005208) −4.195087!
*vdduvv^D 1.522417% (3) (0.015224+/−0.003180) 4.786968!
*^duuDD^^ 3.007311% (3) (0.030073+/−0.006571) 4.576888!
*^U*du^dD^v 1.976099% (2) (0.019761+/−0.003440) 5.744978!
**^Ddvdvv 4.149029% (2) (0.041490+/−0.017213) 2.410454!
*udDUu^dudUduU −1.026880% (2) (−0.010269+/−0.003896) −2.635750!
*D^DvvDv^ 5.086808% (5) (0.050868+/−0.012641) 4.024158!
*vdDDdUuUddu* −0.940739% (2) (−0.009407+/−0.000186) −50.555705!
*uuUdUvU^ −2.395190% (2) (−0.023952+/−0.009716) −2.465267!
*dvvD^Dvd 3.428192% (2) (0.034282+/−0.014503) 2.363742!
*uu^*vd*uUvv 0.659919% (2) (0.006599+/−0.000000) inf!
*vvUdDU^DvU −2.510684% (2) (−0.025107+/−0.000316) −79.430852!
*^UvDUdddU −6.858755% (2) (−0.068588+/−0.000000) −inf!
*UuUuD*uUuUudv −1.277821% (2) (−0.012778+/−0.000000) −inf!
*^DduvuUv^vU 2.510461% (2) (0.025105+/−0.000000) inf!
*dd*DDdvDvd 1.747408% (2) (0.017474+/−0.006886) 2.537666!
*UUvuUDd^v^d 0.236636% (2) (0.002366+/−0.000000) inf!
*Du^dudDuUU −0.657974% (4) (−0.006580+/−0.002251) −2.922902!
*U^d^^*dDdvd −2.903820% (2) (−0.029038+/−0.000000) −inf!
*DUDUddvDDd 1.816214% (3) (0.018162+/−0.007750) 2.343560!
*dvvud^ −2.319020% (2) (−0.023190+/−0.005010) −4.628905!
*UvddUd*DuDUdd 2.223598% (2) (0.022236+/−0.008637) 2.574623!
*Dv*^^UdUu −1.755401% (4) (−0.017554+/−0.006589) −2.664028!
*UDDvud^vd 3.842749% (3) (0.038427+/−0.001064) 36.123455!
*dUuUUuduDvu 1.790013% (3) (0.017900+/−0.000252) 70.961922!
*dUvduvvv* −3.191168% (2) (−0.031912+/−0.006254) −5.102516!
*udvdvv 4.780590% (4) (0.047806+/−0.014368) 3.327176!
*^uUuUDvu −2.166104% (3) (−0.021661+/−0.002018) −10.735850!
*^ddD*uudUdd^ −3.741868% (2) (−0.037419+/−0.000000) −inf!
*^u*vDuuDu −2.837033% (2) (−0.028370+/−0.007987) −3.551920!
*v^vDv^Duv 0.962076% (3) (0.009621+/−0.002519) 3.819248!
*U^uvDuu^D^ 0.478471% (2) (0.004785+/−0.000000) inf!
*^vDd^Uu^*D −3.339939% (2) (−0.033399+/−0.011024) −3.029833!
*dudvD^^U 1.052431% (2) (0.010524+/−0.003112) 3.382262!
*DduuUDUdDDdvD −1.662454% (2) (−0.016625+/−0.000000) −inf!
*dDvuDdUv 2.202553% (2) (0.022026+/−0.001868) 11.792409!
*vvdD^vv*^ 0.550377% (2) (0.005504+/−0.000000) inf!
*vDd*^^*DUDU −3.928568% (3) (−0.039286+/−0.012925) −3.039484!
**dDUv^DddUu 1.298813% (2) (0.012988+/−0.004532) 2.866108!
*D^^^DUUD −4.183232% (2) (−0.041832+/−0.001360) −30.766334!
**D^D*uvv*^U^^ −13.258434% (2) (−0.132584+/−0.035164) −3.770503!
*^^^^dv 3.473249% (4) (0.034732+/−0.012497) 2.779294!
*UdvDdU*ud^U^ −2.726869% (2) (−0.027269+/−0.000000) −inf!
*vvd^^*^^ −5.532028% (2) (−0.055320+/−0.013016) −4.250176!
*^^*uv^DUDU −4.854371% (2) (−0.048544+/−0.000000) −inf!
*^UdUv^u^ −1.897518% (2) (−0.018975+/−0.003477) −5.457214!
*vu*DU*vUDDUUD 3.978438% (3) (0.039784+/−0.000894) 44.516725!
**vDuvduDUDUu 2.825740% (2) (0.028257+/−0.000000) inf!
*DuvuDvDUv −1.132267% (2) (−0.011323+/−0.003524) −3.212677!
*^vd^UD^u −1.582478% (2) (−0.015825+/−0.001320) −11.992323!
*^ud*vDUvv^v 4.122058% (2) (0.041221+/−0.000000) inf!
*vDv^v^^d −0.255489% (2) (−0.002555+/−0.000000) −inf!
*uDuvUDvu^ −3.010762% (2) (−0.030108+/−0.012489) −2.410724!
*^^vuv^dU −0.105630% (2) (−0.001056+/−0.000000) −inf!
*^^^^Uu −4.408754% (3) (−0.044088+/−0.009617) −4.584414!
*d^DDuu^UD −2.703257% (2) (−0.027033+/−0.001425) −18.965555!
*^UU^UudUDU −0.913455% (2) (−0.009135+/−0.000000) −inf!

*dUvd^dDud −2.116609% (2) (−0.021166+/−0.002265) −9.344535!

*dDDduvu^UU −1.803551% (2) (−0.018036+/−0.007630) −2.363674!

*^UuDv*vu −2.675902% (2) (−0.026759+/−0.010589) −2.527049!

*uUDud*uDUv^D −1.220249% (2) (−0.012202+/−0.000000) −inf!

*^vvDdUuU*U 1.374570% (3) (0.013746+/−0.001713) 8.026247!

*u*dvu^UUuu*d −2.650970% (4) (−0.026510+/−0.009597) −2.762338!

*uD^^*Ud^dDD 2.295378% (2) (0.022954+/−0.001866) 12.303568!

*vDvvUd^* −0.936123% (2) (−0.009361+/−0.002217) −4.222185!

*UvU^d^UU^ −3.423375% (2) (−0.034234+/−0.004138) −8.272669!

*DudDvD^Dv 2.610017% (2) (0.026100+/−0.000000) inf!

*^d^d*UDuUv −3.284030% (2) (−0.032840+/−0.000472) −69.649222!

*vvddvv 4.159041% (2) (0.041590+/−0.001027) 40.515584!

*^^Duv^Uu^D 2.456648% (2) (0.024566+/−0.000000) inf!

*uDd^v^ −4.719481% (2) (−0.047195+/−0.004976) −9.483893!

*u*^d^d^vUD 0.977315% (2) (0.009773+/−0.000000) inf!

**dDvDUddDudUD 0.286447% (2) (0.002864+/−0.000517) 5.541155!

*v*v^D*DDvv*U 3.893331% (2) (0.038933+/−0.014930) 2.607688!

*UvUd^vv^ −2.439782% (2) (−0.024398+/−0.002445) −9.978362!

*u^ddDuUUUU 1.459494% (5) (0.014595+/−0.005200) 2.806465!

*UUUvDdvuU 1.172093% (2) (0.011721+/−0.003443) 3.404388!

*^*D*DDd^DD^^u −1.936838% (2) (−0.019368+/−0.000000) −inf!

*Uv^d^vDU −3.073356% (3) (−0.030734+/−0.011847) −2.594254!

*Uu*uuuUuv*u^U 1.464608% (2) (0.014646+/−0.000000) inf!

*v*Dd^Uudd −1.670175% (3) (−0.016702+/−0.005855) −2.852500!

*UdUvdu*^Dv 2.717740% (2) (0.027177+/−0.001515) 17.940000!

*vvddvD 4.159041% (2) (0.041590+/−0.001027) 40.515584!

*DDdudvU^u −2.876744% (2) (−0.028767+/−0.007541) −3.814851!

*uU^u^^ 1.442772% (3) (0.014428+/−0.001396) 10.333820!

**^Uuv^U*u*u −0.789427% (3) (−0.007894+/−0.003358) −2.350792!

*vvUUDuUuU −1.837802% (2) (−0.018378+/−0.002104) −8.733112!

*UUDvu^Udud −3.254087% (2) (−0.032541+/−0.009070) −3.587551!

*vuuuU^D*dU 0.958645% (3) (0.009586+/−0.003910) 2.451527!

*UdU^Uvvv 2.823431% (2) (0.028234+/−0.000000) inf!

*vDv*^^UDvDu 10.481589% (2) (0.104816+/−0.000000) inf!

*DDu^v^Dv −2.497912% (2) (−0.024979+/−0.000000) −inf!

*^v^vvUvdD 7.067914% (2) (0.070679+/−0.004455) 15.866832!

*uUd^ddvDu 1.736264% (2) (0.017363+/−0.000311) 55.867189!

*^DDvvDuv 2.829966% (2) (0.028300+/−0.001203) 23.527227!

*vdduUd^dUU 3.534045% (2) (0.035340+/−0.011047) 3.199200!

*D^vUudduU 2.576863% (2) (0.025769+/−0.008100) 3.181387!

*vuvUDvv^d 6.412787% (2) (0.064128+/−0.019739) 3.248741!

*Uu^ddUuU^ 2.340654% (2) (0.023407+/−0.000000) inf!

*DuddUuduDDv 1.214015% (2) (0.012140+/−0.000000) inf!

*DD^vDUdd^ −1.307040% (2) (−0.013070+/−0.002782) −4.697971!

*vD^uuUUDD 3.344660% (2) (0.033447+/−0.000012) 2771.702528!

**Uv^Dvvd 3.090392% (3) (0.030904+/−0.008367) 3.693476!

*UDu^uvuDduUD 1.180995% (2) (0.011810+/−0.000000) inf!

*dUuDUuUUdD^ −1.576312% (3) (−0.015763+/−0.004989) −3.159405!

*d^d^UvdUd 0.248632% (2) (0.002486+/−0.000064) 38.786021!

*ud^Uduv^u −2.759296% (2) (−0.027593+/−0.005439) −5.072815!

*uDvd^dd^U −2.196552% (2) (−0.021966+/−0.000518) −42.431192!

*ddudvdv*u^ −1.532375% (2) (−0.015324+/−0.000000) −inf!

*UUvDdvUv*Dd 5.174573% (2) (0.051746+/−0.000000) inf!

*DvUD^vUd^ 2.739620% (2) (0.027396+/−0.011008) 2.488741!

*v^DvdDUu 0.176364% (2) (0.001764+/−0.000000) inf!

*DvD^^vDu −3.423957% (2) (−0.034240+/−0.007812) −4.383083!

*Udd^u^ud 1.671165% (2) (0.016712+/−0.007168) 2.331360!

*DUUD*UvuvddU −2.839378% (2) (−0.028394+/−0.004385) −6.475542!

*vu^vDv^^ 3.250519% (2) (0.032505+/−0.008392) 3.873195!

*d^uDDdDUv 1.014415% (2) (0.010144+/−0.004346) 2.334109!

*Dd*uududv^ −0.452754% (2) (−0.004528+/−0.000045) −100.876312!

*d^*U^vU^u* −1.507612% (2) (−0.015076+/−0.003595) −4.194173!

*UDDdDuvuvD −4.165245% (2) (−0.041652+/−0.005244) −7.943612!

*dvvdDUvU 2.692903% (3) (0.026929+/−0.009920) 2.714529!

*D^^dDd^d −9.703341% (2) (−0.097033+/−0.016508) −5.878042!

*^d*$_u$^v^vD −2.497912% (2) (−0.024979+/−0.000000) −inf!

*duduDd^v 1.407481% (2) (0.014075+/−0.004049) 3.475903!

*U^Uu^*DdDD^U 2.607552% (2) (0.026076+/−0.000084) 311.003219!

*^uUuD*uvDd −0.436995% (2) (−0.004370+/−0.000000) −inf!

*vUDUDUvDD^U 3.349089% (5) (0.033491+/−0.011849) 2.826386!

*d^UDU^u^ −1.213943% (2) (−0.012139+/−0.002353) −5.158501!

*uD^dUu*dudU 0.797213% (2) (0.007972+/−0.001846) 4.318017!

*^UuUU^U*d 1.215422% (3) (0.012154+/−0.004800) 2.532152!

*u*dvuUv^vv −2.497912% (2) (−0.024979+/−0.000000) −inf!

*^UUud*vUDv 1.988533% (2) (0.019885+/−0.002078) 9.567945!

*dDDUduDDD^U 0.875297% (3) (0.008753+/−0.002373) 3.688870!

*UUdudDUUv^* 0.998931% (3) (0.009989+/−0.002682) 3.724183!

*^ddUdv*^D 2.578405% (4) (0.025784+/−0.004500) 5.729869!

*d^*UdUuUD^ 1.114302% (3) (0.011143+/−0.001084) 10.278051!

*uuUvvUDuD 2.710126% (2) (0.027101+/−0.009679) 2.800044!

*Uudu*dd^v 3.112968% (2) (0.031130+/−0.012638) 2.463169!

*duDD*dduDvD* −2.072390% (3) (−0.020724+/−0.006620) −3.130362!

**vU^ddvDu −1.738149% (2) (−0.017381+/−0.000727) −23.911582!

*UUvUUDvdduU −2.002627% (2) (−0.020026+/−0.007267) −2.755661!

*Uvddvuvd −0.497876% (2) (−0.004979+/−0.000000) −inf!

*v*DuDDDudvv −9.467149% (2) (−0.094671+/−0.000000) −inf!

*vdUd^Udu −0.204764% (2) (−0.002048+/−0.000558) −3.667661!

*v^UdUuuUdd 0.228055% (2) (0.002281+/−0.000080) 28.454477!

*d^vv^^Udv −11.381753% (2) (−0.113818+/−0.000000) −inf!

*uuddvdvD 3.456583% (3) (0.034566+/−0.002281) 15.152405!

*DvuudDuuuUD −1.117125% (2) (−0.011171+/−0.002685) −4.160197!

*ud^v*vU^ −2.520525% (2) (−0.025205+/−0.004064) −6.202537!

*udDUu^dvD 2.489948% (2) (0.024899+/−0.004331) 5.748890!

*uDUDuuudUD^uD 0.776811% (2) (0.007768+/−0.002124) 3.658013!

*uDdv^^DDdd 2.230966% (2) (0.022310+/−0.008827) 2.527446!

*UDUv^Uu^^ −3.644363% (2) (−0.036444+/−0.005843) −6.236885!

*u*vDD*uuUdv −1.616699% (2) (−0.016167+/−0.005075) −3.185747!

*dvu^dUD^u −1.916337% (2) (−0.019163+/−0.006238) −3.072172!

*duDuudUvv* −1.335803% (3) (−0.013358+/−0.002808) −4.757134!

*vvUd^^D^ −5.540925% (2) (−0.055409+/−0.007840) −7.067150!

*UuuDuU^vu −2.681125% (2) (−0.026811+/−0.000589) −45.519161!

*DUU^^dUdD −2.609567% (3) (−0.026096+/−0.007677) −3.399393!

*UuUudDDUd*uvu 1.824809% (2) (0.018248+/−0.000790) 23.086169!

**uUdUvv*ddv 0.544635% (2) (0.005446+/−0.000580) 9.391328!

*vvvD*uvdU −0.402098% (2) (−0.004021+/−0.001685) −2.386151!

*D*DdDUDUUv^ 2.617855% (2) (0.026179+/−0.002608) 10.039067!

*vDdu^^*^ −2.736323% (2) (−0.027363+/−0.000000) −inf!

*D*^DUUdU*udUd −2.073879% (2) (−0.020739+/−0.002879) −7.204281!

**u^vD^Ddv^* −3.109188% (3) (−0.031092+/−0.010496) −2.962301!

*uuDuvuv*uD 3.440158% (2) (0.034402+/−0.000000) inf!

*dD^^UdUUdU −0.935927% (3) (−0.009359+/−0.003883) −2.410210!

*^udDvdUu 1.865142% (3) (0.018651+/−0.006808) 2.739592!

*Uvd*dvu*Ud −3.988876% (3) (−0.039889+/−0.014153) −2.818443!

*duv^dv 0.208957% (2) (0.002090+/−0.000370) 5.642134!

*uvvddD*d −1.190405% (2) (−0.011904+/−0.000427) −27.846680!

*vu*dvdD*vu 2.208201% (2) (0.022082+/−0.000000) inf!

*vvUd^^dd*D 1.344325% (2) (0.013443+/−0.000000) inf!

*dUu^^udD 0.638037% (2) (0.006380+/−0.002494) 2.558426!

*dU^DUUvUUd −0.613306% (3) (−0.006133+/−0.002535) −2.419525!

*v*^vv^*vU 1.867449% (2) (0.018674+/−0.002793) 6.685038!

*UDd^DUvDuD −1.796952% (3) (−0.017970+/−0.005227) −3.437834!

*^vDDu^UUU −2.736323% (2) (−0.027363+/−0.000000) −inf!

*^uDuu^vD −1.775251% (2) (−0.017753+/−0.005212) −3.406372!

*dD^vU^dU* −1.931761% (4) (−0.019318+/−0.004612) −4.188961!

*^*^uuDuuv 1.076242% (2) (0.010762+/−0.000747) 14.398232!

*DuvUu^dvD −5.931000% (2) (−0.059310+/−0.004718) −12.570185!

**^*Uu^v^d 6.174170% (2) (0.061742+/−0.024488) 2.521264!

*u^*vDdvdUd* −0.950543% (2) (−0.009505+/−0.003044) −3.122499!

*uduvuuv*Uu −2.581189% (2) (−0.025812+/−0.008484) −3.042398!

*Dd^UvduUd −1.108676% (2) (−0.011087+/−0.002795) −3.966650!

*UvUvDDdU*UD 1.002143% (2) (0.010021+/−0.000000) inf!

*Du*uD^^uUU −3.701937% (2) (−0.037019+/−0.005029) −7.361145!

*uUvvuuUDu*DuU 3.700336% (2) (0.037003+/−0.002721) 13.601520!

*DvvUuD^uu 1.525611% (2) (0.015256+/−0.006310) 2.417581!

*d^*Ud^^dd −2.887184% (3) (−0.028872+/−0.006754) −4.275000!
*U^UUUUu^ −2.717487% (2) (−0.027175+/−0.003641) −7.463530!
*DDDuU^uU^uDU 1.464033% (2) (0.014640+/−0.000000) inf!
*uUDU^UvdvUDD −2.010386% (2) (−0.020104+/−0.000924) −21.767887!
*uDuU*d^UvuU −2.869377% (2) (−0.028694+/−0.006545) −4.384185!
*uvv^^D^d −7.934891% (2) (−0.079349+/−0.000000) −inf!
*udD^u^Dd 3.250283% (5) (0.032503+/−0.012254) 2.652399!
*uDuudu*U^uv 1.149432% (2) (0.011494+/−0.000000) inf!
*UvDvuUUU*dDUU 1.997092% (2) (0.019971+/−0.000000) inf!
*^u^vdv 3.047411% (3) (0.030474+/−0.003361) 9.067386!
**ddUDuvD^^U^ 0.425332% (2) (0.004253+/−0.000000) inf!
*^UUDUuUvDu 4.828222% (2) (0.048282+/−0.000000) inf!
*^dvUvuuu −0.794249% (2) (−0.007942+/−0.001691) −4.696391!
*^^DDdvDd −2.249705% (2) (−0.022497+/−0.008172) −2.752881!
*d^^uUudd −2.084326% (2) (−0.020843+/−0.007267) −2.868397!
*DvduuvvU 0.636649% (2) (0.006366+/−0.000736) 8.655901!
*UvDDvu^DDUu 7.309641% (2) (0.073096+/−0.020464) 3.572013!
*uUvUuuUvud 0.621345% (2) (0.006213+/−0.000000) inf!
*d*dU^UDvDuu 3.114984% (2) (0.031150+/−0.003000) 10.383385!
*uv**vu*^uU 1.305771% (2) (0.013058+/−0.000374) 34.906843!
*UD^UDUDv^D −1.608137% (2) (−0.016081+/−0.004675) −3.440067!
*dUud*UUvvD −2.095051% (3) (−0.020951+/−0.007317) −2.863390!
*uvvUdUUduu −0.355735% (3) (−0.003557+/−0.000895) −3.973612!
*uvvU^*d*^D 3.543727% (2) (0.035437+/−0.004468) 7.931554!
*U^^DUvDvud 3.932117% (2) (0.039321+/−0.010413) 3.776143!
*uud^^udU −0.595589% (2) (−0.005956+/−0.001696) −3.511769!
*UDv^Dud^d −1.874618% (2) (−0.018746+/−0.000000) −inf!
*Ddd*v*UuU^U* −2.707422% (2) (−0.027074+/−0.008358) −3.239214!
*uUDuv^vU −1.855704% (2) (−0.018557+/−0.000562) −33.035406!
*^vvvuu 3.858323% (2) (0.038583+/−0.005052) 7.637178!
*vUvUu^udU 3.168100% (2) (0.031681+/−0.005303) 5.973845!
*vuv^vUuD^ −0.709727% (2) (−0.007097+/−0.002549) −2.783794!
*udUdvuU^ −4.237583% (2) (−0.042376+/−0.003766) −11.253408!
*dDDdDv*uUu 1.785757% (2) (0.017858+/−0.005098) 3.502961!
**^^UDD^D^ −1.952558% (2) (−0.019526+/−0.006328) −3.085701!
*^^^^Du −3.307757% (2) (−0.033078+/−0.010692) −3.093695!
*^D^UudDv 2.125033% (5) (0.021250+/−0.006779) 3.134721!
*^*vUuU^dd −2.781532% (3) (−0.027815+/−0.001563) −17.796400!
*uU^u^^ 1.442772% (3) (0.014428+/−0.001396) 10.333820!
*^uDvv^dUu 1.139604% (2) (0.011396+/−0.000000) inf!
*v^udDDUUv^ 2.816849% (2) (0.028168+/−0.005075) 5.550719!
*vv^^vUdv^ 3.759392% (2) (0.037594+/−0.000000) inf!
*du^*uDuvUdD 3.503886% (2) (0.035039+/−0.011114) 3.152664!
*^*^*^^dD*d* −1.637244% (2) (−0.016372+/−0.003167) −5.169528!
*uUdv^UDvdd 4.488551% (2) (0.044886+/−0.001901) 23.612287!
*dUu^dvU^ −3.555044% (2) (−0.035550+/−0.000000) −inf!
*UuDDvUUdDdud* −0.646789% (2) (−0.006468+/−0.001340) −4.827749!
*^UDvDd^U 1.472076% (2) (0.014721+/−0.000000) inf!
*U^UvvD*^Dv 0.638050% (2) (0.006380+/−0.000315) 20.242796!
*D^dvdvvD −8.310188% (4) (−0.083102+/−0.027655) −3.004926!
*^*^Du^dD*vU −1.378766% (3) (−0.013788+/−0.000366) −37.644255!
*D*^DUdv^u −2.576298% (5) (−0.025763+/−0.010726) −2.401893!
*vddUDv^D 1.884820% (4) (0.018848+/−0.007699) 2.448078!
*^Uv^vud* 0.623623% (2) (0.006236+/−0.002522) 2.472378!
*DvDvu^uD 0.880034% (2) (0.008800+/−0.003137) 2.805559!
*vdvu*^Uv −1.389123% (4) (−0.013891+/−0.005258) −2.641700!
*UvuUUv^^^*vv 0.284313% (2) (0.002843+/−0.000000) inf!
**dvdDDu*d*DdU 1.120608% (2) (0.011206+/−0.002701) 4.149631!
**^^DUDUDUdUvu −0.174220% (2) (−0.001742+/−0.000000) −inf!
*UvDDDDddDdu 4.303796% (2) (0.043038+/−0.010088) 4.266386!
**duddDud^du 1.065171% (3) (0.010652+/−0.002065) 5.158254!
*dvu^^*Uu 6.686737% (3) (0.066867+/−0.017155) 3.897894!
*^dvd*UDUUu −0.935561% (3) (−0.009356+/−0.003545) −2.638857!
*vDDvu^vdD 7.470555% (3) (0.074706+/−0.031955) 2.337827!
*u^ddUD^d*u 0.694443% (2) (0.006944+/−0.000000) inf!
*duD^uDvdU −0.281028% (2) (−0.002810+/−0.000000) −inf!
*uDvDUdDDuDDU −1.949458% (2) (−0.019495+/−0.004127) −4.723465!
*v*uDdDUUu^du −0.776050% (2) (−0.007760+/−0.000000) −inf!

**vvUuv*^^ −3.228484% (2) (−0.032285+/−0.000523) −61.704899!

*^^dudu^D 0.330071% (2) (0.003301+/−0.000372) 8.882401!

*UuD^uvdud* −0.934292% (2) (−0.009343+/−0.000000) −inf!

*^UUd*d*vuu −2.215930% (3) (−0.022159+/−0.004626) −4.789931!

*uD*u^vu*v^^ −0.464781% (2) (−0.004648+/−0.000000) −inf!

*DvuUDvudu −4.541026% (3) (−0.045410+/−0.002022) −22.455093!

*udU*^UvUU −2.331736% (3) (−0.023317+/−0.010013) −2.328644!

*U^U^^dD^ −4.426137% (2) (−0.044261+/−0.006841) −6.470254!

**u^^DUv^ 1.766965% (2) (0.017670+/−0.001154) 15.317101!

*ud^*uU^U −1.025104% (4) (−0.010251+/−0.003127) −3.278308!

*DuuUvvuv 2.620029% (2) (0.026200+/−0.006195) 4.229129!

*UdUU^uvu −2.058323% (2) (−0.020583+/−0.005642) −3.648324!

*DuvvdDdv 0.544635% (2) (0.005446+/−0.000580) 9.391328!

*^DDu*DdU^d 1.345564% (2) (0.013456+/−0.003352) 4.014782!

*uu^^^v −3.434289% (2) (−0.034343+/−0.001313) −26.151261!

*v^U^UvD^U 1.697605% (2) (0.016976+/−0.006059) 2.801787!

*^UuDUuUDu^ 0.798607% (2) (0.007986+/−0.001221) 6.539568!

*U*^^^^DU −2.484183% (2) (−0.024842+/−0.000955) −26.008119!

*v^*dd*UdDUD −3.378982% (3) (−0.033790+/−0.013465) −2.509440!

*d^UUdD^**^ 1.070720% (2) (0.010707+/−0.003964) 2.700982!

*DUUvuUvUU^ −0.943567% (2) (−0.009436+/−0.000481) −19.619446!

*uuDdDu^^U −4.713424% (2) (−0.047134+/−0.000000) −inf!

*uDUuvD^^ 6.542770% (2) (0.065428+/−0.026301) 2.487631!

*UvDuU^v^ 2.640590% (2) (0.026406+/−0.007690) 3.433796!

*^d^uDvvU 2.655760% (3) (0.026558+/−0.007557) 3.514473!

**vUvdDDuDd 0.529808% (3) (0.005298+/−0.001006) 5.263989!

*^vdDvUuDd −2.155487% (3) (−0.021555+/−0.007899) −2.728810!

*dvDvuDUUd 2.093511% (3) (0.020935+/−0.002223) 9.417692!

*UddudUddvUu −0.310747% (2) (−0.003107+/−0.000000) −inf!

*vvdvDUDu 0.972597% (2) (0.009726+/−0.000024) 399.342527!

*dv^UvvUv 3.183636% (2) (0.031836+/−0.002556) 12.454555!

*^vDdduUvD 0.659919% (2) (0.006599+/−0.000000) inf!

*dUDUudUu^u −1.430395% (2) (−0.014304+/−0.001134) −12.615042!

*UuuvDDu^ −5.260469% (4) (−0.052605+/−0.006260) −8.402915!

*d^UUUUvUu*u −3.285083% (2) (−0.032851+/−0.003844) −8.546264!

*^UDdU^duv 1.976977% (2) (0.019770+/−0.008303) 2.380985!

*uUDv^U^Dd* −2.781295% (2) (−0.027813+/−0.001566) −17.757465!

*vuuuv*^d 0.787336% (2) (0.007873+/−0.000984) 8.003034!

*vvDuvuUuv −3.216515% (2) (−0.032165+/−0.000000) −inf!

*vDvDuvD^ −3.141861% (2) (−0.031419+/−0.012621) −2.489313!

*UDD*uduu*D^ud −2.051744% (2) (−0.020517+/−0.000000) −inf!

*dddDu^d^U −1.368621% (2) (−0.013686+/−0.002065) −6.628595!

*vUdU**vvu 5.784729% (2) (0.057847+/−0.000000) inf!

*dDU^DUUvdv −2.851527% (2) (−0.028515+/−0.000000) −inf!

**vUvUvvuvv 12.063017% (2) (0.120630+/−0.020707) 5.825502!

*DUdDuvvduDU 0.047060% (2) (0.000471+/−0.000000) inf!

*vUdUD^UvdD* 3.253653% (2) (0.032537+/−0.008310) 3.915203!

*uUvd^U^d −1.825292% (2) (−0.018253+/−0.000543) −33.599693!

*ddUdvD*vD^ −1.115651% (3) (−0.011157+/−0.002958) −3.771834!

*^Uv^^^^U −7.825244% (2) (−0.078252+/−0.012440) −6.290375!

*vvd**uUuuD −4.021455% (2) (−0.040215+/−0.016871) −2.383695!

*D^dDdUDuuv 1.773349% (2) (0.017733+/−0.004827) 3.674118!

*^DuUvuD^ −4.121329% (3) (−0.041213+/−0.013256) −3.109094!

*D*vvddd*d −1.190405% (2) (−0.011904+/−0.000427) −27.846680!

*dDU^UDUU^U −2.378303% (2) (−0.023783+/−0.000899) −26.447620!

*ddUDUu*dD*Dv −1.875522% (3) (−0.018755+/−0.004784) −3.920654!

*d*^^*dvv 1.330547% (2) (0.013305+/−0.004544) 2.928256!

*^^D^DUud −2.284309% (2) (−0.022843+/−0.002762) −8.269838!

*^uu^v^ −3.103725% (3) (−0.031037+/−0.011283) −2.750895!

*^vuvDvUD 0.397654% (2) (0.003977+/−0.000056) 71.134764!

*^UDuddUdv 3.190251% (2) (0.031903+/−0.002873) 11.104568!

*Uu^u^^ 1.442772% (3) (0.014428+/−0.001396) 10.333820!

*uDDuUv^^u 2.435018% (2) (0.024350+/−0.004221) 5.768847!

*uu^DUu**UD^ 4.090942% (2) (0.040909+/−0.004135) 9.892504!

*d^dUvUvDv 1.583302% (2) (0.015833+/−0.005681) 2.786854!

*DDDdvdUuv 3.561315% (3) (0.035613+/−0.012113) 2.940032!

*uU^u^^ 1.442772% (3) (0.014428+/−0.001396) 10.333820!

*UuDu^D^v −5.328403% (2) (−0.053284+/−0.009650) −5.521447!

*DUDDU*Du^ddv −2.702777% (2) (−0.027028+/−0.003065) −8.817026!

*^DDuddUdu*d 0.765897% (3) (0.007659+/−0.002592) 2.955401!

*UuD*dDD^^DDD 1.483177% (2) (0.014832+/−0.003056) 4.853293!

*uDvDdDUdDv 4.689284% (2) (0.046893+/−0.000829) 56.552641!

*D*Dd^D^UD*Uu 2.406732% (4) (0.024067+/−0.009579) 2.512610!

*vUvv^dvU 2.580506% (2) (0.025805+/−0.006900) 3.740104!

*udUDvvuD*v −1.280365% (2) (−0.012804+/−0.000198) −64.824652!

*v^uv*UD^DUD* −2.663303% (2) (−0.026633+/−0.002279) −11.687673!

*uD^^dUuUu −3.172734% (2) (−0.031727+/−0.009765) −3.249197!

*DudDv^UD*vd −1.242790% (2) (−0.012428+/−0.000000) −inf!

*vddUuDud^^D −2.160868% (2) (−0.021609+/−0.000000) −inf!

*UUdvduD^du −2.585650% (2) (−0.025856+/−0.005398) −4.789942!

*U^^UuU^d −3.069986% (3) (−0.030700+/−0.005728) −5.360077!

*dvUUDU^U^D 0.691927% (3) (0.006919+/−0.000162) 42.790506!

*uUuUDuvDu*d*d −0.375286% (2) (−0.003753+/−0.001540) −2.436403!

*dDDdvduUv −0.575813% (2) (−0.005758+/−0.002008) −2.867828!

*^^UU^DvuUdD 0.152418% (3) (0.001524+/−0.000294) 5.181844!

*udu*d*udvvvU −5.968613% (3) (−0.059686+/−0.024614) −2.424920!

*uDDuU^D^UU −0.175781% (2) (−0.001758+/−0.000000) −inf!

**^d^$_u$^Ddddd −2.277629% (2) (−0.022776+/−0.000000) −inf!

*d*dd^udDv 0.803047% (2) (0.008030+/−0.000525) 15.299335!

*Uud^dDdUDUu 2.749925% (2) (0.027499+/−0.003803) 7.230036!

*UvUU^UD^D −1.785635% (2) (−0.017856+/−0.003388) −5.270592!

*DvDUduUdd^ 3.523629% (2) (0.035236+/−0.014829) 2.376228!

*UdU*v^vUuU −1.052961% (2) (−0.010530+/−0.002381) −4.422503!

*vdUvUvDD* 2.813558% (2) (0.028136+/−0.007913) 3.555458!

*^^vU^*ddU −1.301793% (2) (−0.013018+/−0.003419) −3.808075!

*^u^dUD^U −1.854103% (2) (−0.018541+/−0.007405) −2.503830!

*U^v*d^Uudu 0.988703% (2) (0.009887+/−0.000000) inf!

*v^^^Ddu^ −1.310555% (2) (−0.013106+/−0.000296) −44.281734!

*d^Ddduv*^*u^ 0.576604% (2) (0.005766+/−0.000000) inf!

*uu*vvDU^v** 4.153053% (2) (0.041531+/−0.000000) inf!

*dUDd*UvvdUD* −1.368959% (3) (−0.013690+/−0.001497) −9.145013!

***uUDD^vuu −1.086210% (3) (−0.010862+/−0.002095) −5.185333!

*vuUUuuDuUdD 3.559319% (2) (0.035593+/−0.008025) 4.435087!

*uu*dv^DUddDd 2.933591% (2) (0.029336+/−0.000000) inf!

*udv^v^ 2.569904% (2) (0.025699+/−0.002940) 8.741909!

*D^^vUUdUvU −1.142640% (2) (−0.011426+/−0.003674) −3.110324!

*dvU*Dd^uv*U −1.495339% (2) (−0.014953+/−0.000087) −171.392214!

*uu*^Uvdv^ −1.555284% (2) (−0.015553+/−0.000008) −1870.207956!

*dDddd^*UDDuu 1.248552% (2) (0.012486+/−0.004090) 3.052377!

*^^^^^u −4.946462% (2) (−0.049465+/−0.003390) −14.593420!

*udDU^UDuDDvD 0.790009% (2) (0.007900+/−0.003336) 2.368023!

*vUu*^^d^U 0.685132% (2) (0.006851+/−0.000000) inf!

*dUvvddUUv 1.960138% (2) (0.019601+/−0.002119) 9.249057!

*dDuvdvuuvD −1.174448% (2) (−0.011744+/−0.000000) −inf!

*UuvddDv^ 1.757381% (2) (0.017574+/−0.004258) 4.127347!

*uuuUvUUdd^ −0.248182% (2) (−0.002482+/−0.000225) −11.037228!

*vvd^vUvUU 2.645104% (2) (0.026451+/−0.004774) 5.540557!

*u*uddUduvdDUu −1.052264% (2) (−0.010523+/−0.002000) −5.262237!

*vdu^DUDddD −1.329783% (2) (−0.013298+/−0.004568) −2.911209!

**dU^^U^Du −3.228423% (3) (−0.032284+/−0.008341) −3.870712!

*vDD^d^^DU 1.220914% (2) (0.012209+/−0.000000) inf!

*UUdDu^DUDvvD 3.573471% (2) (0.035735+/−0.000000) inf!

**uudv^vd 2.381863% (4) (0.023819+/−0.004682) 5.087421!

*dUuDDdv^v 1.384073% (2) (0.013841+/−0.000882) 15.697785!

*v*^d^v^D −2.828395% (3) (−0.028284+/−0.009269) −3.051419!

*uUUudDUdDvdu 2.134785% (2) (0.021348+/−0.000000) inf!

*vv*^ud^v −1.481734% (2) (−0.014817+/−0.001087) −13.628157!

*uUDD^u*d^u −0.791219% (2) (−0.007912+/−0.001720) −4.599116!

*vUuvuDdvD −5.345686% (2) (−0.053457+/−0.000610) −87.648694!

*DvvddUDv 2.498838% (2) (0.024988+/−0.000000) inf!

*U^UDDvdUU 1.712848% (4) (0.017128+/−0.006339) 2.702259!

*^DUuu^D^* −0.791096% (2) (−0.007911+/−0.001435) −5.514361!

*UDUU*^vu^uuD −2.805385% (2) (−0.028054+/−0.000000) −inf!

*^^v*DDuDddd 5.174573% (2) (0.051746+/−0.000000) inf!

*vDd*UddD^** 0.917743% (2) (0.009177+/−0.003276) 2.800988!

*U^DuUUvU*UUUD −0.633020% (2) (−0.006330+/−0.001866) −3.393151!
*D^DDdD^uD 1.653424% (2) (0.016534+/−0.006457) 2.560717!
*UUUv^uUUd*dUD −5.147430% (2) (−0.051474+/−0.000000) −inf!
*UdUUvu^duDD 2.994538% (2) (0.029945+/−0.012103) 2.474230!
*dUv^DvD^d −2.012458% (2) (−0.020125+/−0.000000) −inf!
*^dUv^uUU −2.058903% (3) (−0.020589+/−0.003723) −5.530577!
*UDUuUdDuvuu 1.278240% (3) (0.012782+/−0.002311) 5.531768!
*dv^vDudu 10.523469% (2) (0.105235+/−0.000000) inf!
*UdUuvUUduv −1.386352% (2) (−0.013864+/−0.000000) −inf!
*^D*d*uuvvuD 2.850777% (2) (0.028508+/−0.000000) inf!
*^vDudvdD 2.290022% (2) (0.022900+/−0.003939) 5.813705!
**D^DU^U^Uv*vU 3.875406% (2) (0.038754+/−0.000000) inf!
*vdD^UDDUUv^ 1.025660% (2) (0.010257+/−0.002346) 4.371338!
*Uv^vvd^U 0.908358% (2) (0.009084+/−0.002053) 4.423597!
*vDvdDddU* 3.533020% (2) (0.035330+/−0.000938) 37.649845!
*DUvdv^dUvuD 2.133010% (2) (0.021330+/−0.004648) 4.589314!
*Uu^*du^^dU^ −1.796879% (2) (−0.017969+/−0.000000) −inf!
*udDD^^uudu* 0.533808% (2) (0.005338+/−0.001109) 4.812387!
*Uu*v^u^DU −0.300859% (2) (−0.003009+/−0.000054) −55.564529!
*vdUUd*UuudU −1.377665% (3) (−0.013777+/−0.004710) −2.925065!
*Ud^vUdDdu −0.241073% (2) (−0.002411+/−0.000116) −20.805838!
**ud^DvuvD −2.644846% (4) (−0.026448+/−0.008018) −3.298766!
*UuDvuvuuU*D −0.623699% (2) (−0.006237+/−0.000000) −inf!
*dUUv^DUu^ −1.052961% (2) (−0.010530+/−0.002381) −4.422503!
*D^vdUdv* 1.742501% (2) (0.017425+/−0.006878) 2.533305!
*U^dduUu^ 2.340654% (2) (0.023407+/−0.000000) inf!
**ddDUvDvddu −1.210121% (2) (−0.012101+/−0.000000) −inf!
*vUuvU*Dvd 1.459660% (3) (0.014597+/−0.005758) 2.534900!
*DUD^dd^Uv −0.433166% (2) (−0.004332+/−0.000000) −inf!
*Udvd^vdUD 0.960332% (2) (0.009603+/−0.001818) 5.282933!
**D^vDv^uD^vdD 0.158482% (2) (0.001585+/−0.000000) inf!
*UuDUu^^vU 1.490966% (2) (0.014910+/−0.001917) 7.778177!
*^dvUUUDUv −1.276912% (4) (−0.012769+/−0.004811) −2.653911!
*d^vvd^ 2.316300% (2) (0.023163+/−0.007226) 3.205729!
*uDDvvDv^* 0.807970% (3) (0.008080+/−0.002510) 3.218965!
*U^v^Dddv −6.588563% (2) (−0.065886+/−0.001997) −32.994884!
*vvuvdUUd 2.238403% (2) (0.022384+/−0.001269) 17.642635!
*UuDU^Udvu 2.616527% (2) (0.026165+/−0.002239) 11.688519!
*DuuUdvvUU −1.866540% (3) (−0.018665+/−0.007479) −2.495564!
**DduUdUD^Uv −2.395056% (2) (−0.023951+/−0.000125) −191.025334!
*uU^Udud^u −1.569923% (4) (−0.015699+/−0.005445) −2.882976!
*UduvuuD^d*U −1.909028% (2) (−0.019090+/−0.004356) −4.382946!
*u^^UUdd^ 2.587909% (2) (0.025879+/−0.002834) 9.132651!
*uDDuuvdu^U^* −0.548696% (2) (−0.005487+/−0.000000) −inf!
*vvdvDUvv*D^ −5.485760% (2) (−0.054858+/−0.000000) −inf!
*^DdudDDdDD^d −0.667730% (2) (−0.006677+/−0.000000) −inf!
*uuUvuDvv 1.408938% (3) (0.014089+/−0.005908) 2.384751!
*UUUDU^uuddv −2.218278% (2) (−0.022183+/−0.000000) −inf!
*dudD^^dD 2.737087% (2) (0.027371+/−0.011200) 2.443741!
*dDvUDvud*^D −2.302298% (2) (−0.023023+/−0.000000) −inf!
*uuDD^ddvv −0.776742% (2) (−0.007767+/−0.001070) −7.259248!
*^DDuDvDvuU −3.895575% (2) (−0.038956+/−0.001518) −25.670515!
*uDUvuUv^D −1.700828% (2) (−0.017008+/−0.007164) −2.374053!
*^^Dv^uD*Uv −2.876250% (2) (−0.028762+/−0.004623) −6.222011!
*udvdvv 4.780590% (4) (0.047806+/−0.014368) 3.327176!
*uddudDdD^UUd −0.200077% (2) (−0.002001+/−0.000000) −inf!
*^UD^^DUvdD 5.615545% (2) (0.056155+/−0.000000) inf!
*dUudd^Ddud −1.264914% (2) (−0.012649+/−0.001792) −7.057223!
*v^vvUvD^u 3.792118% (2) (0.037921+/−0.013134) 2.887356!
*^UDu^u^d −1.674640% (4) (−0.016746+/−0.001446) −11.577363!
*^d^^D*UdUu −4.108039% (4) (−0.041080+/−0.010176) −4.037073!
*UDdUD*v^Ud 3.947375% (2) (0.039474+/−0.000000) inf!
*d^D^DDdUD −1.895795% (3) (−0.018958+/−0.002021) −9.382013!
*duDDUduduUU^D −1.598400% (2) (−0.015984+/−0.000000) −inf!
*U^^u^^ −3.852472% (2) (−0.038525+/−0.002466) −15.621823!
*v^UvDUdUvU 1.876783% (3) (0.018768+/−0.003726) 5.036657!
*DvDvvuDv 13.311661% (2) (0.133117+/−0.019943) 6.675011!

*dUdu*dvUd*Uv −3.891551% (2) (−0.038916+/−0.009378) −4.149507!

*vuddv^vU 5.007620% (2) (0.050076+/−0.000963) 51.991377!

*Duduu^UDd 1.822467% (5) (0.018225+/−0.004630) 3.936471!

**U^^d*vuDUU*D −2.465729% (2) (−0.024657+/−0.002542) −9.698499!

*^^uvDu^D 2.818630% (2) (0.028186+/−0.000000) inf!

*UuUDvUuDd^ 2.411827% (2) (0.024118+/−0.004727) 5.102022!

*^v^vdv 4.886654% (2) (0.048867+/−0.007403) 6.601344!

*vdduDvu^ 0.475966% (2) (0.004760+/−0.000000) inf!

**ddDDUvUd*v*D 0.310695% (2) (0.003107+/−0.000000) inf!

*uDUu^^DduDU −2.102054% (3) (−0.021021+/−0.004831) −4.351543!

**DUd*dDuUUu^U 1.652027% (3) (0.016520+/−0.006169) 2.678120!

**U^UD^vdd −1.813995% (2) (−0.018140+/−0.001472) −12.327052!

*^u^udv 2.390558% (4) (0.023906+/−0.006463) 3.698873!

*DDD^DuUvuu 0.143010% (2) (0.001430+/−0.000370) 3.868573!

*uvDuUdvd^ −0.941715% (2) (−0.009417+/−0.001913) −4.923168!

*D*vDDuv*DDDUd 2.252140% (2) (0.022521+/−0.004631) 4.863354!

*Du^UDddDUvd −0.497876% (2) (−0.004979+/−0.000000) −inf!

*UD^udd^U 1.532443% (3) (0.015324+/−0.006564) 2.334455!

*^vddvuUd −1.231316% (2) (−0.012313+/−0.001263) −9.747323!

*DD*d^v^uD −3.336082% (5) (−0.033361+/−0.013989) −2.384857!

*dDDUud^^UUD 0.682591% (2) (0.006826+/−0.000000) inf!

*^^U^vDDu 2.493449% (3) (0.024934+/−0.006090) 4.094161!

*^UDDuuvUuu 0.404665% (3) (0.004047+/−0.001477) 2.739323!

*^v*vvDdU −3.367379% (2) (−0.033674+/−0.000000) −inf!

*^u^udv 2.390558% (4) (0.023906+/−0.006463) 3.698873!

*^dU*uDdDvDU −0.447908% (2) (−0.004479+/−0.001680) −2.665369!

**uvU^^Dv^* −2.275747% (3) (−0.022757+/−0.009406) −2.419514!

*Duv^ud^dD −3.763843% (2) (−0.037638+/−0.001542) −24.413506!

*D^dUvvvd −6.603955% (2) (−0.066040+/−0.014970) −4.411386!

*vvUUUdUvU 0.365452% (2) (0.003655+/−0.000990) 3.691385!

*DDdvUvUddvd −0.088685% (2) (−0.000887+/−0.000000) −inf!

*UuD*ddv^Dd −2.437445% (2) (−0.024374+/−0.001655) −14.726099!

*vu*Ddv^^ 3.023518% (3) (0.030235+/−0.007119) 4.247345!

*DvvvD^DvUUUDD 1.170460% (2) (0.011705+/−0.004865) 2.405814!

*U*uDD^vDvD −7.768339% (2) (−0.077683+/−0.014315) −5.426603!

*vvvuUU*v −1.709042% (2) (−0.017090+/−0.001360) −12.570336!

*UvduU*vU*ud −3.304727% (2) (−0.033047+/−0.010738) −3.077670!

*^U^vuDDu −4.885324% (4) (−0.048853+/−0.010477) −4.662997!

*uDDuuvuUu*v 1.141382% (2) (0.011414+/−0.000000) inf!

*D^DuddUvU 1.361076% (3) (0.013611+/−0.005561) 2.447350!

*U^uDddDU*ddu −0.274429% (2) (−0.002744+/−0.000060) −45.770984!

*v*U^ud^dd −3.696919% (2) (−0.036969+/−0.010406) −3.552818!

*UuvDvUdUud −3.730337% (2) (−0.037303+/−0.000000) −inf!

*duvuUv^U 0.696587% (2) (0.006966+/−0.001008) 6.909227!

*UvDUUuDDUuD −2.261335% (2) (−0.022613+/−0.000851) −26.581024!

*D^vuDU^u −3.852463% (4) (−0.038525+/−0.011875) −3.244104!

*UDDU^*Uuud^D 0.953714% (2) (0.009537+/−0.000070) 136.421931!

*dD^^UUd^ −2.024072% (2) (−0.020241+/−0.007281) −2.779860!

*u**dDdu^vUU 6.742393% (2) (0.067424+/−0.023860) 2.825756!

*uU^u^^ 1.442772% (3) (0.014428+/−0.001396) 10.333820!

*vvduD*d^* −0.951420% (3) (−0.009514+/−0.003991) −2.384165!

*D^UUU*Du^D 3.765558% (2) (0.037656+/−0.000860) 43.773560!

*U*uuvU*ddduvd −0.854699% (2) (−0.008547+/−0.000000) −inf!

*UuvuvU*^UU 1.458340% (4) (0.014583+/−0.004435) 3.288536!

*dvuDvuuu −1.540014% (2) (−0.015400+/−0.000418) −36.821910!

*Uv*ddUUDvuD 2.850777% (2) (0.028508+/−0.000000) inf!

*UuDduUd^d −0.201068% (2) (−0.002011+/−0.000380) −5.286158!

*^DuvUDUd^DuD* −1.832011% (2) (−0.018320+/−0.000000) −inf!

*U^UD*vuDDdUDv −5.465192% (2) (−0.054652+/−0.014229) −3.840763!

*^UDvvU^Du −1.699836% (2) (−0.016998+/−0.005785) −2.938276!

*dvdvvd −9.588281% (2) (−0.095883+/−0.040309) −2.378719!

*dUuD^vDu 1.383492% (2) (0.013835+/−0.000000) inf!

*Du*dD*uDudvD 1.129105% (4) (0.011291+/−0.001789) 6.312644!

*UdUudvuU^u −0.811833% (2) (−0.008118+/−0.000398) −20.405909!

*uDd^v^ −4.719481% (2) (−0.047195+/−0.004976) −9.483893!

*U^UvUd^d* −1.639801% (2) (−0.016398+/−0.003371) −4.864797!

*vUUv^UvUD 2.152718% (2) (0.021527+/−0.002034) 10.584393!

*^Uvdu^v^v 2.405219% (2) (0.024052+/−0.000000) inf!

*u^U^vU^u −1.469385% (2) (−0.014694+/−0.004849) −3.030118!

*^Ud^uvdu −0.459130% (2) (−0.004591+/−0.000000) −inf!

*udvdvv 4.780590% (4) (0.047806+/−0.014368) 3.327176!

*vUUDU^duvdd 5.615545% (2) (0.056155+/−0.000000) inf!

*^uUvDdDd*DdU 2.215872% (2) (0.022159+/−0.000000) inf!

*duU^uDuD^ −0.293398% (2) (−0.002934+/−0.001193) −2.460016!

*d^Dv*Ddu*d 2.469192% (5) (0.024692+/−0.009379) 2.632707!

*uu^vdUD*d −3.231259% (3) (−0.032313+/−0.010880) −2.970032!

*d^^uDvU*v 1.003909% (2) (0.010039+/−0.000523) 19.193264!

*uD^UdvdUdDd −0.386473% (2) (−0.003865+/−0.000000) −inf!

*^U*Udvdd^ −0.715423% (2) (−0.007154+/−0.000000) −inf!

*Udvu*ddddd 1.740394% (2) (0.017404+/−0.006651) 2.616887!

*vUUDUu^d*uD −0.958228% (3) (−0.009582+/−0.003509) −2.731059!

*UdvUudvuD 0.430721% (3) (0.004307+/−0.001427) 3.018586!

*uuUD^^Duv −0.655256% (2) (−0.006553+/−0.000677) −9.679013!

**vDuDUuD^D 3.557566% (2) (0.035576+/−0.002466) 14.428412!

*u^dDU^*uDu −0.757751% (2) (−0.007578+/−0.002439) −3.106411!

*udUuuvDdDU 1.616851% (2) (0.016169+/−0.005392) 2.998809!

*DvD^d*UU^dUUu −0.944278% (2) (−0.009443+/−0.000453) −20.860436!

*dvDvUuUv −3.321878% (3) (−0.033219+/−0.014064) −2.362021!

*^^^uU^ −3.565060% (4) (−0.035651+/−0.009692) −3.678352!

*^vuvv^ −1.060761% (3) (−0.010608+/−0.003745) −2.832468!

*udDU^*u*^dU −2.976875% (2) (−0.029769+/−0.000521) −57.169698!

*DUuuvudDUD 1.958174% (5) (0.019582+/−0.008016) 2.442815!

**dU^D^Dudd −0.997179% (3) (−0.009972+/−0.004169) −2.391857!

*^^*UDDDdvD 3.588289% (2) (0.035883+/−0.000000) inf!

*Ud^DUvDDu 2.594118% (2) (0.025941+/−0.010563) 2.455927!

**uUuuUvD^U −2.881257% (2) (−0.028813+/−0.004766) −6.045987!

*ddddvdvUv* 1.497052% (2) (0.014971+/−0.002798) 5.349929!

*vuU^uDdu 1.243331% (2) (0.012433+/−0.002142) 5.805863!

*UvdUDUvuDDd* −2.840408% (2) (−0.028404+/−0.003830) −7.416255!

*^vvUvUUU* −2.935222% (2) (−0.029352+/−0.000000) −inf!

*dUvvuvUd^ 0.971670% (2) (0.009717+/−0.001001) 9.708822!

*DUDu^UuduUUDD 0.788247% (2) (0.007882+/−0.002636) 2.990081!

*uDv*UuUddvdD* 4.279659% (2) (0.042797+/−0.015365) 2.785284!

*^^v^UDDvu −5.214930% (2) (−0.052149+/−0.004341) −12.013028!

**UUd^^^U 0.977782% (2) (0.009778+/−0.001534) 6.375707!

*d^^DUuu^ −2.860249% (2) (−0.028602+/−0.000000) −inf!

*^U^UduuUU −1.697865% (2) (−0.016979+/−0.006495) −2.613929!

*^U^v^U^D 2.390559% (2) (0.023906+/−0.010150) 2.355295!

*v^^*ud^U −1.573278% (2) (−0.015733+/−0.000892) −17.633654!

*ddDd*d^uvU 2.141639% (2) (0.021416+/−0.000037) 581.621695!

*vUdv^*^v −7.567166% (3) (−0.075672+/−0.021235) −3.563485!

*vdUUdUvU^D −1.923784% (2) (−0.019238+/−0.006539) −2.941831!

*dU^^u^ −3.366419% (2) (−0.033664+/−0.003740) −9.001493!

*uddD^^U^ −0.861939% (3) (−0.008619+/−0.000213) −40.485753!

*UDvDdUUu*uuDu 5.863765% (2) (0.058638+/−0.000000) inf!

*DDUDudU^UuDD 1.577621% (6) (0.015776+/−0.005974) 2.640633!

*du^^U^ −3.222702% (3) (−0.032227+/−0.008424) −3.825467!

*D^UduvdD^ −2.249482% (2) (−0.022495+/−0.000000) −inf!

*vvduUuud −1.051452% (3) (−0.010515+/−0.002921) −3.600017!

*u^^UdDduD −1.578688% (2) (−0.015787+/−0.005367) −2.941450!

*^^Uvu^ 1.848269% (3) (0.018483+/−0.005243) 3.525449!

*vUvu^^u*u^Dv 2.341771% (2) (0.023418+/−0.000000) inf!

*dUv*^D^^U 4.117643% (2) (0.041176+/−0.000000) inf!

*^ddd*uuuUuU −1.057798% (3) (−0.010578+/−0.003730) −2.835872!

*d^vvvD^DD 1.817041% (2) (0.018170+/−0.002639) 6.885355!

*dvv**uddDd −2.610591% (3) (−0.026106+/−0.004500) −5.800906!

*^dd^*dDuDU 1.513785% (3) (0.015138+/−0.005015) 3.018291!

*uu^^^v −3.434289% (2) (−0.034343+/−0.001313) −26.151261!

*Uddvuvdd 0.861179% (2) (0.008612+/−0.000531) 16.230475!

*ddu^vdUUD 1.224524% (2) (0.012245+/−0.005297) 2.311878!

*u^^^Uu −1.268514% (3) (−0.012685+/−0.002954) −4.294342!

*uuD^uUuuUu −0.834972% (2) (−0.008350+/−0.001026) −8.138703!

*DU^UuUDdu^ 1.615593% (2) (0.016156+/−0.002285) 7.070979!

*v^duvuD*D 2.944778% (2) (0.029448+/−0.012273) 2.399342!

*^Dd*Uvd^UD −4.632024% (2) (−0.046320+/−0.018420) −2.514671!

*d*D^UUUv^uu 1.002613% (2) (0.010026+/−0.000000) inf!
*vUDvUD*DvDU −3.853254% (2) (−0.038533+/−0.005962) −6.462845!
*^U^u^^ −3.852472% (2) (−0.038525+/−0.002466) −15.621823!
*UuDUduv^^DU 0.692047% (2) (0.006920+/−0.000000) inf!
*vdUd^Dvu 2.626279% (2) (0.026263+/−0.005172) 5.078029!
*uvD*Dvv**UuuU 3.305763% (2) (0.033058+/−0.002462) 13.426855!
*DdDDvDvdu 3.558345% (2) (0.035583+/−0.009261) 3.842158!
*v*^Uvu^u 2.843418% (3) (0.028434+/−0.006998) 4.063284!
*DdDUuUvUUv −4.185959% (2) (−0.041860+/−0.015092) −2.773578!
*Dd^vDuDDU −1.493297% (2) (−0.014933+/−0.005416) −2.757089!
*duDduvuv^ −0.334450% (2) (−0.003345+/−0.000000) −inf!
*UDD*v^^*U^ 6.195134% (2) (0.061951+/−0.022484) 2.755333!
*uv^d^d^v* −0.174220% (2) (−0.001742+/−0.000000) −inf!
*DDd^v*D^D^U −1.043315% (2) (−0.010433+/−0.004279) −2.438158!
*UUdUu^vDu 3.909249% (3) (0.039092+/−0.015917) 2.456009!
*uDDU^vdUd 1.836007% (2) (0.018360+/−0.002835) 6.475319!
*UvdDDdDDv 1.886546% (2) (0.018865+/−0.005595) 3.372027!
*uDuddu^D*uDD* 0.170624% (2) (0.001706+/−0.000638) 2.675261!
*vDuddU^U* 4.484445% (4) (0.044844+/−0.011502) 3.898807!
*UuD^vd*d*u −1.057196% (2) (−0.010572+/−0.000495) −21.362991!
*vd^UDUDd*d 1.331094% (2) (0.013311+/−0.004288) 3.104395!
*uvD^uDuDU 0.725692% (2) (0.007257+/−0.000000) inf!
*vd*uUDDud^^ −0.330169% (2) (−0.003302+/−0.000000) −inf!
*U^uvUdDDU −3.701760% (3) (−0.037018+/−0.013504) −2.741153!
*Dd*^^dUuu −1.313204% (2) (−0.013132+/−0.001959) −6.703610!
*^vDdU^Ud 1.070661% (2) (0.010707+/−0.000000) inf!
*vddDu^uDudD −2.012495% (2) (−0.020125+/−0.001677) −12.003946!
*U^uUUvUuU 2.436104% (3) (0.024361+/−0.009926) 2.454355!
*v^uvddUD −2.453262% (3) (−0.024533+/−0.008525) −2.877857!
*udD^*dUDuvU −1.908308% (2) (−0.019083+/−0.001895) −10.072227!
*v^Dvud*^v −2.302298% (2) (−0.023023+/−0.000000) −inf!
*DddDddvv 6.794911% (2) (0.067949+/−0.024028) 2.827942!
*vdUuvuvu 2.730533% (4) (0.027305+/−0.001736) 15.731269!
*^Dd^DvudU 1.633349% (2) (0.016333+/−0.000799) 20.449689!
**^uu^^U*u −0.610834% (2) (−0.006108+/−0.000350) −17.448836!
*Uuddvdvd 3.313783% (4) (0.033138+/−0.003410) 9.718678!
*DUDDuDUDUuUv −1.018838% (2) (−0.010188+/−0.001017) −10.014172!
*D*uuuuvDvD −0.558249% (2) (−0.005582+/−0.000000) −inf!
*uDUv^udU −2.029585% (2) (−0.020296+/−0.005034) −4.031917!
*^uvvv^DuU 1.139604% (2) (0.011396+/−0.000000) inf!
*v^vUuD^d 3.878452% (5) (0.038785+/−0.011934) 3.249959!
*DUDvDU^vD^ 4.601550% (3) (0.046015+/−0.008285) 5.554210!
*Dvvuv^dD 2.341483% (2) (0.023415+/−0.006559) 3.569822!
*uDuUdvu^ −1.807514% (2) (−0.018075+/−0.004083) −4.427409!
**D*UddvdvdU −2.206632% (2) (−0.022066+/−0.001477) −14.937806!
**^vu^Ddu −2.482092% (3) (−0.024821+/−0.007214) −3.440653!
*vDDvuuuD −2.503151% (2) (−0.025032+/−0.000369) −67.838803!
*vU^Uv^U^u −2.969095% (2) (−0.029691+/−0.000000) −inf!
*vDdUvuuvD −6.267158% (2) (−0.062672+/−0.000000) −inf!
*d^vUvDuDu 4.792075% (2) (0.047921+/−0.017445) 2.746913!
*D^U^dvuUD^* −2.516235% (2) (−0.025162+/−0.000000) −inf!
*UdudUUd^D 0.961308% (6) (0.009613+/−0.002502) 3.841917!
*vvv^^uv^ −0.868752% (2) (−0.008688+/−0.000617) −14.089202!
*U^vD^Dudd −1.569537% (2) (−0.015695+/−0.004132) −3.798663!
*^v^vdv 4.886654% (2) (0.048867+/−0.007403) 6.601344!
*dvu^^D*U −0.987962% (2) (−0.009880+/−0.001171) −8.433951!
*vuuv**vUu 4.459862% (2) (0.044599+/−0.000000) inf!
*UdvUd^^d 1.669380% (2) (0.016694+/−0.004823) 3.461481!
*v*du^U*vU −0.403764% (2) (−0.004038+/−0.000512) −7.878578!
*^UD**UdUUvuu* 0.751101% (2) (0.007511+/−0.001185) 6.339336!
*DDDuUDU^vv −4.683655% (2) (−0.046837+/−0.005995) −7.812500!
*UvvduvuuU −2.935691% (2) (−0.029357+/−0.000000) −inf!
*DDuvu^DUvu 2.510461% (2) (0.025105+/−0.000000) inf!
*u^dd^uuvDD −0.991848% (2) (−0.009918+/−0.000000) −inf!
*vd^UUvdD 3.297677% (2) (0.032977+/−0.007649) 4.311339!
*vDvUuuuvuU 3.764864% (2) (0.037649+/−0.014428) 2.609476!
*^vuvdvU^ 4.935873% (2) (0.049359+/−0.001143) 43.170103!
*ddddDUuuvUuu −1.655871% (2) (−0.016559+/−0.000000) −inf!

*^vUD^uDud* −1.510520% (4) (−0.015105+/−0.002929) −5.156572!

*vd*^^vdUU −1.983684% (2) (−0.019837+/−0.007882) −2.516578!

*vuU**Duu^v* −2.100557% (3) (−0.021006+/−0.005632) −3.729444!

*vv^^DUvd −1.242790% (2) (−0.012428+/−0.000000) −inf!

*ddUD^udUddd −1.175359% (2) (−0.011754+/−0.004614) −2.547440!

*udUuDduD^UdD 1.997998% (2) (0.019980+/−0.000468) 42.719918!

*DvuUd^UuUDu 4.697343% (2) (0.046973+/−0.000000) inf!

*uvUUD^Ud^ −4.794678% (2) (−0.047947+/−0.006027) −7.954716!

*UvvvvD^u 0.963661% (2) (0.009637+/−0.002627) 3.668206!

*u*UD^^dd^d*^ −1.748223% (2) (−0.017482+/−0.004954) −3.529152!

*dd*^Dd^vU −1.789921% (2) (−0.017899+/−0.004090) −4.375847!

*Dvv^DvUdUu 2.344196% (2) (0.023442+/−0.000000) inf!

*^D^ddvDud 1.311352% (2) (0.013114+/−0.001096) 11.960479!

*^^^UUv^^ −3.874514% (3) (−0.038745+/−0.012837) −3.018227!

*UUvuvD^^ −2.524697% (2) (−0.025247+/−0.010909) −2.314257!

*uU*d*d^^^ 2.901206% (2) (0.029012+/−0.007503) 3.866890!

*^^Dvv^^D 1.870142% (2) (0.018701+/−0.007958) 2.349895!

*udvud^v* −2.675820% (2) (−0.026758+/−0.009040) −2.959953!

*DUudvUuuUv −2.908046% (2) (−0.029080+/−0.012505) −2.325591!

*^*U^uDU^vU 3.316103% (2) (0.033161+/−0.002373) 13.976512!

*^dDud^u^ −2.228191% (2) (−0.022282+/−0.002049) −10.876212!

*^^*U^duvU −1.142640% (2) (−0.011426+/−0.003674) −3.110324!

**^UvDuuUDd 2.118006% (2) (0.021180+/−0.006473) 3.272145!

*^uDUUD^dudU −2.663303% (2) (−0.026633+/−0.002279) −11.687673!

*^udv^^ −1.732582% (2) (−0.017326+/−0.000790) −21.933999!

*uvdD^vuUU 5.391740% (2) (0.053917+/−0.002453) 21.976700!

*D^DDdvvvd 0.985620% (2) (0.009856+/−0.001939) 5.081993!

*D^UvDduuu −4.046666% (2) (−0.040467+/−0.006281) −6.442977!

*D^U^^DuUU −1.089087% (3) (−0.010891+/−0.002726) −3.994923!

*DvvDddud 2.956976% (2) (0.029570+/−0.000705) 41.945529!

*vUU^vuv^^ −1.625819% (2) (−0.016258+/−0.003453) −4.708421!

*Uduvdd^vD −0.958979% (2) (−0.009590+/−0.000000) −inf!

*DuDUvDdUDUduu 1.220644% (2) (0.012206+/−0.000881) 13.862782!

*uUUduvUUD^*u −1.527031% (2) (−0.015270+/−0.004093) −3.730968!

*d^DdD*^DUDDvd −0.088685% (2) (−0.000887+/−0.000000) −inf!

*uU*dvDuU^D 0.374378% (3) (0.003744+/−0.000758) 4.939347!

*dU*D^v^Dv −2.082326% (2) (−0.020823+/−0.000000) −inf!

*DUduU^vuD −1.274246% (2) (−0.012742+/−0.002412) −5.283314!

*^^D^D^uU −2.258931% (6) (−0.022589+/−0.007482) −3.019161!

*U^^u^^ −3.852472% (2) (−0.038525+/−0.002466) −15.621823!

*DDudv*U^*^v −0.309733% (2) (−0.003097+/−0.000000) −inf!

*^^udDvU^**d 5.876444% (2) (0.058764+/−0.000000) inf!

*Dvu^^Uuu 6.686737% (3) (0.066867+/−0.017155) 3.897894!

*u^^*dUdUvDu −0.672188% (2) (−0.006722+/−0.000000) −inf!

*dDvUvuuv −3.259161% (2) (−0.032592+/−0.000000) −inf!

*vUDuvdD^u −2.524660% (2) (−0.025247+/−0.000000) −inf!

*D^*vduUDd^ 2.683662% (2) (0.026837+/−0.006632) 4.046384!

*Dd^^^ddDU −0.212488% (2) (−0.002125+/−0.000000) −inf!

*DDu^ud^^*d 1.626823% (2) (0.016268+/−0.003530) 4.608874!

*Ud^vUvvu*U 4.792075% (2) (0.047921+/−0.017445) 2.746913!

*d*UdUDv^dvv 3.256291% (2) (0.032563+/−0.002586) 12.591485!

*Dduvd^UdD 2.159833% (3) (0.021598+/−0.006652) 3.246724!

*U^UD^v^DU −2.614254% (2) (−0.026143+/−0.001679) −15.572063!

*UUduuu^uuDd −2.115382% (2) (−0.021154+/−0.006932) −3.051770!

*DuD^d^u^Dv 0.236235% (2) (0.002362+/−0.000000) inf!

*Uuuuu^DuD −2.327529% (2) (−0.023275+/−0.000165) −141.189993!

*ddDvUuvdD 2.070334% (2) (0.020703+/−0.007871) 2.630355!

*Uv^DUDvDUD 3.291295% (3) (0.032913+/−0.008189) 4.019407!

*vuU^dUUddd −2.021881% (2) (−0.020219+/−0.002197) −9.202877!

*dddvvu**uUvD −0.853510% (2) (−0.008535+/−0.000569) −15.011502!

*DvDdUduDdd 0.814483% (2) (0.008145+/−0.001817) 4.481706!

*uv^dUDDUu 1.749795% (2) (0.017498+/−0.003764) 4.648389!

*uU^dU^vD 0.643890% (2) (0.006439+/−0.001091) 5.901099!

*^UuDD^dv 1.076005% (3) (0.010760+/−0.002141) 5.025201!

*^*UDU*UdUU^U 0.395153% (2) (0.003952+/−0.001513) 2.612015!

*UD*UddUvvD −2.103809% (2) (−0.021038+/−0.000669) −31.455820!

*dDd^UuUUv 1.397307% (3) (0.013973+/−0.002410) 5.796804!

*duDvUU**uu^U −1.160714% (2) (−0.011607+/−0.003896) −2.979159!

*^vD^DDvD^ −4.571668% (2) (−0.045717+/−0.011084) −4.124405!

*D*vDUudddUv 2.019006% (2) (0.020190+/−0.000403) 50.090689!

*^DuD*^U**duDU −0.699944% (2) (−0.006999+/−0.002511) −2.787751!

*vuDuUdDuDu*d 0.266115% (2) (0.002661+/−0.000824) 3.227837!

*vUDdudUvUU −0.606785% (3) (−0.006068+/−0.001391) −4.361955!

*UUv*d^ddudD 1.721002% (2) (0.017210+/−0.001898) 9.069184!

*^dUdudu*Duv 1.916568% (2) (0.019166+/−0.006379) 3.004483!

*dvU*uudDUDu −1.279412% (4) (−0.012794+/−0.005389) −2.374229!

**u^^d^uv 3.590742% (2) (0.035907+/−0.013015) 2.758925!

*^U*v*^ddUdDD^ 4.733732% (2) (0.047337+/−0.000000) inf!

*vDuuvdu^* −1.377628% (2) (−0.013776+/−0.001544) −8.922258!

*dvU^uUvdD 2.553385% (2) (0.025534+/−0.002877) 8.875079!

*uvDvDdUvv 2.498838% (2) (0.024988+/−0.000000) inf!

*v^d^vUvDU* −5.046716% (2) (−0.050467+/−0.021513) −2.345896!

*v^^DUudu 1.692115% (2) (0.016921+/−0.006595) 2.565756!

*D^^DUdDDd 1.959788% (3) (0.019598+/−0.004602) 4.258139!

*D*uDUDu^udD*U −0.528322% (2) (−0.005283+/−0.000873) −6.048596!

*vuvuUD^dddud 0.046818% (2) (0.000468+/−0.000000) inf!

*vdUD*vdd^ 3.072455% (2) (0.030725+/−0.004252) 7.225921!

*vv^uvu 3.192232% (2) (0.031922+/−0.006900) 4.626675!

*UdUvuDUUvu −1.965707% (2) (−0.019657+/−0.006694) −2.936660!

*DdvUUDuUUd −1.232045% (3) (−0.012320+/−0.004403) −2.798469!

*UuuvDd^^ −2.602512% (2) (−0.026025+/−0.005699) −4.566896!

*UDD*^^d*uvUU 2.321420% (2) (0.023214+/−0.004167) 5.571016!

**^vUDdudd −0.279424% (2) (−0.002794+/−0.000183) −15.229173!

*uDvUu^^DU −4.977448% (4) (−0.049774+/−0.018690) −2.663149!

*Dd^D^^D^D −2.671200% (3) (−0.026712+/−0.009009) −2.965105!

*vv^uvu 3.192232% (2) (0.031922+/−0.006900) 4.626675!

*Uv*vvdDU*UD 1.002143% (2) (0.010021+/−0.000000) inf!

*D^UdvUvd^ −3.148468% (2) (−0.031485+/−0.009471) −3.324491!

*vdDDvdUv −3.957859% (2) (−0.039579+/−0.001960) −20.192674!

*DDUu^^uuuDUU 0.087300% (2) (0.000873+/−0.000000) inf!

*vDdUUvDuuD −1.228147% (2) (−0.012281+/−0.004485) −2.738606!

*D^dU^U^du^ 3.981966% (2) (0.039820+/−0.000000) inf!

*udUvddU^^^ 4.626947% (2) (0.046269+/−0.000000) inf!

**ud^duvU^D 3.698593% (2) (0.036986+/−0.000000) inf!

*u^d^^^ −2.708855% (2) (−0.027089+/−0.008138) −3.328560!

*^^Uvu^ 1.848269% (3) (0.018483+/−0.005243) 3.525449!

*UUD*vvvvU^u −0.943893% (2) (−0.009439+/−0.000000) −inf!

*DuD^UDdUvu 3.465980% (2) (0.034660+/−0.000000) inf!

*Uu*^vuUuDDdd 2.127808% (2) (0.021278+/−0.008967) 2.373015!

*^uDUvddUd** −1.337038% (2) (−0.013370+/−0.001695) −7.889170!

*DD^^DD^vd −4.659715% (2) (−0.046597+/−0.009800) −4.754668!

*^d^vDvU^UuD −2.051007% (2) (−0.020510+/−0.006396) −3.206547!

*dUDvUu*DvUU 2.132007% (2) (0.021320+/−0.005676) 3.756424!

*DDd*Uv^UDD*U 1.413341% (2) (0.014133+/−0.001279) 11.052304!

*D^UdUuDUuUd −1.106462% (4) (−0.011065+/−0.003802) −2.910317!

*dvvDDuDDd 5.785650% (2) (0.057857+/−0.011668) 4.958758!

*Du^^UdUv*d −1.849040% (2) (−0.018490+/−0.001967) −9.399486!

*^*v^D^DUvU^ −2.259508% (2) (−0.022595+/−0.003919) −5.765300!

*uvvD*D^UuvU −2.088485% (2) (−0.020885+/−0.003871) −5.395286!

*UvuduD^u −1.580219% (2) (−0.015802+/−0.005322) −2.969431!

*UUvu*U*^vd 3.000043% (2) (0.030000+/−0.005838) 5.138812!

*v^^^du −1.761896% (2) (−0.017619+/−0.005239) −3.363211!

*dv^vUDDUu 2.248350% (2) (0.022483+/−0.001720) 13.070472!

*vd^^Dud* −2.389594% (3) (−0.023896+/−0.010169) −2.349775!

*uDUv*duv^d 2.020633% (2) (0.020206+/−0.000000) inf!

*DDvDd^Dv*U^ −1.236889% (2) (−0.012369+/−0.000211) −58.722326!

*vUvDvduv −3.103320% (2) (−0.031033+/−0.000451) −68.812927!

*uDd^v^ −4.719481% (2) (−0.047195+/−0.004976) −9.483893!

*U^uDudvUuuU** 1.536548% (2) (0.015365+/−0.000000) inf!

*Dd*UvdUdvd 1.638845% (2) (0.016388+/−0.005412) 3.027916!

*u^^^*dd^ 5.074406% (2) (0.050744+/−0.000000) inf!

**d*UuUdDvDv −1.205283% (4) (−0.012053+/−0.002952) −4.082658!

*U*uU^^vdD 2.592714% (2) (0.025927+/−0.010841) 2.391616!

*^dDvud*^ −2.732202% (2) (−0.027322+/−0.006942) −3.935477!
*^ud^^^ −1.603708% (3) (−0.016037+/−0.006193) −2.589567!
*v^Dvduuv −0.654274% (2) (−0.006543+/−0.001562) −4.189575!
*u*^ddDvdd 1.854406% (5) (0.018544+/−0.007886) 2.351408!
*UDd^vduU*d −4.085806% (2) (−0.040858+/−0.003803) −10.744808!
*vvDuDdudd 2.075839% (2) (0.020758+/−0.002391) 8.682570!
*dU*dd^U^Uu 1.932432% (4) (0.019324+/−0.005524) 3.498114!
*DduduuDU^DU 0.851311% (2) (0.008513+/−0.003505) 2.429168!
*uUvUvudd −2.541276% (2) (−0.025413+/−0.002771) −9.172079!
*UDU^^vuv 2.873899% (3) (0.028739+/−0.009907) 2.900918!
*vu^uDd*uU −1.420273% (2) (−0.014203+/−0.000968) −14.666060!
*vU^**UUUudU −2.714148% (2) (−0.027141+/−0.005571) −4.871532!
*DdU*Uv^UdDu* −1.900110% (2) (−0.019001+/−0.006337) −2.998306!
*d*udv^U*uU 1.726358% (2) (0.017264+/−0.004468) 3.863407!
*^UuuDDUvD 3.108409% (3) (0.031084+/−0.012444) 2.497940!
*vudUuvdDd 0.130070% (2) (0.001301+/−0.000512) 2.539270!
*uu^^vv 2.520080% (2) (0.025201+/−0.009040) 2.787810!
**uu^*vuu^ 0.449533% (2) (0.004495+/−0.000000) inf!
*v^UUUDuUd*^ −1.081754% (2) (−0.010818+/−0.002941) −3.678778!
**UuU^DvUUv −5.367790% (2) (−0.053678+/−0.022816) −2.352623!
*u^vDuvuUD* −1.180913% (2) (−0.011809+/−0.000142) −83.170640!
*vd^uDUD^U −3.249047% (2) (−0.032490+/−0.000300) −108.482089!
*^vd*vuud −1.231316% (2) (−0.012313+/−0.001263) −9.747323!
*^vv*Uvv*u −2.819739% (2) (−0.028197+/−0.012141) −2.322425!
**uUv^uvvD −4.697565% (2) (−0.046976+/−0.019143) −2.453941!
**duvuUUDuvd 0.567719% (2) (0.005677+/−0.000000) inf!
*Uvdv^UDDd −1.453672% (2) (−0.014537+/−0.003392) −4.285568!
*U^dUdUd^DU −3.123705% (2) (−0.031237+/−0.003050) −10.240352!
*^vvUuvd^ −2.188474% (2) (−0.021885+/−0.003426) −6.387189!
*DuuU*^DD*Uv^ −3.169895% (2) (−0.031699+/−0.005711) −5.550693!
*vdu*Udu^DD −2.841032% (4) (−0.028410+/−0.005125) −5.543473!
*uvD*DuUUvD −0.868813% (2) (−0.008688+/−0.000785) −11.067849!
*dvUv^D*DUd 2.864434% (2) (0.028644+/−0.004028) 7.110767!
**U^Uu*Ud^uU −0.954121% (2) (−0.009541+/−0.003140) −3.038819!
*DUDDuU^d^u −1.883958% (2) (−0.018840+/−0.000393) −47.900025!
*DuU^uvU* 1.556835% (2) (0.015568+/−0.004625) 3.365915!
*dD^DuUDD^d −1.559616% (2) (−0.015596+/−0.006690) −2.331290!
*v*DU^vDd^^DU 7.611152% (2) (0.076112+/−0.019114) 3.982055!
*vu^dDUvu −1.600674% (2) (−0.016007+/−0.000370) −43.254935!
*^dvUUUvu* −0.995165% (2) (−0.009952+/−0.003552) −2.801641!
*Dd*d*vd^d*Uu 3.522715% (3) (0.035227+/−0.010304) 3.418631!
**u^vUu^d 2.928925% (3) (0.029289+/−0.012014) 2.437928!
*^D^UduUDv 2.351638% (2) (0.023516+/−0.002869) 8.196323!
*^uu^vUdU −1.443343% (2) (−0.014433+/−0.000202) −71.444481!
*U*UuvUvdd^ −3.284166% (2) (−0.032842+/−0.001905) −17.235325!
*DDvuU^^DDd^ 5.074406% (2) (0.050744+/−0.000000) inf!
*vv^vv*DUuu −2.419752% (2) (−0.024198+/−0.000000) −inf!
*dudUvud^D −1.940307% (2) (−0.019403+/−0.003083) −6.294478!
*DU^Ud*DD^dv* −3.926730% (2) (−0.039267+/−0.004835) −8.121752!
*vDuUvUUuD −2.306968% (3) (−0.023070+/−0.006995) −3.297841!
*^DuUDU^v*U −1.147169% (2) (−0.011472+/−0.000148) −77.551135!
*udUvdD^u*v 0.371579% (2) (0.003716+/−0.000187) 19.863061!
**vDduvuUvd −6.267158% (2) (−0.062672+/−0.000000) −inf!
*DUdu^D*vuUU 2.480243% (2) (0.024802+/−0.008359) 2.967001!
*uuDdUv^UU 1.025393% (2) (0.010254+/−0.000400) 25.641466!
*dvDd^UD*dd −1.082245% (2) (−0.010822+/−0.000000) −inf!
*Ddvd*^dDDu 2.907597% (2) (0.029076+/−0.008978) 3.238432!
*vvDu*dvvU −3.280195% (2) (−0.032802+/−0.006080) −5.395286!
*uuuvUu^v*v 1.563356% (2) (0.015634+/−0.004117) 3.797655!
*Dd^DvDv^ −3.827684% (3) (−0.038277+/−0.015083) −2.537808!
*DuuvUvUd −2.759451% (3) (−0.027595+/−0.004465) −6.180017!
*u^D^dUDdv 1.345334% (2) (0.013453+/−0.005717) 2.353055!
*UDDUddvDDDUU* 7.312033% (2) (0.073120+/−0.001977) 36.988001!
*UD^^^^^DD −10.455056% (2) (−0.104551+/−0.003313) −31.554704!
*vvvddv 2.208955% (3) (0.022090+/−0.009139) 2.417029!
*duDvDUv^ −1.873401% (3) (−0.018734+/−0.006514) −2.876001!
*dd^dduduuu −0.347827% (2) (−0.003478+/−0.000000) −inf!

*U^d*Uu^U^ 1.965472% (2) (0.019655+/−0.001802) 10.909169!
*UdvuvUvDv^ 0.435819% (2) (0.004358+/−0.000000) inf!
**U^^UvU^vu 8.339608% (2) (0.083396+/−0.035956) 2.319368!
*v*U^uv*UDUd^ 0.478471% (2) (0.004785+/−0.000000) inf!
*u^U^^^ −1.074696% (2) (−0.010747+/−0.001216) −8.834334!
*vUvDdv*^vd* 8.789163% (2) (0.087892+/−0.031607) 2.780735!
*UUuv*vuUUUUU 7.677166% (2) (0.076772+/−0.000000) inf!
*Uuv*uDUv^ −2.663750% (2) (−0.026637+/−0.000000) −inf!
*^udUDDvv*D 2.495216% (2) (0.024952+/−0.009708) 2.570378!
*DuuD^D*^v −2.364902% (2) (−0.023649+/−0.001900) −12.447819!
*d^v^u^ −1.897518% (2) (−0.018975+/−0.003477) −5.457214!
*uvuuDdv^ −1.382245% (2) (−0.013822+/−0.000000) −inf!
*vDu*Udvdd −0.821760% (2) (−0.008218+/−0.001690) −4.862307!
*UDDdd*v*D*UvU −2.310311% (2) (−0.023103+/−0.004497) −5.136987!
*^vD^Uvvu −1.499973% (2) (−0.015000+/−0.005416) −2.769571!
*uDuduUddU^v 0.793947% (2) (0.007939+/−0.000000) inf!
*^dDvU^vu −0.035753% (2) (−0.000358+/−0.000000) −inf!
*U^v^U^uD −2.959620% (2) (−0.029596+/−0.000000) −inf!
*DU*DduDd^dv −0.657503% (2) (−0.006575+/−0.000585) −11.238970!
*D^Uv^dv^^D 3.978438% (3) (0.039784+/−0.000894) 44.516725!
*D*^D^*uudUdu 2.202028% (2) (0.022020+/−0.005739) 3.836855!
*vuUvU^dDdu −2.442530% (2) (−0.024425+/−0.000000) −inf!
*UUDD^dUd^ddU 1.305801% (2) (0.013058+/−0.000000) inf!
*dvu*DvuU^U 1.722905% (2) (0.017229+/−0.002094) 8.226035!
*v^UuUvUv −5.224054% (3) (−0.052241+/−0.021893) −2.386163!
*vDD^UuDDu −1.415079% (2) (−0.014151+/−0.004620) −3.062892!
*U^vdUDvDd 1.777718% (2) (0.017777+/−0.003306) 5.377145!
*UU^vUDduvD −1.219125% (3) (−0.012191+/−0.004907) −2.484581!
*v*^*UUUudv −1.702640% (2) (−0.017026+/−0.005407) −3.149053!
*uD^uuvuDu* 0.871663% (3) (0.008717+/−0.002476) 3.520488!
*dd^dUDvvD 3.964526% (2) (0.039645+/−0.010900) 3.637250!
*DUDvUDUd*Ddv −2.286436% (2) (−0.022864+/−0.000881) −25.961640!
*^DdD^dDDv −0.755000% (2) (−0.007550+/−0.000744) −10.149202!
*Dddd*v^Dv 3.611189% (2) (0.036112+/−0.005042) 7.162022!
*U*v^vU*vuvv 12.063017% (2) (0.120630+/−0.020707) 5.825502!
*UuuUUdDUv^ 3.309287% (2) (0.033093+/−0.013396) 2.470317!
*^D^uuDddu −0.666341% (2) (−0.006663+/−0.000839) −7.945438!
*dudDv^vU 2.878732% (2) (0.028787+/−0.004726) 6.090861!
*v*UUUDUduUUvu 3.263658% (2) (0.032637+/−0.000000) inf!
*^U^uvd*u^^ 0.271739% (2) (0.002717+/−0.000000) inf!
*u^^^Uu −1.268514% (3) (−0.012685+/−0.002954) −4.294342!
*^u^dudUDd −1.111800% (3) (−0.011118+/−0.003003) −3.702662!
*DUUUuUDDdvuU 1.353119% (2) (0.013531+/−0.000883) 15.327828!
*^D*DDUud^dDD 2.573482% (2) (0.025735+/−0.007628) 3.373872!
*d^ddUdDDDd 1.315547% (2) (0.013155+/−0.003880) 3.390432!
*UDu^*U^v* −1.362005% (2) (−0.013620+/−0.000832) −16.364209!
*vDDuvuuuDD* 2.200589% (3) (0.022006+/−0.008343) 2.637664!
*dudDUD^vDd 1.075600% (4) (0.010756+/−0.003344) 3.216240!
*dD^u^uuU 2.742524% (2) (0.027425+/−0.005987) 4.580844!
*^U^v^^vU 8.339608% (2) (0.083396+/−0.035956) 2.319368!
*UvuUv^du 0.670289% (2) (0.006703+/−0.000270) 24.803766!
*^^UddUDudD 1.758133% (2) (0.017581+/−0.005603) 3.137594!
*^vudd^ −3.925500% (2) (−0.039255+/−0.010601) −3.702874!
*uDvUU*Uuu^ 1.820108% (3) (0.018201+/−0.006277) 2.899786!
*^vd^^v 3.574288% (2) (0.035743+/−0.004036) 8.856702!
*dvdv*udUuD 3.138265% (2) (0.031383+/−0.003172) 9.893359!
*D^uvdD^D −1.616206% (3) (−0.016162+/−0.001472) −10.980143!
*dDU^Uvv^ −0.737696% (2) (−0.007377+/−0.002368) −3.115435!
*UdDu^dvd −2.052265% (2) (−0.020523+/−0.006707) −3.060099!
*ud*v*d^uUv 0.312328% (2) (0.003123+/−0.001025) 3.047053!
*UDu^U*Du^^ud −1.008648% (2) (−0.010086+/−0.000000) −inf!
**vU*vuD^v*d 5.205319% (2) (0.052053+/−0.019910) 2.614419!
*DdUDddUvudD 1.556004% (4) (0.015560+/−0.004616) 3.371155!
*^DU^^UU^U −6.694292% (2) (−0.066943+/−0.010974) −6.099990!
*uU^U^^Ud 2.746898% (2) (0.027469+/−0.000000) inf!
*uv*D^d^DuD 0.977315% (2) (0.009773+/−0.000000) inf!
*U^UdduU^D −0.525815% (2) (−0.005258+/−0.000599) −8.775861!

*Ddddu vu^ 0.902711% (2) (0.009027+/−0.002381) 3.791145!
*^D^^dDvDd 3.856906% (2) (0.038569+/−0.000000) inf!
*DUUUDDd^vd^D 0.884336% (2) (0.008843+/−0.000743) 11.901508!
*ddduD^^v −1.876139% (2) (−0.018761+/−0.006865) −2.732734!
*udv^v^ 2.569904% (2) (0.025699+/−0.002940) 8.741909!
*uUUddvudv 2.315798% (3) (0.023158+/−0.006618) 3.499378!
*^D*^d^^UU 1.079949% (3) (0.010799+/−0.003312) 3.260362!
**d^uvdUUdDu 2.488967% (2) (0.024890+/−0.000266) 93.715674!
*vuDU^uuuv −1.508014% (2) (−0.015080+/−0.000731) −20.624180!
*UdvUd^^d 1.669380% (2) (0.016694+/−0.004823) 3.461481!
*U^Uvv^*UU 3.245120% (2) (0.032451+/−0.002237) 14.504193!
*DuUUDdvDUDd 1.739235% (3) (0.017392+/−0.005825) 2.985766!
*vvDuduDu 1.368793% (2) (0.013688+/−0.000000) inf!
*^DvDd^DU −1.413095% (3) (−0.014131+/−0.003075) −4.595321!
*u^Ud*u^Dd −1.805240% (3) (−0.018052+/−0.005406) −3.339314!
*v*Uddd^*^*u 2.264810% (2) (0.022648+/−0.000000) inf!
*dvvUuuUv −2.214962% (2) (−0.022150+/−0.000000) −inf!
*^UuuvdUv −1.219095% (2) (−0.012191+/−0.004869) −2.503857!
*vDu^D^UuU 5.329713% (2) (0.053297+/−0.007816) 6.819344!
*Uvu*UUvvd 3.819254% (2) (0.038193+/−0.010529) 3.627396!
*^DdDvU*UDDv −1.999135% (2) (−0.019991+/−0.000000) −inf!
*duvDUD^uD 1.467557% (2) (0.014676+/−0.004305) 3.408991!
*^UdDu^d^ 4.145668% (2) (0.041457+/−0.013587) 3.051283!
*uDu^^^*^ −1.145450% (2) (−0.011454+/−0.002217) −5.166405!
*DDvUvUUdd* −2.624503% (4) (−0.026245+/−0.007451) −3.522521!
*vvddvD 4.159041% (2) (0.041590+/−0.001027) 40.515584!
*U^dvdd*uD −2.525743% (4) (−0.025257+/−0.006538) −3.863294!
*^dd^^duDU 2.683668% (2) (0.026837+/−0.006635) 4.044617!
*uuvvUdDDU −4.810481% (3) (−0.048105+/−0.013722) −3.505736!
*vUddDvv^ 11.221716% (2) (0.112217+/−0.014509) 7.734426!
*uU^u^^ 1.442772% (3) (0.014428+/−0.001396) 10.333820!
*u^^^uu −1.268514% (3) (−0.012685+/−0.002954) −4.294342!
*Dd*vdv*DUDu 2.180341% (2) (0.021803+/−0.000000) inf!
*DdDUuuv^^ 0.307097% (2) (0.003071+/−0.000426) 7.217098!
*uvdu^^ −1.456276% (2) (−0.014563+/−0.000432) −33.727230!
*Du^UDu^*D −1.548836% (4) (−0.015488+/−0.005414) −2.860804!
*u^UdU^DdU 0.440614% (2) (0.004406+/−0.000954) 4.616875!
*dU^uUUUd^DU −1.994679% (2) (−0.019947+/−0.008272) −2.411442!
*^dduUuuDvD 1.098606% (2) (0.010986+/−0.000000) inf!
*U^UudDdDUu −0.339720% (2) (−0.003397+/−0.001095) −3.101104!
*D^UDduUdUv 0.780533% (2) (0.007805+/−0.000000) inf!
*v^dD^^Uv* −4.704538% (2) (−0.047045+/−0.010760) −4.372060!
*vddDU^Uddu −2.172604% (2) (−0.021726+/−0.004063) −5.346715!
*DU^vdUddv 3.665058% (2) (0.036651+/−0.012043) 3.043378!
*uDvvdd^v −6.287940% (2) (−0.062879+/−0.000000) −inf!
*UduD^UvuU −1.784278% (2) (−0.017843+/−0.004550) −3.921212!
*^vv**v*UuDv −2.507491% (2) (−0.025075+/−0.004905) −5.111628!
*uUv^duUu 2.866124% (2) (0.028661+/−0.007224) 3.967737!
*UDv^Udvud 1.923946% (3) (0.019239+/−0.006277) 3.065170!
**U^*DUvUd*uuD 5.844157% (2) (0.058442+/−0.000000) inf!
*DUuu^uuD^uu 1.028208% (2) (0.010282+/−0.000000) inf!
*u*vd^Ddu**DD 2.369097% (2) (0.023691+/−0.008040) 2.946496!
*vuuuU^Uv −1.936011% (2) (−0.019360+/−0.002551) −7.588811!
*vvd*U^du −2.769013% (4) (−0.027690+/−0.011812) −2.344327!
*^^d^vUU^ −1.897518% (2) (−0.018975+/−0.003477) −5.457214!
*vD^vvU^v* 1.772614% (2) (0.017726+/−0.001452) 12.205542!
*DuUUUd^^u −0.931281% (2) (−0.009313+/−0.000269) −34.637047!
*Duu*D^uvdd 1.133679% (2) (0.011337+/−0.000000) inf!
*vUd*du^v −5.312143% (3) (−0.053121+/−0.002186) −24.301253!
*duvUdvUUdduDD 0.324223% (2) (0.003242+/−0.000000) inf!
*vDUddudDv^U* 3.947375% (2) (0.039474+/−0.000000) inf!
*v^^^vu −3.517609% (3) (−0.035176+/−0.006819) −5.158254!
*^*uD^vDvv 4.245714% (2) (0.042457+/−0.006707) 6.329869!
*Dvu^dud^u −1.916337% (2) (−0.019163+/−0.006238) −3.072172!
*UU*D^UUdvu^ −3.555044% (2) (−0.035550+/−0.000000) −inf!
*ddvUv^^*U* −2.282204% (2) (−0.022822+/−0.003705) −6.159308!
*^vdDvuvD −0.497876% (2) (−0.004979+/−0.000000) −inf!

*dD*Duv^^^ 1.395389% (2) (0.013954+/−0.004905) 2.844620!
*DdddUD*Ud^^ 0.852805% (2) (0.008528+/−0.000000) inf!
*D*uDdD^vv 2.551915% (4) (0.025519+/−0.010631) 2.400549!
**dD^uU^DuU^ −1.031997% (2) (−0.010320+/−0.003606) −2.861685!
*DU^UvvD*^u −4.436490% (2) (−0.044365+/−0.000350) −126.854965!
*DDdddUDvUvd 1.244574% (2) (0.012446+/−0.000000) inf!
*D*^v^uuv −2.538062% (3) (−0.025381+/−0.006879) −3.689572!
*Uu^DUuvv −3.464869% (2) (−0.034649+/−0.004748) −7.297736!
*u^DUDUuD^u 4.883746% (2) (0.048837+/−0.013079) 3.733967!
*UD^uDUuD^U −3.787120% (2) (−0.037871+/−0.001725) −21.958549!
*duv^dv 0.208957% (2) (0.002090+/−0.000370) 5.642134!
*^DUvdDd^D 2.578899% (2) (0.025789+/−0.009989) 2.581703!
*DdudDDDd^Uu 1.885099% (2) (0.018851+/−0.000000) inf!
*^vuUDDvD 1.383265% (2) (0.013833+/−0.000000) inf!
**UuUvuvvud 2.274701% (2) (0.022747+/−0.002408) 9.445906!
*^^U^dUu**U −2.538820% (2) (−0.025388+/−0.003822) −6.642222!
*^vuvv^ −1.060761% (3) (−0.010608+/−0.003745) −2.832468!
*DUuDvu^vU −1.673925% (2) (−0.016739+/−0.000575) −29.132613!
*UUv^uUU*UdUD −5.147430% (2) (−0.051474+/−0.000000) −inf!
*^dDd^uuuv 2.073432% (2) (0.020734+/−0.000000) inf!
*DUudD^UvD 1.239663% (2) (0.012397+/−0.003055) 4.058374!
*Dv^*Dd^uvUu −1.495339% (2) (−0.014953+/−0.000087) −171.392214!
*UdDU^^udUD −2.181233% (2) (−0.021812+/−0.004314) −5.056707!
*UdUDv^UdD^vv 3.065562% (2) (0.030656+/−0.009001) 3.405642!
*DUdvUdUDuUUU* −2.658917% (2) (−0.026589+/−0.007221) −3.682242!
*vuvUU^*uU^dv 2.341771% (2) (0.023418+/−0.000000) inf!
*^DvuU^UD −4.312244% (3) (−0.043122+/−0.016735) −2.576851!
*UUuUvu^ud −2.177395% (2) (−0.021774+/−0.008262) −2.635329!
*UdU^vdud −2.268670% (2) (−0.022687+/−0.005068) −4.476459!
*dUDUDdvvv^ −0.447908% (2) (−0.004479+/−0.001680) −2.665369!
*Uv^dvuvUD 2.069790% (2) (0.020698+/−0.001814) 11.408995!
*Dv^^uv*d 5.135810% (2) (0.051358+/−0.020940) 2.452647!
*UvDDDvDdUd 6.310225% (2) (0.063102+/−0.021138) 2.985300!
*Duv*udU*^^D 3.148953% (2) (0.031490+/−0.005078) 6.200691!
*DdDv^*uDdvD −0.088685% (2) (−0.000887+/−0.000000) −inf!
*d**UvD^d^vD 3.653847% (2) (0.036538+/−0.000000) inf!
*v^Ddudvdd −3.172589% (2) (−0.031726+/−0.000000) −inf!
*udD^vdDUUd −1.029397% (2) (−0.010294+/−0.002566) −4.011986!
*duUduUDU^Uu 0.970883% (2) (0.009709+/−0.001820) 5.333822!
*D^vvv*UvDvdv 2.354896% (2) (0.023549+/−0.000000) inf!
*u^^^uu −1.268514% (3) (−0.012685+/−0.002954) −4.294342!
*vv*vv*DvUu 5.080668% (3) (0.050807+/−0.020220) 2.512745!
*uvDvUv^d 1.045605% (2) (0.010456+/−0.003370) 3.103035!
*vu^*ddDv 1.779752% (2) (0.017798+/−0.005349) 3.327438!
*Uu^d^UDU^v −0.283263% (2) (−0.002833+/−0.000914) −3.099645!
*v^uDdD^^* 3.021176% (3) (0.030212+/−0.005001) 6.041180!
*Dv*d^vvvd −6.482636% (2) (−0.064826+/−0.000000) −inf!
*vU^dD*vu −1.869143% (5) (−0.018691+/−0.006281) −2.975981!
*vU*^duDD*vv^ −0.447908% (2) (−0.004479+/−0.001680) −2.665369!
*uuuUUvDU^ 0.960581% (2) (0.009606+/−0.003427) 2.803236!
*^^^UvuD^ 5.538266% (2) (0.055383+/−0.017886) 3.096354!
*DDdDDd^Uu^ 0.471764% (2) (0.004718+/−0.001326) 3.556639!
*Uu*d^Uuvv 2.814535% (2) (0.028145+/−0.010385) 2.710309!
**d^dD^uuddUD 1.549050% (2) (0.015490+/−0.005736) 2.700537!
*uu^dvDDdU 0.838970% (2) (0.008390+/−0.001680) 4.994755!
*dU^u^Uuu 2.576744% (2) (0.025767+/−0.006285) 4.099913!
*^d^*^UuU −3.759251% (3) (−0.037593+/−0.011009) −3.414747!
**vD*u^^D^ −6.566278% (2) (−0.065663+/−0.004247) −15.459575!
*^UD*^DD^Uud 3.125812% (2) (0.031258+/−0.005670) 5.513275!
*^U*Duud^^ −1.348397% (2) (−0.013484+/−0.001114) −12.100909!
*UdDu^uUUDuD −1.378846% (2) (−0.013788+/−0.002339) −5.894723!
*dvDd^Uu*^ 2.039850% (2) (0.020398+/−0.000000) inf!
*d*DD^uD^U^DU 1.687314% (2) (0.016873+/−0.004381) 3.851170!
*D^vvDD*vvvdv 2.354896% (2) (0.023549+/−0.000000) inf!
*dduuUD^U*dU −0.644699% (2) (−0.006447+/−0.002367) −2.723731!
*dvDUUUU^UUd 2.746898% (2) (0.027469+/−0.000000) inf!
*^Uu^vuuud 0.876038% (2) (0.008760+/−0.001719) 5.095975!
**^UvUD^DUD*^D −6.841748% (2) (−0.068417+/−0.025596) −2.672942!

*^uUuvD^^ 3.437735% (2) (0.034377+/−0.005776) 5.951929!

*^uUdvDUvd 3.596183% (2) (0.035962+/−0.015227) 2.361700!

*uUDuD^Du^ −1.016884% (3) (−0.010169+/−0.001530) −6.645025!

*^*^DUUDddU 3.530838% (3) (0.035308+/−0.007587) 4.653631!

*du^u^DUUUU −1.104380% (2) (−0.011044+/−0.000000) −inf!

*u^dU^uUD 0.834638% (2) (0.008346+/−0.002376) 3.513476!

*U^DUU^uDdU −0.811286% (2) (−0.008113+/−0.000000) −inf!

*^D^dduuU 2.978343% (2) (0.029783+/−0.001649) 18.059269!

*u^^*Ddvuv −0.618506% (2) (−0.006185+/−0.000000) −inf!

*uuduuvdv −3.049382% (3) (−0.030494+/−0.011943) −2.553237!

*uDvudDuU*^ −0.238566% (2) (−0.002386+/−0.000000) −inf!

*UuvDuD*UUuv 0.450877% (2) (0.004509+/−0.001110) 4.061106!

*u*duvd^dUU^uU 0.467073% (2) (0.004671+/−0.000000) inf!

*U*uuvDuU***Dv 1.529500% (2) (0.015295+/−0.000000) inf!

*dd^^UvDuUv 2.818630% (2) (0.028186+/−0.000000) inf!

*^UdU^U^d −1.756722% (2) (−0.017567+/−0.000659) −26.644487!

*vuuD*Ddvv −5.345686% (2) (−0.053457+/−0.000610) −87.648694!

*uU^u^^ 1.442772% (3) (0.014428+/−0.001396) 10.333820!

*DvvUUDUu^ −1.443656% (4) (−0.014437+/−0.003668) −3.935722!

*udUduUdd^D −0.149895% (2) (−0.001499+/−0.000445) −3.372046!

*uDddDuuUUDvuu −1.719886% (2) (−0.017199+/−0.000279) −61.628872!

*vu^U^UdU −2.902302% (2) (−0.029023+/−0.005749) −5.048325!

*dUdDDddD^DvU −2.646393% (2) (−0.026464+/−0.000000) −inf!

*uU^u^^ 1.442772% (3) (0.014428+/−0.001396) 10.333820!

*vuu^duuu 0.994524% (2) (0.009945+/−0.000000) inf!

*Uu^DU^UUddU −0.811286% (2) (−0.008113+/−0.000000) −inf!

*dDu^vuDuD −2.479259% (2) (−0.024793+/−0.005184) −4.782207!

*^dd^D*dv 2.673093% (2) (0.026731+/−0.003609) 7.405734!

*Dvu*uU*Uu^*dd 1.306381% (2) (0.013064+/−0.003738) 3.495033!

*uvduUvUd^ −0.796821% (2) (−0.007968+/−0.000000) −inf!

*uv^^UDDUv −0.643963% (2) (−0.006440+/−0.002625) −2.453469!

**v^^UdvvvDD 4.680100% (2) (0.046801+/−0.000000) inf!

*d*ddDuUvvD 5.283369% (2) (0.052834+/−0.018150) 2.911015!

*uuuDuvvUdU −2.898588% (2) (−0.028986+/−0.011740) −2.468886!

*dudD^^uUu −0.915070% (2) (−0.009151+/−0.003915) −2.337362!

*vvddvD 4.159041% (2) (0.041590+/−0.001027) 40.515584!

*u^U^^^ −1.074696% (2) (−0.010747+/−0.001216) −8.834334!

*vUdD*u^ddu −0.423585% (2) (−0.004236+/−0.000062) −67.954879!

*^Uu^dvUd −4.253994% (2) (−0.042540+/−0.000552) −77.059611!

*DdDdDd^^UD −0.829000% (2) (−0.008290+/−0.001998) −4.148641!

*^DDD*U*vd^^ −1.779757% (2) (−0.017798+/−0.002396) −7.429053!

*uuDD^DD^uu −1.375731% (2) (−0.013757+/−0.002956) −4.654417!

*uv*Udu*u^Uuv −1.608123% (2) (−0.016081+/−0.002657) −6.051354!

*duDu^^DDd 1.468829% (2) (0.014688+/−0.006208) 2.366095!

*Dv^dD^dUv −7.567166% (3) (−0.075672+/−0.021235) −3.563485!

*Udvdud^D* −2.242260% (3) (−0.022423+/−0.007067) −3.172795!

*^dvU*DvDuDd 0.631142% (2) (0.006311+/−0.000087) 72.643487!

*UdduvUuuDvuD 1.424806% (3) (0.014248+/−0.001282) 11.117719!

*^DudUud^ 1.659656% (3) (0.016597+/−0.006129) 2.707901!

*vUdUUvD*duu −0.900193% (2) (−0.009002+/−0.003489) −2.580020!

*vddUu*DDDv −0.633847% (2) (−0.006338+/−0.000880) −7.205485!

*uDduu^DvUDu 3.147953% (2) (0.031480+/−0.011890) 2.647516!

*^uuvdv^* 3.042963% (2) (0.030430+/−0.002747) 11.079411!

*vvdd^UDDu −1.745381% (2) (−0.017454+/−0.000000) −inf!

*UuUddDvDUu −1.257412% (2) (−0.012574+/−0.004292) −2.929424!

*UUd*uuuvUdudu −0.678816% (2) (−0.006788+/−0.000000) −inf!

*uduu^vuD −1.274246% (2) (−0.012742+/−0.002412) −5.283314!

*DD^^*dvDd 10.481589% (2) (0.104816+/−0.000000) inf!

*vD^Dvvuv −5.303494% (2) (−0.053035+/−0.022833) −2.322701!

*uUddvu^DUDd −1.969213% (2) (−0.019692+/−0.000000) −inf!

*^UvdDDDvUUDUD −1.329718% (2) (−0.013297+/−0.002635) −5.046499!

*^DvuUdvuDU −4.541026% (3) (−0.045410+/−0.002022) −22.455093!

*v^^^Du −2.815324% (5) (−0.028153+/−0.011072) −2.542746!

*dvd^d^uvU 2.199805% (2) (0.021998+/−0.000859) 25.596655!

*^vdD*Du^u −4.773326% (2) (−0.047733+/−0.002717) −17.569874!

*UUvvDd*dv 0.708927% (3) (0.007089+/−0.001370) 5.175049!

*d^vUuuvdv 3.573109% (2) (0.035731+/−0.000000) inf!

*^uvDu^vUv^ 0.477703% (2) (0.004777+/−0.000000) inf!

*Duud^DdUUu −1.193516% (2) (−0.011935+/−0.000000) −inf!
*UdD*uU^UvDUv 0.799269% (2) (0.007993+/−0.002784) 2.870937!
*dvUd^uDuUD −3.106748% (2) (−0.031067+/−0.005306) −5.855159!
*uU*UUd^uvvdd 3.072422% (2) (0.030724+/−0.000000) inf!
*dvv*uUDUdUd 0.694907% (2) (0.006949+/−0.000000) inf!
*DdUDvuUDuDU −2.738129% (3) (−0.027381+/−0.011186) −2.447812!
*DD^v^u*UU −1.460059% (2) (−0.014601+/−0.002320) −6.292359!
*uUuuDvDDuD 2.557388% (2) (0.025574+/−0.001923) 13.300688!
*DuDDuUvu*^D 1.684737% (3) (0.016847+/−0.006063) 2.778501!
*dduUdu*^^ 0.444588% (3) (0.004446+/−0.000202) 21.965340!
*DduU^d^D −2.002051% (3) (−0.020021+/−0.008005) −2.500884!
*vUuD^U*Dvv^ −1.918343% (2) (−0.019183+/−0.003582) −5.355901!
*duUv^uDDD −4.697565% (2) (−0.046976+/−0.019143) −2.453941!
*DvudUdDUdU^D −1.766472% (2) (−0.017665+/−0.007491) −2.358192!
*uvDUv^Dd −1.034269% (2) (−0.010343+/−0.001890) −5.473312!
*UDv^^uu^D −3.331566% (2) (−0.033316+/−0.000000) −inf!
*uUvvud^Udd 0.624998% (2) (0.006250+/−0.000000) inf!
*UDd^vvDU −3.971214% (2) (−0.039712+/−0.003040) −13.061544!
*u^^D^vdv 2.659993% (2) (0.026600+/−0.000402) 66.204889!
*UDU^Dud^v 4.403092% (2) (0.044031+/−0.001138) 38.677105!
*Dd^uvvuD −0.070126% (2) (−0.000701+/−0.000188) −3.726594!
*^uUvvUUDd 3.666080% (2) (0.036661+/−0.005344) 6.860197!
*^udD*DdvD^DDU −0.368660% (2) (−0.003687+/−0.000000) −inf!
*DD^^vDuU −2.421805% (3) (−0.024218+/−0.009614) −2.519108!
*v*^uDdUvvU −1.001775% (2) (−0.010018+/−0.002488) −4.025825!
*Dvu^*DDvud −2.784863% (2) (−0.027849+/−0.002586) −10.769528!
*^vD^du*d −2.431393% (4) (−0.024314+/−0.010424) −2.332607!
*DudDU^^dduduD −0.103791% (2) (−0.001038+/−0.000000) −inf!
*vvUUvD*Dd −3.940203% (2) (−0.039402+/−0.013650) −2.886497!
*^^UuUD*uU^UD 1.316363% (2) (0.013164+/−0.000000) inf!
**u*duD^DuUDDv −1.902065% (2) (−0.019021+/−0.002689) −7.073427!
*Ddd^v*Uu*Ud 2.376727% (2) (0.023767+/−0.000219) 108.625493!
*dUDvdd^DU −1.600996% (2) (−0.016010+/−0.000228) −70.264174!
*U^vUdDUvD −0.935833% (2) (−0.009358+/−0.000000) −inf!
*vU*UUv^*Dv^ 1.167392% (2) (0.011674+/−0.001708) 6.834920!
*DdD^^^u*D 2.651015% (5) (0.026510+/−0.011118) 2.384337!
*dU^^u^ −3.366419% (2) (−0.033664+/−0.003740) −9.001493!
*uUvuDU^ddvUu 1.023480% (2) (0.010235+/−0.000000) inf!
*DUUUd^uvd 0.892004% (2) (0.008920+/−0.001537) 5.801900!
*dDU^d*^vU −1.648566% (3) (−0.016486+/−0.001599) −10.312689!
*UvDDvDduDU 2.473457% (2) (0.024735+/−0.000138) 179.457812!
*uUDU^DddUuvd −0.682202% (2) (−0.006822+/−0.000411) −16.579874!
*uvUDDvDvd −8.194160% (2) (−0.081942+/−0.007519) −10.898431!
*^^UvddUuU 2.486032% (2) (0.024860+/−0.000000) inf!
*uv*^uv^U 0.481682% (2) (0.004817+/−0.001704) 2.826234!
**^dDuUu^DDD^v −3.460412% (3) (−0.034604+/−0.006500) −5.323307!
*^^U^D^d*D −1.197739% (5) (−0.011977+/−0.004968) −2.410863!
*UUvuduUUvu 3.263658% (2) (0.032637+/−0.000000) inf!
*vdDuDUdduv 1.131997% (2) (0.011320+/−0.000682) 16.588178!
*vuDdvvddD 7.768072% (2) (0.077681+/−0.032794) 2.368751!
*uDUdUuUvuUuU 1.660630% (3) (0.016606+/−0.003610) 4.600420!
*vuud^UU^D** −1.202591% (2) (−0.012026+/−0.000000) −inf!
*u^vUUdv^ 1.129961% (2) (0.011300+/−0.002237) 5.050480!
*d^DD^Uu^D* 1.501409% (2) (0.015014+/−0.000759) 19.781421!
*^U*DduUDU*udu −1.772261% (2) (−0.017723+/−0.003956) −4.480054!
*uDv^DvUv*^ 3.970181% (4) (0.039702+/−0.016185) 2.452984!
**DuvdvDdu −1.210121% (2) (−0.012101+/−0.000000) −inf!
*UU^v*udU*^ −2.037928% (3) (−0.020379+/−0.002476) −8.229644!
*Dvd^vd^* 0.960332% (2) (0.009603+/−0.001818) 5.282933!
*^*UUD^uU^ −2.621515% (3) (−0.026215+/−0.005011) −5.231401!
*UuuU^dU^*U −0.878938% (2) (−0.008789+/−0.000000) −inf!
**vUdd*UdvU −3.137823% (2) (−0.031378+/−0.008553) −3.668681!
*DDu*v^duDdD 0.726953% (2) (0.007270+/−0.000772) 9.421929!
*uvUu*vvDDU 0.715790% (2) (0.007158+/−0.000000) inf!
*vdUUUvvdD 2.083040% (2) (0.020830+/−0.000388) 53.701918!
*^^DDdUU^ −3.409760% (2) (−0.034098+/−0.001729) −19.721375!
*D^DDvdu*dD −4.230092% (2) (−0.042301+/−0.010563) −4.004685!

*^U^uD*ud**Dd 5.168035% (2) (0.051680+/−0.009930) 5.204639!
*U^dduduU*ud 4.010288% (2) (0.040103+/−0.006758) 5.934371!
*^v^DduDvD −3.103908% (2) (−0.031039+/−0.000000) −inf!
*U*vdDuuvv 0.659919% (2) (0.006599+/−0.000000) inf!
*UuuuDuUvuDU 1.223843% (2) (0.012238+/−0.002448) 4.998528!
*uU^ddd^u 0.637482% (2) (0.006375+/−0.000000) inf!
*uDUuuuvvD 1.243853% (2) (0.012439+/−0.001535) 8.105129!
*u^D^UUdvU 2.757479% (2) (0.027575+/−0.000000) inf!
*^v*^d^uUvDD −0.898739% (2) (−0.008987+/−0.000000) −inf!
*vvd^uuDU 1.800853% (3) (0.018009+/−0.004140) 4.350365!
*vddDd^*vv 2.163725% (2) (0.021637+/−0.000661) 32.756464!
*vdDuvud^ 0.996141% (2) (0.009961+/−0.002000) 4.980025!
*uu^u^^ 1.442772% (3) (0.014428+/−0.001396) 10.333820!
*U*^dvdddu 0.761007% (3) (0.007610+/−0.001798) 4.231624!
*uv^^uv 2.095552% (3) (0.020956+/−0.005008) 4.184814!
*u^dvD^vd 3.991971% (3) (0.039920+/−0.016783) 2.378572!
*uduuUvuUDd 1.682752% (4) (0.016828+/−0.006060) 2.776695!
*^vu*vDvv 1.383265% (2) (0.013833+/−0.000000) inf!
*^DD*uuvDvd −5.416040% (2) (−0.054160+/−0.012108) −4.472977!
*vd^v^u −2.263952% (2) (−0.022640+/−0.003282) −6.898065!
*vuUvudUv 1.371966% (2) (0.013720+/−0.005478) 2.504335!
*v^ddvd −0.664320% (2) (−0.006643+/−0.001418) −4.684072!
*^D^vDvud 3.932117% (2) (0.039321+/−0.010413) 3.776143!
*v^^^Du −2.815324% (5) (−0.028153+/−0.011072) −2.542746!
*UDuvv^Du 1.608813% (3) (0.016088+/−0.006769) 2.376662!
*uUDdvDvdD 2.263048% (2) (0.022630+/−0.008299) 2.726764!
*vvUU^uDUu −1.263642% (2) (−0.012636+/−0.005271) −2.397290!
*^duUuUDDud −0.391172% (3) (−0.003912+/−0.001489) −2.627764!
*^u^Ud*DDu −2.467998% (2) (−0.024680+/−0.004400) −5.609654!
*uvuD^du*D 2.629776% (4) (0.026298+/−0.009242) 2.845534!
*v^*U^DUu^d^ −3.173548% (2) (−0.031735+/−0.012799) −2.479595!
*uuD^DUuDdD 2.803721% (2) (0.028037+/−0.006594) 4.252134!
*Dv^uvdDu −2.474906% (4) (−0.024749+/−0.009175) −2.697378!
*U*Ud^UDdvv 2.362406% (5) (0.023624+/−0.005283) 4.471448!
*UvdUuUvuuD 2.023678% (2) (0.020237+/−0.005028) 4.024603!
*DuvUu*u^dUD 0.657575% (3) (0.006576+/−0.000578) 11.378612!
*DdDDD^^vDu* −2.919553% (2) (−0.029196+/−0.006016) −4.852707!
*udvD^Ud*v −0.309733% (2) (−0.003097+/−0.000000) −inf!
*^^DUDDv^UUU*d 2.137759% (2) (0.021378+/−0.004232) 5.050905!
**Ud^UuUuvDvU 3.875406% (2) (0.038754+/−0.000000) inf!
*vuUDDvvD −3.243463% (2) (−0.032435+/−0.009561) −3.392357!
*dudUdvudDu −1.956200% (3) (−0.019562+/−0.007657) −2.554870!
*dddD^*duuDD −0.725747% (2) (−0.007257+/−0.000000) −inf!
*vv^uvu 3.192232% (2) (0.031922+/−0.006900) 4.626675!
*Uu^^^v −3.434289% (2) (−0.034343+/−0.001313) −26.151261!
*UDd^v^*^v −1.650508% (2) (−0.016505+/−0.004718) −3.498249!
*^vDDudDUuU 1.479288% (2) (0.014793+/−0.000000) inf!
*vv^du^UU −2.346656% (3) (−0.023467+/−0.002292) −10.237874!
*uvdUUdvDU −0.941715% (2) (−0.009417+/−0.001913) −4.923168!
*UUuDDuu^*^ 0.478471% (2) (0.004785+/−0.000000) inf!
*UdUduvDuv 2.280900% (2) (0.022809+/−0.008064) 2.828536!
*uvDdD^DdU −1.565377% (3) (−0.015654+/−0.001481) −10.572704!
*uUUdd^uuvU −0.590217% (2) (−0.005902+/−0.000000) −inf!
*vvDd^vvv −0.154844% (2) (−0.001548+/−0.000000) −inf!
*uuv^*uUU*vd −0.317894% (2) (−0.003179+/−0.000129) −24.702944!
*dUUdDv^Du 1.489364% (2) (0.014894+/−0.000296) 50.309189!
*uD^vD*Udd 0.642883% (3) (0.006429+/−0.002029) 3.168176!
*dUDDuDvdud 0.789815% (2) (0.007898+/−0.001416) 5.576046!
*vU*^DU^Dv*U −3.944019% (2) (−0.039440+/−0.014372) −2.744278!
*vuDu*uUUd^ 1.812094% (3) (0.018121+/−0.007601) 2.383972!
*^u^udv 2.390558% (4) (0.023906+/−0.006463) 3.698873!
*d*dU*dv*DD^D^ 1.304163% (2) (0.013042+/−0.000000) inf!
*DvDUu^UuDv −4.181530% (2) (−0.041815+/−0.007339) −5.697819!
**^uDvuD^U −1.860679% (2) (−0.018607+/−0.005069) −3.670437!
*dU^D^D^Ud −1.530707% (4) (−0.015307+/−0.006563) −2.332410!
**u^DU^DdDu^ 2.356563% (2) (0.023566+/−0.001221) 19.296861!
*UuUdduuDUv 0.863227% (2) (0.008632+/−0.001791) 4.819154!
*Uvvv*ddudv −4.992999% (2) (−0.049930+/−0.000000) −inf!

*uvU*uU*U^uu 1.461630% (3) (0.014616+/−0.002842) 5.143575!
*vv^ddD^U 1.099717% (2) (0.010997+/−0.001893) 5.810027!
*dvDd^^dD 1.436246% (2) (0.014362+/−0.005328) 2.695574!
*vDu^Ud^Uu 2.865912% (2) (0.028659+/−0.003224) 8.890012!
*^vDUdv^d* −1.298441% (3) (−0.012984+/−0.000488) −26.595658!
*UDUDUud*^U^D −1.454927% (2) (−0.014549+/−0.000000) −inf!
*d^^dduvU 3.465980% (2) (0.034660+/−0.000000) inf!
*ud^uDvddU −0.532291% (2) (−0.005323+/−0.000000) −inf!
*DU*vDUud^^ −1.398831% (2) (−0.013988+/−0.000401) −34.878435!
*uvuvvU**DvU 2.006394% (2) (0.020064+/−0.008361) 2.399848!
*^^uDdDd^ 1.223695% (2) (0.012237+/−0.000682) 17.934687!
*udvvu^Uu* 5.876444% (2) (0.058764+/−0.000000) inf!
*dv*dDd^vD −3.438209% (2) (−0.034382+/−0.014436) −2.381620!
*D^^^^UDUU −3.874514% (3) (−0.038745+/−0.012837) −3.018227!
*U^^d^vDv 2.155372% (3) (0.021554+/−0.008745) 2.464718!
*d*dDDd^Dv*uU 1.273205% (2) (0.012732+/−0.003767) 3.379998!
*UUvUdUuu*u^d −0.499469% (2) (−0.004995+/−0.000000) −inf!
*UvUU^vU^U 1.007866% (2) (0.010079+/−0.000000) inf!
*^DDUvv^U*v 0.054467% (2) (0.000545+/−0.000000) inf!
*dDUvuUv*vuU 19.572452% (2) (0.195725+/−0.000000) inf!
*duvDUdUDud −1.328858% (2) (−0.013289+/−0.003089) −4.301394!
*uv^vdu*u 2.458584% (2) (0.024586+/−0.000000) inf!
*uu^^^v −3.434289% (2) (−0.034343+/−0.001313) −26.151261!
*vU^Dud^U −1.780954% (3) (−0.017810+/−0.004995) −3.565253!
*UUd^dUvdu −2.053780% (2) (−0.020538+/−0.008378) −2.451420!
*Duuv*u^Uvd −2.133577% (2) (−0.021336+/−0.000000) −inf!
*DUDDDD^d^^U 3.112756% (2) (0.031128+/−0.000000) inf!
*v^^dD*uU^DD −2.691294% (2) (−0.026913+/−0.000000) −inf!
*U^uvvUd^D 5.528903% (2) (0.055289+/−0.000000) inf!
*DvUUuUdDu^ −1.612225% (2) (−0.016122+/−0.005312) −3.035157!
*d^vvd^ 2.316300% (2) (0.023163+/−0.007226) 3.205729!
*vdD^D^^duu 0.866941% (2) (0.008669+/−0.000000) inf!
*UDv^^DvuU 2.286337% (2) (0.022863+/−0.000000) inf!
*^u^^UD^* −0.104557% (2) (−0.001046+/−0.000000) −inf!
*^D^^udDDU −3.122682% (2) (−0.031227+/−0.008561) −3.647378!
*DdduDd*^^d −1.058006% (2) (−0.010580+/−0.003831) −2.761662!
*UvUUDv*u^UU −2.662089% (2) (−0.026621+/−0.006747) −3.945776!
*^dU^vD*^D −1.809500% (2) (−0.018095+/−0.001822) −9.931933!
*vDDU^d^DD −0.580547% (2) (−0.005805+/−0.000390) −14.880922!
*vvvvDu 2.597584% (2) (0.025976+/−0.010387) 2.500737!
*v*dDuu^v −2.927178% (2) (−0.029272+/−0.003029) −9.663715!
*U^Ud^^UdDDv −2.218278% (2) (−0.022183+/−0.000000) −inf!
*DdDuvDDUudDu −0.285261% (2) (−0.002853+/−0.000974) −2.928500!
*^^vDdUDu*d 2.632004% (2) (0.026320+/−0.003322) 7.922067!
*D*uv^DvU**UU −0.959416% (2) (−0.009594+/−0.002156) −4.450846!
*uu^vvD*dD 1.298854% (2) (0.012989+/−0.001705) 7.616174!
*uDu^^dD^d −2.816918% (2) (−0.028169+/−0.001104) −25.514257!
*DvDvuDDUDU −0.896468% (2) (−0.008965+/−0.002436) −3.680417!
*uu*DDu^Du^ −1.743562% (2) (−0.017436+/−0.007033) −2.478965!
*d*vDUuvvU 0.789806% (3) (0.007898+/−0.001777) 4.444372!
*^duvd*^v −1.830546% (2) (−0.018305+/−0.000000) −inf!
*uD*^^*UUudu −4.032206% (3) (−0.040322+/−0.014008) −2.878548!
*vduUUvUDU −3.147705% (2) (−0.031477+/−0.010557) −2.981754!
*uuDdUdUv^ −2.344745% (4) (−0.023447+/−0.003774) −6.212653!
*^dUdvUvuD 1.370701% (2) (0.013707+/−0.000230) 59.482632!
*dv^UvDvUD 2.590259% (3) (0.025903+/−0.005989) 4.325190!
*^dvuuDDd 1.459189% (2) (0.014592+/−0.005162) 2.826720!
*Dv*UDDDdvud 3.056712% (3) (0.030567+/−0.001678) 18.215577!
*dvDuvUdUd 4.188490% (2) (0.041885+/−0.003280) 12.769276!
*^UUudvv*dv 1.988533% (2) (0.019885+/−0.002078) 9.567945!
*v^dvU^D^^d 0.049926% (2) (0.000499+/−0.000000) inf!
*Duv^d^d*Du −0.174220% (2) (−0.001742+/−0.000000) −inf!
*Du^DvDUUuDU* −0.963436% (2) (−0.009634+/−0.002836) −3.397037!
*vd*^vDvd 0.911774% (2) (0.009118+/−0.003474) 2.624769!
*UUd*^uDddvdv −1.028031% (2) (−0.010280+/−0.000000) −inf!
*v*vUU^duu 0.099554% (2) (0.000996+/−0.000000) inf!
*^^UuDv*D^ −2.003952% (2) (−0.020040+/−0.000000) −inf!
*Ddu^UvUuvu −1.594418% (2) (−0.015944+/−0.000000) −inf!
*u^^^d*UUDv 5.829544% (2) (0.058295+/−0.021833) 2.670049!
*UvvDd^DdUdu 0.392019% (2) (0.003920+/−0.000000) inf!

*DdvUuDvu 2.190204% (3) (0.021902+/−0.009246) 2.368723!
*^d^^uDdd −2.424243% (2) (−0.024242+/−0.000000) −inf!
*^u*U^uDuUDd 2.129256% (2) (0.021293+/−0.004595) 4.634243!
*UUvvvUDudD 3.800227% (2) (0.038002+/−0.007898) 4.811358!
*^Ddd^Dv^* −2.478125% (2) (−0.024781+/−0.010427) −2.376613!
*^DdU^vUv 7.120508% (2) (0.071205+/−0.003425) 20.788139!
*D**dvdDUUUDD 0.768014% (3) (0.007680+/−0.001479) 5.192192!
*D*D^^DvuUUD 3.923821% (2) (0.039238+/−0.003052) 12.855376!
*DvuUDuvUd −1.869119% (2) (−0.018691+/−0.006633) −2.817994!
**DdDuDU^U*^ 0.751942% (2) (0.007519+/−0.001815) 4.143024!
*UDuuvDDDD*d 0.249122% (2) (0.002491+/−0.000708) 3.517452!
*UDuuudv^ 0.453208% (2) (0.004532+/−0.001572) 2.883655!
*Dv^vuU^* −3.520602% (2) (−0.035206+/−0.011110) −3.168775!
**D^d^v*u^ −0.951919% (2) (−0.009519+/−0.000717) −13.270477!
*dd^^UdUuv 1.837177% (2) (0.018372+/−0.000000) inf!
*dd^D^vdDU 0.865262% (2) (0.008653+/−0.000000) inf!
*ud^D^D*UUd −2.409804% (3) (−0.024098+/−0.009737) −2.474799!
*dUDdd^U^*u 1.932432% (4) (0.019324+/−0.005524) 3.498114!
*^uDU^D^^du −2.413694% (2) (−0.024137+/−0.000139) −173.280515!
*dDUvvuUUu 1.655631% (2) (0.016556+/−0.000000) inf!
*uUDdvv*D^ 7.902428% (4) (0.079024+/−0.008472) 9.328115!
*D^DudvuUDdd 2.203107% (2) (0.022031+/−0.009046) 2.435521!
*dvuvDvDd −3.129744% (3) (−0.031297+/−0.008931) −3.504277!
*DU^vvvud −6.385381% (2) (−0.063854+/−0.006857) −9.312423!
*u^vuUv^Udd −1.190906% (2) (−0.011909+/−0.000000) −inf!
*vuD^dDu^ 1.214974% (2) (0.012150+/−0.002576) 4.716094!
*^uUdduvu 1.812637% (2) (0.018126+/−0.006655) 2.723542!
*DD^dvvDUu 4.712254% (2) (0.047123+/−0.005393) 8.737620!
*vuDDUDUUvu −1.584991% (3) (−0.015850+/−0.003088) −5.133525!
*^d^DDv^^^ 0.760678% (2) (0.007607+/−0.002272) 3.347533!
*vdUdDdvUvU −2.100729% (3) (−0.021007+/−0.007912) −2.655206!
*U*^dUDu^DU*v −3.008797% (2) (−0.030088+/−0.003421) −8.795412!
**v^*d*^v^ 3.763029% (2) (0.037630+/−0.006635) 5.671780!
*^^uUddvDvd 3.588289% (2) (0.035883+/−0.000000) inf!
*vdvvv^*U 3.883356% (2) (0.038834+/−0.006964) 5.576692!
*UD^dudu^u −1.269009% (4) (−0.012690+/−0.005250) −2.417063!
**UduUuvD^ 1.884004% (3) (0.018840+/−0.005900) 3.193357!
*du*Uu^^UD^u −0.104557% (2) (−0.001046+/−0.000000) −inf!
*DD^vDUDDU^d 2.828296% (2) (0.028283+/−0.010343) 2.734476!
*UDDDvUdvUdU* 1.836483% (2) (0.018365+/−0.005089) 3.609051!
*u^Uud^uud 0.986838% (2) (0.009868+/−0.000000) inf!
***dvDudUdv 1.113180% (3) (0.011132+/−0.003874) 2.873533!
*d*udUUv^uD 0.713667% (3) (0.007137+/−0.000243) 29.388038!
*u^uDuvv*^ 1.744337% (2) (0.017443+/−0.003523) 4.951657!
*Uu^vDDv^ 2.609621% (2) (0.026096+/−0.007348) 3.551441!
*Ddv^dUDu −3.543679% (2) (−0.035437+/−0.012084) −2.932541!
*^^^^Ud −2.129542% (2) (−0.021295+/−0.005188) −4.104903!
*^DuuUvdv^ −2.224239% (2) (−0.022242+/−0.000000) −inf!
*^^^^^u −4.946462% (2) (−0.049465+/−0.003390) −14.593420!
*dUUuvvUU 1.679953% (2) (0.016800+/−0.003617) 4.644956!
*uUDuUDU^uu 0.970883% (2) (0.009709+/−0.001820) 5.333822!
*UDudd^dUDv 1.555469% (2) (0.015555+/−0.005242) 2.967523!
*udddUvudv 1.157943% (2) (0.011579+/−0.000000) inf!
*dUDDd^UDvUd 1.502713% (2) (0.015027+/−0.002571) 5.844307!
*U^v^uUUD*DdUD 0.309049% (2) (0.003090+/−0.000000) inf!
**dd*U^vv^D −0.485911% (2) (−0.004859+/−0.000000) −inf!
*vU*vdduDD 1.262900% (4) (0.012629+/−0.003836) 3.291820!
*dDDu*^^vdd 2.573105% (2) (0.025731+/−0.005346) 4.812753!
*u^uUd*D^^ 2.350170% (2) (0.023502+/−0.005487) 4.282899!
*d*^D^D^uu −1.580590% (2) (−0.015806+/−0.003954) −3.997118!
*dv*UvDUvUUu −2.231683% (3) (−0.022317+/−0.003257) −6.851024!
*D^U^v*Uud −3.864949% (2) (−0.038649+/−0.008419) −4.590590!
*^^vvDDUu −4.801073% (4) (−0.048011+/−0.012126) −3.959463!
*DdUUD*uuuddv 3.172465% (2) (0.031725+/−0.004359) 7.277398!
*u^UudvUDD −1.319767% (2) (−0.013198+/−0.003585) −3.681526!
*DdDv^vD^DUu 2.282650% (4) (0.022826+/−0.000711) 32.119406!
*d*DvudD^ud* −2.152016% (2) (−0.021520+/−0.003238) −6.646811!
*^v^vDDdU −3.367379% (2) (−0.033674+/−0.000000) −inf!

*D^u*dDdD^Dud −0.267233% (2) (−0.002672+/−0.000000) −inf!
*vUdv^Dd^ 1.470076% (2) (0.014701+/−0.002889) 5.089310!
*U^vUUvdvD 1.383265% (2) (0.013833+/−0.000000) inf!
*duUduvvD −1.301278% (2) (−0.013013+/−0.003880) −3.353795!
*^d*^D^dDD −2.261505% (2) (−0.022615+/−0.003396) −6.660222!
*DvDd*UUdUv 4.853066% (4) (0.048531+/−0.020301) 2.390500!
*dD*DvDdvv 6.794911% (2) (0.067949+/−0.024028) 2.827942!
*v^vdvUv**v −6.093239% (3) (−0.060932+/−0.008155) −7.471342!
*^vUuuDDv^*uU* −3.730337% (2) (−0.037303+/−0.000000) −inf!
*Dvvd*^UUUUD −6.081047% (2) (−0.060810+/−0.012256) −4.961548!
*^vUUuddDD 2.127808% (2) (0.021278+/−0.008967) 2.373015!
*^Dv^d^Dv*d −3.782522% (3) (−0.037825+/−0.004269) −8.861036!
*vUv^D**^dUD −2.805225% (3) (−0.028052+/−0.010250) −2.736823!
*DdUu^uudDd −1.368258% (2) (−0.013683+/−0.000000) −inf!
*ud^uDu^*v* −1.293332% (2) (−0.012933+/−0.003864) −3.346914!
*UUuDudv^u −1.236668% (2) (−0.012367+/−0.004455) −2.775940!
*^uDUvUU^d −0.803411% (3) (−0.008034+/−0.001570) −5.117583!
*u^dDUuUD^ −1.489088% (2) (−0.014891+/−0.003128) −4.760699!
*D^vUvUdUd −0.477433% (2) (−0.004774+/−0.000000) −inf!
*d^v^u^ −1.897518% (2) (−0.018975+/−0.003477) −5.457214!
*D^U^ud^u −1.737762% (3) (−0.017378+/−0.005538) −3.137969!
*DDvDvD*^ud −4.023294% (2) (−0.040233+/−0.000000) −inf!
*u^uuUd^vU 0.801069% (2) (0.008011+/−0.000000) inf!
*uDD^UU^Uv^ 4.027748% (3) (0.040277+/−0.014976) 2.689402!
*u^^^vd −0.399682% (2) (−0.003997+/−0.000000) −inf!
*^vuudUvuU −0.541860% (2) (−0.005419+/−0.001353) −4.003537!
*vUuvuUu^ −1.632192% (3) (−0.016322+/−0.002978) −5.480153!
*UvvU**uU^U 4.996876% (2) (0.049969+/−0.008187) 6.103059!
*dvvvuu −1.082584% (2) (−0.010826+/−0.004504) −2.403720!
*^^UUDDdDd −0.692506% (2) (−0.006925+/−0.001383) −5.007060!
*D*vu^uvvD^*dU −0.450655% (2) (−0.004507+/−0.000000) −inf!
*^^^^^U −6.089361% (3) (−0.060894+/−0.019940) −3.053819!
*DDUdu^Uuv −2.704441% (2) (−0.027044+/−0.006555) −4.125722!
*UuuDuuvduv*D 1.734061% (2) (0.017341+/−0.005173) 3.351836!
*U^^UUDddUuu^ 1.090220% (2) (0.010902+/−0.000000) inf!
*Udv*Uv^v −2.240078% (3) (−0.022401+/−0.004783) −4.683254!
*du^v*Uuv 1.211457% (5) (0.012115+/−0.004843) 2.501292!
*^ddvdduddd −1.305973% (2) (−0.013060+/−0.000000) −inf!
*uUUu^UuD^ 1.936241% (3) (0.019362+/−0.008179) 2.367366!
*^^UuuUud 0.778507% (2) (0.007785+/−0.002788) 2.792817!
*du*DDD^Duu^u −0.731167% (2) (−0.007312+/−0.000492) −14.860350!
*u^UdvUUd^d −2.823368% (2) (−0.028234+/−0.010993) −2.568277!
*u^UUd^dUDu −0.433846% (2) (−0.004338+/−0.000019) −225.368008!
*^vU*Dv^*uu 1.521745% (2) (0.015217+/−0.004784) 3.180636!
*DvuU^Dddv 1.529500% (2) (0.015295+/−0.000000) inf!
*^u^dvuUv^ −14.484040% (2) (−0.144840+/−0.000000) −inf!
*uUDvUvuu* 1.725686% (2) (0.017257+/−0.003546) 4.866141!
*DvuvUdd*d 2.404915% (2) (0.024049+/−0.004565) 5.267758!
*DuDUUu*^uUUd −0.899580% (2) (−0.008996+/−0.002132) −4.220224!
*DDu^uUvdd 2.625817% (3) (0.026258+/−0.002390) 10.986248!
**uvddu*^^ −2.120734% (2) (−0.021207+/−0.000306) −69.320100!
*U^v^^dDUd 3.005829% (2) (0.030058+/−0.009903) 3.035303!
*U*^dDUuu^^D −1.976701% (2) (−0.019767+/−0.000000) −inf!
*vuDU*^v^ 2.885125% (2) (0.028851+/−0.000000) inf!
*D^dDDUddDv −0.755000% (2) (−0.007550+/−0.000744) −10.149202!
*UvuuDdvv 1.673652% (3) (0.016737+/−0.005030) 3.327573!
*U^Ud^DU^ −0.891587% (3) (−0.008916+/−0.002559) −3.483762!
*vUvvdD^u 0.176364% (2) (0.001764+/−0.000000) inf!
*Ud*uu^dvd 2.489948% (2) (0.024899+/−0.004331) 5.748890!
*uudu^UUv* 3.398983% (3) (0.033990+/−0.009177) 3.703892!
*v^ddv^vDu −7.283425% (3) (−0.072834+/−0.009049) −8.049188!
*vDvduv^D^ −1.694606% (2) (−0.016946+/−0.007280) −2.327618!
*UDUdDv^^^ 3.825955% (2) (0.038260+/−0.016408) 2.331809!
*dU^DD^Dv −3.696816% (2) (−0.036968+/−0.015233) −2.426803!
*DuuudUvdUd 1.562497% (2) (0.015625+/−0.000000) inf!
*D^DvudUudu* 1.178152% (2) (0.011782+/−0.002550) 4.619472!
*UU^D^^v^ 12.314658% (3) (0.123147+/−0.046341) 2.657429!
**vuvvvDDv 3.072825% (2) (0.030728+/−0.000312) 98.524193!

*d^DdUUvddD −2.632613% (2) (−0.026326+/−0.000000) −inf!

*Dv^vUUvd −0.183845% (2) (−0.001838+/−0.000454) −4.050253!

*dUDudu*uDd^v 1.407481% (2) (0.014075+/−0.004049) 3.475903!

**Uuu^Dduuu^ 2.340654% (2) (0.023407+/−0.000000) inf!

*Uv*uu^DDd −1.673793% (2) (−0.016738+/−0.005492) −3.047535!

*dDUdvdDvdU −0.944879% (2) (−0.009449+/−0.000000) −inf!

*dvdvvd −9.588281% (2) (−0.095883+/−0.040309) −2.378719!

*DU*DvdDu^*u −1.056747% (2) (−0.010567+/−0.001614) −6.547432!

*U^^u^^ −3.852472% (2) (−0.038525+/−0.002466) −15.621823!

*vddudDDvv 0.401608% (2) (0.004016+/−0.000000) inf!

*UUD^DvD^U 1.324057% (3) (0.013241+/−0.002734) 4.842260!

*d^UdDDv^vD 2.509156% (2) (0.025092+/−0.000000) inf!

*vdUuvduD −1.612208% (2) (−0.016122+/−0.000849) −18.990464!

*^vDdvv^Ud 1.803472% (2) (0.018035+/−0.003382) 5.332362!

*Uu^*dUdd^d −1.394146% (2) (−0.013941+/−0.000187) −74.422365!

*dU*UuvuuDDD 0.612270% (2) (0.006123+/−0.001174) 5.215339!

*uudD^^U^d −2.005843% (2) (−0.020058+/−0.002274) −8.819277!

*vv^DuUu*v −1.718105% (3) (−0.017181+/−0.005318) −3.231020!

*U^d^uDdDvU −2.964046% (2) (−0.029640+/−0.000000) −inf!

*dDu^DD^Ddv 4.691484% (2) (0.046915+/−0.000000) inf!

*u^d^*dDUv 2.159698% (3) (0.021597+/−0.005202) 4.151405!

*^Ud^Dduu −1.707503% (3) (−0.017075+/−0.003408) −5.010992!

*vuvduUUU 1.899204% (2) (0.018992+/−0.000976) 19.462033!

*UdUvDdDuuU −1.009267% (2) (−0.010093+/−0.003832) −2.633788!

*U^d*vv*^UUD 0.766477% (2) (0.007665+/−0.000000) inf!

*^*d^uv*UuU 1.318290% (2) (0.013183+/−0.003019) 4.365948!

*^v^vdv 4.886654% (2) (0.048867+/−0.007403) 6.601344!

*DDUddvd^vd −2.283679% (2) (−0.022837+/−0.009025) −2.530394!

*Uvd*^dUUdv −2.287581% (2) (−0.022876+/−0.000000) −inf!

*^Dv^DDUdU −1.063515% (2) (−0.010635+/−0.002525) −4.211755!

*DDdUv^DDDD*u 0.176364% (2) (0.001764+/−0.000000) inf!

*^*^UuUddU 1.304158% (2) (0.013042+/−0.000773) 16.864358!

*vu^UvD*UvD 2.385769% (2) (0.023858+/−0.000136) 175.266334!

*ddvvddDD 3.767010% (2) (0.037670+/−0.006571) 5.733062!

*^uuU^vUDUdd 0.899961% (2) (0.009000+/−0.002165) 4.157676!

*^^dUvUu^ −1.668868% (3) (−0.016689+/−0.004661) −3.580134!

*uvvv^vD*D −7.865019% (2) (−0.078650+/−0.002568) −30.624545!

*DUv*UDdD^vv^ −4.418033% (3) (−0.044180+/−0.008165) −5.411050!

*^d^dUdDvvv 5.184742% (2) (0.051847+/−0.019235) 2.695532!

*ddvvuDUDDu −3.154214% (3) (−0.031542+/−0.011388) −2.769652!

*^^vvd^ 7.942470% (3) (0.079425+/−0.010071) 7.886733!

*dv*duDD^d 2.284571% (2) (0.022846+/−0.009722) 2.349866!

*Du^D^UuU^v 1.982032% (2) (0.019820+/−0.002616) 7.576269!

*uvvuvD^D −9.861436% (2) (−0.098614+/−0.016446) −5.996319!

*dvDUuvd^ −2.079173% (2) (−0.020792+/−0.002232) −9.315718!

*uDuuUUUd^d 2.730734% (2) (0.027307+/−0.005456) 5.004566!

**v^UdUuvU^*D 1.343525% (2) (0.013435+/−0.000000) inf!

**uuvvDddU 0.855698% (4) (0.008557+/−0.001664) 5.141478!

*u*vUvDDuv −5.744614% (2) (−0.057446+/−0.016595) −3.461672!

*udDvudUUUd* 1.301513% (2) (0.013015+/−0.004251) 3.061761!

*vdUu^U^U*d 2.542502% (3) (0.025425+/−0.003540) 7.181708!

*d^^^u^ −3.366419% (2) (−0.033664+/−0.003740) −9.001493!

*Dv^vvUdU^ −2.441406% (2) (−0.024414+/−0.000000) −inf!

*Dd*Du^^^ud −2.586979% (2) (−0.025870+/−0.003736) −6.923750!

*UU^U^DddUu 1.445164% (2) (0.014452+/−0.000000) inf!

*vddUvdD*v −1.580027% (2) (−0.015800+/−0.000000) −inf!

*vvU^DUdu −1.942539% (4) (−0.019425+/−0.002417) −8.037209!

*dddu^Uvv −3.133881% (2) (−0.031339+/−0.002953) −10.611040!

*uDddUd^Dv 1.432704% (2) (0.014327+/−0.005486) 2.611471!

*^U^dDUvv −4.097555% (2) (−0.040976+/−0.005725) −7.157267!

*dDuvdUuuD^^ −2.257447% (2) (−0.022574+/−0.000916) −24.650046!

*dDDvUDdDU^ −0.599781% (2) (−0.005998+/−0.002375) −2.525852!

*^^v^d*U^−4.424572% 4.424572% (4) (−0.044246+/−0.013773) −3.212586!

*uU^DddvU −3.347684% (2) (−0.033477+/−0.000000) −inf!

*vDDDd^uv 3.132974% (3) (0.031330+/−0.005874) 5.333628!

*DdU^UDU*d^U −1.753045% (2) (−0.017530+/−0.000000) −inf!

*d^vvd^ 2.316300% (2) (0.023163+/−0.007226) 3.205729!

*vUDd^*^v −1.493617% (4) (−0.014936+/−0.005193) −2.876444!
*UvDUuDvuud 1.355782% (2) (0.013558+/−0.000235) 57.632061!
*uvUvdDud −1.414182% (3) (−0.014142+/−0.002026) −6.981754!
*vuUuUddv 3.822471% (5) (0.038225+/−0.015023) 2.544471!
*DvUUDvUddU^ 0.953107% (2) (0.009531+/−0.000000) inf!
*vUuv^U^*D 3.907109% (2) (0.039071+/−0.006271) 6.230482!
*uvvdD^ddu −1.650858% (2) (−0.016509+/−0.000000) −inf!
**DDvDDUdUuUD 1.861198% (3) (0.018612+/−0.003125) 5.955508!
*u^U^u*u^ −2.610356% (2) (−0.026104+/−0.002935) −8.893928!
*DU*dv^UdUd −2.242526% (3) (−0.022425+/−0.009020) −2.486051!
*vdDd^dDD 0.911558% (3) (0.009116+/−0.003251) 2.804007!
*D^DudUd^d 0.516800% (2) (0.005168+/−0.000000) inf!
*UdvDUUUu^^u −2.154441% (2) (−0.021544+/−0.000000) −inf!
*DDUUdvuUdvu 2.402369% (2) (0.024024+/−0.003185) 7.543485!
*uvduv^Du 1.187307% (2) (0.011873+/−0.001575) 7.536792!
*^uvU^DUu −0.784811% (2) (−0.007848+/−0.002317) −3.386917!
*uD^^ddUDv 1.044409% (2) (0.010444+/−0.004166) 2.506781!
*vv*UDdDvU −3.020403% (5) (−0.030204+/−0.006695) −4.511371!
*vD^D^u*DUu −0.562329% (2) (−0.005623+/−0.001039) −5.414509!
*vdv*Uu*v^ −2.285790% (2) (−0.022858+/−0.000185) −123.700886!
*dddvDDU^ud 0.035715% (2) (0.000357+/−0.000000) inf!
*^DdUvDUv* 5.064509% (4) (0.050645+/−0.015558) 3.255208!
**^DuUvuD^ −4.121329% (3) (−0.041213+/−0.013256) −3.109094!
*dvuDUuUudv^ −0.528285% (2) (−0.005283+/−0.000000) −inf!
*d^ddD^uUUU 2.264810% (2) (0.022648+/−0.000000) inf!
*dUdDdudvdD 0.560932% (2) (0.005609+/−0.000000) inf!
*^u^vdv 3.047411% (3) (0.030474+/−0.003361) 9.067386!
*DU^UDdU^Du 1.444152% (2) (0.014442+/−0.006155) 2.346298!
*vDD^^D^v 5.787293% (2) (0.057873+/−0.007040) 8.220893!
^DdD*v*v*d 3.188644% (2) (0.031886+/−0.008950) 3.562900!
*U*ud^d^dUD 1.000257% (2) (0.010003+/−0.002543) 3.933889!
*vv^dv^d*v −7.567166% (3) (−0.075672+/−0.021235) −3.563485!
*UuDUu^U^u −2.861365% (2) (−0.028614+/−0.012315) −2.323516!
*d^vvd^ 2.316300% (2) (0.023163+/−0.007226) 3.205729!
*^U^DDuUd^ 5.018650% (2) (0.050187+/−0.001241) 40.446787!
**^DvUduDv 0.749193% (2) (0.007492+/−0.002807) 2.668996!
*DD^Uvv*dd* 1.844348% (2) (0.018443+/−0.006638) 2.778644!
**vuUDu*U^UuD −1.642232% (2) (−0.016422+/−0.002175) −7.550202!
*DD^DdDUu*u*^ 1.937911% (2) (0.019379+/−0.005191) 3.733229!
*^^DdD*vdd 2.084589% (3) (0.020846+/−0.002846) 7.325774!
*D^UU*^uDvv^ 3.557655% (2) (0.035577+/−0.002249) 15.821903!
*d*u^^^vd −0.399682% (2) (−0.003997+/−0.000000) −inf!
*^U^u^^ −3.852472% (2) (−0.038525+/−0.002466) −15.621823!
*dDvv*du*^ −1.142590% (3) (−0.011426+/−0.002151) −5.311392!
*dud^^v −2.052066% (3) (−0.020521+/−0.005732) −3.580215!
*uv^uDDvu 1.284598% (3) (0.012846+/−0.003528) 3.641290!
*v^ddvd −0.664320% (2) (−0.006643+/−0.001418) −4.684072!
*UDDvduvd 1.804957% (2) (0.018050+/−0.006778) 2.662774!
*U^UUUvUdUDu −1.433123% (2) (−0.014331+/−0.000000) −inf!
*^DuuDd^U^ −0.722205% (2) (−0.007222+/−0.000000) −inf!
*^^UdvDvU 2.123791% (2) (0.021238+/−0.002305) 9.212835!
*^d*^ddduud 6.714481% (2) (0.067145+/−0.028552) 2.351693!
*uv*DDv^**UdUD −7.700198% (4) (−0.077002+/−0.001674) −46.011025!
*DUUvvU^Duu −3.598076% (2) (−0.035981+/−0.000000) −inf!
*D^DuUD*^Ddv 2.255812% (2) (0.022558+/−0.007887) 2.860160!
*^dUUv^uD** −5.092922% (3) (−0.050929+/−0.012604) −4.040751!
*U^Dvu*^Dd* 1.202297% (2) (0.012023+/−0.000955) 12.586886!
*d^*vU^u*u −1.830901% (2) (−0.018309+/−0.002689) −6.807749!
*UuUvD*^dDUu −2.953033% (2) (−0.029530+/−0.010181) −2.900653!
*d^Dv*udDdu −0.925644% (2) (−0.009256+/−0.000153) −60.401470!
**v^v^*dv 5.441140% (2) (0.054411+/−0.015244) 3.569336!
*UvdvDDuduU −1.555155% (2) (−0.015552+/−0.000000) −inf!
*duu^*^v^* −3.492478% (2) (−0.034925+/−0.001243) −28.088181!
*dvvvuu −1.082584% (2) (−0.010826+/−0.004504) −2.403720!
*vUuU^v^v −6.024509% (2) (−0.060245+/−0.002504) −24.061265!
*dv^duvuvUu −1.905549% (2) (−0.019055+/−0.005587) −3.410391!
*d^ud^duv 2.804016% (2) (0.028040+/−0.000000) inf!
*vv^^D^DV* 3.076856% (3) (0.030769+/−0.011822) 2.602682!

*dUu^DUuvd 4.143018% (2) (0.041430+/−0.011795) 3.512391!
*^U^^^u −4.116544% (3) (−0.041165+/−0.014573) −2.824766!
*UDU**uv^dv −0.659819% (2) (−0.006598+/−0.002065) −3.195401!
*vv^u*UvUu 3.999450% (2) (0.039995+/−0.011110) 3.599831!
*Uu*^uv^d*DU −3.216343% (2) (−0.032163+/−0.005542) −5.803131!
*vu*v^dUDDD 0.726953% (2) (0.007270+/−0.000772) 9.421929!
*uudUv^uD* −1.133638% (3) (−0.011336+/−0.002726) −4.158070!
*uUdDvdvD 4.152968% (6) (0.041530+/−0.013356) 3.109417!
*vDUuU*DdDvU 4.463004% (2) (0.044630+/−0.000557) 80.070904!
*^*Dd^D^v −5.058307% (2) (−0.050583+/−0.021200) −2.385988!
*^vUDuu*d^ 1.051708% (2) (0.010517+/−0.000000) inf!
*uDDUdvU^uU −1.981116% (2) (−0.019811+/−0.000692) −28.647496!
*^vd^vvvD^* 5.941276% (2) (0.059413+/−0.018163) 3.271162!
*^^^UUD^Uv 2.278288% (3) (0.022783+/−0.008262) 2.757414!
*u*DUvdd^D^v −3.381631% (2) (−0.033816+/−0.010202) −3.314553!
*vv*^**duv*uu 3.982298% (2) (0.039823+/−0.000000) inf!
*^dd^D^dU 1.983003% (2) (0.019830+/−0.000000) inf!
*DD^D^^u^d 1.781870% (2) (0.017819+/−0.004910) 3.628853!
*UDD^v^DuU 0.694443% (2) (0.006944+/−0.000000) inf!
*uU*DUvUvDv*UD −0.809384% (2) (−0.008094+/−0.000000) −inf!
*^^U*vD*D^*UU 8.357139% (2) (0.083571+/−0.000000) inf!
*d^U*U^Dv^ 1.123107% (2) (0.011231+/−0.002995) 3.749604!
*Dd^dDdUdddU −1.359289% (3) (−0.013593+/−0.005260) −2.584230!
*dvUvdu^d 2.303895% (2) (0.023039+/−0.000000) inf!
*vuDdvDdU −3.294356% (3) (−0.032944+/−0.014142) −2.329501!
*dvD^uD^D^D −4.796206% (2) (−0.047962+/−0.018138) −2.644352!
*uDDUv^d^ 0.842609% (2) (0.008426+/−0.000824) 10.221128!
*U^*DdDu^UuuU 7.677166% (2) (0.076772+/−0.000000) inf!
*uu^udDdDud −1.529338% (2) (−0.015293+/−0.006525) −2.343725!
*ddUdUdUudv −2.169895% (2) (−0.021699+/−0.000000) −inf!
*D^u*^vd*^D 1.620969% (2) (0.016210+/−0.003418) 4.743019!
*UddDvdDDv 4.089056% (3) (0.040891+/−0.016384) 2.495715!
*DDdddvuDUUu 0.771774% (5) (0.007718+/−0.003181) 2.426407!
*D^d^u^dv 0.236235% (2) (0.002362+/−0.000000) inf!
*^Dv^dDv^ −5.396861% (8) (−0.053969+/−0.012180) −4.430873!
*^*uuu^vu −0.560191% (3) (−0.005602+/−0.000045) −125.767105!
*du^^^^ −3.222702% (3) (−0.032227+/−0.008424) −3.825467!
*d^v^u^ −1.897518% (2) (−0.018975+/−0.003477) −5.457214!
*dUUuvvDUdd 3.722006% (2) (0.037220+/−0.006474) 5.748885!
*^UUvU^Uu −3.133712% (3) (−0.031337+/−0.012513) −2.504308!
*DudUdUU^^d −1.598400% (2) (−0.015984+/−0.000000) −inf!
*u^UU^uD*v −3.380232% (2) (−0.033802+/−0.008367) −4.039849!
*UuDUu*^*vud 1.175901% (2) (0.011759+/−0.001712) 6.868770!
*uUd^dud^D −5.294483% (2) (−0.052945+/−0.004084) −12.964864!
**Dvd*UU^*duuu −0.049238% (2) (−0.000492+/−0.000000) −inf!
*Udud^UUdddUD* 0.477202% (2) (0.004772+/−0.000233) 20.443757!
*^^Uud^Du −0.691880% (2) (−0.006919+/−0.002449) −2.825133!
*dvDUUd^v −0.309733% (2) (−0.003097+/−0.000000) −inf!
*uv^vvDu**D* 1.368793% (2) (0.013688+/−0.000000) inf!
*^dduduvDuD −1.978132% (2) (−0.019781+/−0.000000) −inf!
*vUuvuDudv 2.429411% (2) (0.024294+/−0.005187) 4.683376!
*^*dvdUv^ 4.531372% (2) (0.045314+/−0.003142) 14.419795!
*^vdu^D**v −0.210753% (2) (−0.002108+/−0.000093) −22.566737!
*UuD^UUvD^ 2.331814% (2) (0.023318+/−0.009152) 2.547879!
*uUDDuUD^v −2.237637% (3) (−0.022376+/−0.004825) −4.637159!
*d^*u^dDudDu −0.452641% (2) (−0.004526+/−0.001362) −3.324386!
*^^UUDudUDuD 0.630068% (2) (0.006301+/−0.000199) 31.702173!
*vDd^uDddd −1.082245% (2) (−0.010822+/−0.000000) −inf!
*UvuddvdDu −2.477874% (2) (−0.024779+/−0.000000) −inf!
*uvuDUd^d −1.992893% (4) (−0.019929+/−0.007474) −2.666276!
*^uU*UU^uU −0.519242% (2) (−0.005192+/−0.000914) −5.681386!
*UDU^u^*vUDUU 2.649931% (2) (0.026499+/−0.000000) inf!
*U^D^dvD^D 0.595662% (2) (0.005957+/−0.000312) 19.104508!
*U^Duv*^vD 2.710978% (2) (0.027110+/−0.000728) 37.256511!
*Dv^^^vuD 4.469546% (2) (0.044695+/−0.007502) 5.958038!
*^D*DD^DuDv 2.768527% (2) (0.027685+/−0.000273) 101.574095!
*uUvvddUu −2.342413% (5) (−0.023424+/−0.006071) −3.858656!
*vddUdDdv −3.675051% (2) (−0.036751+/−0.000000) −inf!

*^vduu^ 4.052707% (2) (0.040527+/−0.013905) 2.914473!
*uvduuDUD^dUU 1.258520% (2) (0.012585+/−0.000000) inf!
*U^U^^uvu −2.562990% (2) (−0.025630+/−0.008793) −2.914951!
*Uu^*Duv^d −1.754249% (2) (−0.017542+/−0.001950) −8.997386!
*uvDDdu^^ −2.065975% (2) (−0.020660+/−0.005352) −3.859900!
*^DddU^^DD* −0.933070% (2) (−0.009331+/−0.001365) −6.837633!
*vUU^dUDdud −2.527578% (2) (−0.025276+/−0.001092) −23.138624!
*UD^vdv^UU* −0.953930% (3) (−0.009539+/−0.004116) −2.317760!
*^UvDUd^Du*U −1.221073% (3) (−0.012211+/−0.004689) −2.603906!
*dDU^vudu*u −1.476002% (2) (−0.014760+/−0.000770) −19.160563!
*DuUDvU*^^d −0.749647% (3) (−0.007496+/−0.002226) −3.367357!
*^dvv^u 0.571691% (2) (0.005717+/−0.002393) 2.389007!
*v^^^du −1.761896% (2) (−0.017619+/−0.005239) −3.363211!
*vU*vUddDd −0.510310% (3) (−0.005103+/−0.000465) −10.968092!
*uu^*UuDDvD 2.439023% (2) (0.024390+/−0.000000) inf!
*ddUvDUUDvuUu 2.501327% (2) (0.025013+/−0.000000) inf!
*UuvDUDu^*Uuu 0.414665% (2) (0.004147+/−0.001412) 2.936892!
*U^*vudddUu −1.322124% (2) (−0.013221+/−0.001961) −6.740376!
*d*uUDuuv^ 2.346843% (4) (0.023468+/−0.009693) 2.421131!
**UUv*u^ddd −1.882437% (2) (−0.018824+/−0.006098) −3.086992!
*d^*u^vUu 1.167364% (2) (0.011674+/−0.001946) 5.999870!
*uUUDduUuUD^ 2.691439% (2) (0.026914+/−0.008312) 3.237949!
*U^D^UduvU −1.142640% (2) (−0.011426+/−0.003674) −3.110324!
*u^^uDD*vd 1.289817% (2) (0.012898+/−0.003026) 4.263135!
*dUD^Uu^*DdU 1.682374% (2) (0.016824+/−0.004569) 3.682163!
*dD^uud^dd 5.311253% (2) (0.053113+/−0.000000) inf!
*Udvudd^UuD −0.844048% (2) (−0.008440+/−0.000000) −inf!
*D*^dUUu^^v 6.705301% (2) (0.067053+/−0.000000) inf!
*vvUDu^vDuUd −0.252267% (2) (−0.002523+/−0.000000) −inf!
*uuUUdd^^U −2.106642% (2) (−0.021066+/−0.004000) −5.266555!
*u*DDDUvvduDU 6.827600% (2) (0.068276+/−0.020988) 3.253071!
*uDdvUd^v −1.092064% (3) (−0.010921+/−0.000085) −128.464269!
*UvdudvUDu −1.853300% (2) (−0.018533+/−0.006748) −2.746469!
*DvU*uDu^duv 1.447617% (2) (0.014476+/−0.002053) 7.051927!
*U^U^uvuvu 3.875406% (2) (0.038754+/−0.000000) inf!
*^DdUvd*d^U −1.726158% (2) (−0.017262+/−0.004076) −4.234723!
*udUDuU^DdU 1.295121% (2) (0.012951+/−0.001956) 6.619625!
*Uv^dd^*v 1.728328% (2) (0.017283+/−0.002537) 6.812038!
*udduv^vvD 1.349789% (2) (0.013498+/−0.000000) inf!
*UvdU^DddU −1.604943% (3) (−0.016049+/−0.002649) −6.057801!
*UDDuDu^v^vu 2.510461% (2) (0.025105+/−0.000000) inf!
*d^dDvUUvD 2.913071% (2) (0.029131+/−0.002051) 14.202336!
*^vUDuUU*dv 0.818548% (2) (0.008185+/−0.002922) 2.801271!
*uuuvDD^d*u −0.402866% (2) (−0.004029+/−0.000000) −inf!
*uD*uDUU^D^U 0.862003% (2) (0.008620+/−0.002983) 2.889268!
*^ddvU^vu −0.035753% (2) (−0.000358+/−0.000000) −inf!
*uv^*u^u*U −1.652213% (4) (−0.016522+/−0.006416) −2.575256!
*vdduuvvu −1.879364% (2) (−0.018794+/−0.000000) −inf!
*^dDD*d^D*uu −1.416883% (2) (−0.014169+/−0.005552) −2.551949!
*dvd^dd*dU*U −0.793426% (2) (−0.007934+/−0.000656) −12.093075!
**DDu^vvUv 1.272677% (3) (0.012727+/−0.005506) 2.311338!
**D*UvddUDuvu −1.482368% (2) (−0.014824+/−0.000000) −inf!
*^*D^^vduD 1.269152% (2) (0.012692+/−0.004156) 3.053675!
*uuUdu^dv 4.233798% (2) (0.042338+/−0.014804) 2.859821!
*uDd**^^^d −0.879214% (3) (−0.008792+/−0.003569) −2.463529!
*dDD^udUvd −1.928491% (3) (−0.019285+/−0.001140) −16.912940!
**vDD^uUdUU^ −2.933327% (3) (−0.029333+/−0.003576) −8.202892!
*vu^Dud*DDdUU −1.166902% (2) (−0.011669+/−0.000000) −inf!
*UDDDv^U^v −1.607452% (2) (−0.016075+/−0.002586) −6.216807!
**DU^v*Dvud −2.558422% (2) (−0.025584+/−0.003557) −7.193252!
*D*udDdU^Udd 0.875414% (3) (0.008754+/−0.002837) 3.085460!
*Uu^vdUvU 2.245365% (2) (0.022454+/−0.002197) 10.221509!
*DuuUDddD^*D −1.250518% (3) (−0.012505+/−0.004682) −2.671084!
*^UDUdvUDdDuU −1.851840% (2) (−0.018518+/−0.005030) −3.681224!
*^duD^dd^ 1.234694% (3) (0.012347+/−0.001232) 10.025060!
*^^DUdd^DD 1.863599% (2) (0.018636+/−0.004450) 4.187686!
*vd*Uvv^^d 1.796137% (2) (0.017961+/−0.000000) inf!
*UdDdvUd^ −1.034505% (4) (−0.010345+/−0.003919) −2.639571!
*uDDv^^uuUu* 0.561695% (2) (0.005617+/−0.000715) 7.857372!

*UDdUDvvUUD^D* −1.242790% (2) (−0.012428+/−0.000000) −inf!
*D^Uv^DvU^ −4.681828% (3) (−0.046818+/−0.015647) −2.992215!
*UudUd^DdUU 1.712679% (5) (0.017127+/−0.006379) 2.684668!
*udvDUdu*vU 1.651330% (2) (0.016513+/−0.001663) 9.930216!
*uuuuvdvv −0.558249% (2) (−0.005582+/−0.000000) −inf!
*UvDD*dv^^d 7.892590% (2) (0.078926+/−0.032668) 2.416020!
*u^*^v^udd −0.797538% (3) (−0.007975+/−0.002493) −3.198886!
*dvdvvd −9.588281% (2) (−0.095883+/−0.040309) −2.378719!
*^uDdvD^Dv 2.509156% (2) (0.025092+/−0.000000) inf!
*^^uvu^ 1.848269% (3) (0.018483+/−0.005243) 3.525449!
*udDvU*uvd 1.332243% (2) (0.013322+/−0.002477) 5.378665!
*^vvDdD^u 8.876167% (2) (0.088762+/−0.034132) 2.600549!
*dUvdvvvU 1.447988% (2) (0.014480+/−0.003840) 3.770982!
*^DD^*UduUu*^ 1.051708% (2) (0.010517+/−0.000000) inf!
*u*dDuDv*^dd −1.455385% (2) (−0.014554+/−0.000000) −inf!
*Uvd*Uuud**DDU 0.615308% (2) (0.006153+/−0.001960) 3.138888!
*DvvuuUd^ 1.311378% (2) (0.013114+/−0.001914) 6.850720!
*D^dDDdd^UDU 1.140270% (4) (0.011403+/−0.003865) 2.950411!
*^^dUD^Dd −0.803388% (2) (−0.008034+/−0.002583) −3.109921!
*D^*UuvvUUv 1.905307% (2) (0.019053+/−0.007649) 2.491036!
*^dDvUUuDUU −1.446318% (3) (−0.014463+/−0.005947) −2.431864!
*uuDDUdDUv^DD 0.696465% (2) (0.006965+/−0.000602) 11.564041!
*UddD^^*du 0.837604% (2) (0.008376+/−0.003255) 2.573329!
**vDdu^uU −1.672716% (2) (−0.016727+/−0.001463) −11.436165!
*U*Dd^UvddUD 1.291265% (3) (0.012913+/−0.000652) 19.801203!
**duudu^u^DU 3.291059% (2) (0.032911+/−0.012706) 2.590195!
*UuDuUDuD^uuud 0.857847% (2) (0.008578+/−0.000000) inf!
*^UdvDu^dU −1.384425% (2) (−0.013844+/−0.001090) −12.701613!
*Ud^dU^dUddD 2.089409% (2) (0.020894+/−0.000000) inf!
*ddvUUv^du −1.720370% (2) (−0.017204+/−0.000426) −40.406964!
*UDvD^D^U^U −4.832699% (2) (−0.048327+/−0.006994) −6.909756!
*dUv^dvD^ −1.370506% (2) (−0.013705+/−0.000000) −inf!
*vU^d^dv^u −3.668180% (2) (−0.036682+/−0.004090) −8.969513!
*UdduvUUu**Ud 1.213415% (2) (0.012134+/−0.005082) 2.387530!
*DU^vvudu 2.954028% (2) (0.029540+/−0.012238) 2.413863!
*vud*dUUv −2.471947% (3) (−0.024719+/−0.007805) −3.167278!
*d^^^***^uuU −1.843969% (2) (−0.018440+/−0.000000) −inf!
*UUvUdUuuDv −1.547552% (3) (−0.015476+/−0.006314) −2.451038!
*UDU^vv^^ 6.032544% (3) (0.060325+/−0.020273) 2.975707!
*dDdvdDd*^U 2.082694% (2) (0.020827+/−0.006389) 3.259857!
*uvDDdD^vD 2.901129% (5) (0.029011+/−0.003674) 7.896984!
*uDuvDuuvUD 2.380121% (3) (0.023801+/−0.008465) 2.811645!
*DUudDD^ddudU 1.468703% (2) (0.014687+/−0.006261) 2.345860!
*udU*Ud*vuduDd −1.757964% (4) (−0.017580+/−0.007435) −2.364426!
*vdUdvuUuu 2.752075% (3) (0.027521+/−0.006458) 4.261685!
*vv*D^^^u 2.742787% (2) (0.027428+/−0.008823) 3.108537!
*u^D*^Uvuu 4.324624% (2) (0.043246+/−0.006622) 6.530755!
*DU^^*v^D^ −5.992011% (2) (−0.059920+/−0.002000) −29.953193!
**U^^UvdDu 2.141828% (2) (0.021418+/−0.000000) inf!
*dUDU*vUvdvuU −3.387057% (2) (−0.033871+/−0.000000) −inf!
*^DvD*vdd^ −2.782592% (2) (−0.027826+/−0.003977) −6.996903!
*vD^UD^^^ 2.810537% (2) (0.028105+/−0.011394) 2.466776!
*U^v*vuuD 3.895129% (2) (0.038951+/−0.009670) 4.027879!
*D^Uu^DduU 3.212955% (3) (0.032130+/−0.011431) 2.810852!
*u*ddDuuvDU^d −0.190223% (2) (−0.001902+/−0.000325) −5.849462!
*vu^vdD^U 3.081745% (3) (0.030817+/−0.006615) 4.658565!
*vvvddD 2.208955% (3) (0.022090+/−0.009139) 2.417029!
*Dvu^u^vDd 2.553385% (2) (0.025534+/−0.002877) 8.875079!
*DvDvvv^Uu −0.943893% (2) (−0.009439+/−0.000000) −inf!
*dDvUUv*DdUD 5.115676% (2) (0.051157+/−0.012511) 4.088817!
*v^^Uv^d^ −3.373190% (2) (−0.033732+/−0.000120) −282.195630!
*uDUu^u^uD^U* 1.297661% (2) (0.012977+/−0.000108) 119.613358!
*v^Dvu*Uu 3.364576% (3) (0.033646+/−0.009721) 3.461225!
*u*D^^Uvuu 0.399657% (2) (0.003997+/−0.001667) 2.397863!
*DU^UdUddUUUu 0.520937% (2) (0.005209+/−0.000403) 12.920904!
*vdD*uUd**d^ −0.296249% (2) (−0.002962+/−0.000857) −3.456598!
*^U*udUUU^U −1.929886% (3) (−0.019299+/−0.003914) −4.930625!
*vD^UU^vv 0.608626% (2) (0.006086+/−0.000772) 7.881671!

*U^dD*duD^u −1.550985% (3) (−0.015510+/−0.005605) −2.766908!

*^DdDuuddud −1.143578% (2) (−0.011436+/−0.002059) −5.553134!

*U^DuuDdvv 1.383265% (2) (0.013833+/−0.000000) inf!

*u^UUuUu^ −2.612598% (3) (−0.026126+/−0.003151) −8.291245!

*UD*uuddUU^D −1.706782% (3) (−0.017068+/−0.007043) −2.423319!

*^U^uUvuvu 1.644562% (2) (0.016446+/−0.004691) 3.505585!

*^dv^D^ud* 1.043805% (2) (0.010438+/−0.002336) 4.468408!

*DuU^dduddU*u −1.778403% (2) (−0.017784+/−0.002002) −8.884192!

*^dDuUD^vvD* 3.573471% (2) (0.035735+/−0.000000) inf!

*UD^uUdUudUd −0.499637% (2) (−0.004996+/−0.002127) −2.349205!

*dDuDUuvDv 0.146416% (2) (0.001464+/−0.000000) inf!

*vvdDuDD*vU −0.882949% (2) (−0.008829+/−0.002245) −3.933685!

*UUDU^vvvvv*^ 8.261418% (2) (0.082614+/−0.013505) 6.117359!

**d^vUU^vD 0.802934% (2) (0.008029+/−0.000025) 321.728958!

*vd^v^UvDd 2.676237% (2) (0.026762+/−0.001842) 14.527370!

*UuUD^vduD 0.753901% (2) (0.007539+/−0.000000) inf!

*Ddv^UDDduU 1.920787% (2) (0.019208+/−0.001766) 10.877266!

*vvddvv 4.159041% (2) (0.041590+/−0.001027) 40.515584!

*vuUD^^d^ −6.010933% (3) (−0.060109+/−0.021493) −2.796695!

*uvdu^^ −1.456276% (2) (−0.014563+/−0.000432) −33.727230!

*^*vDvd^u 1.275292% (3) (0.012753+/−0.005073) 2.513723!

*DvDUdv^*Du −1.611108% (3) (−0.016111+/−0.006799) −2.369452!

*^^vuU*^d −2.513099% (2) (−0.025131+/−0.005241) −4.794667!

*vUv*vUUvDdDU 0.955143% (2) (0.009551+/−0.000000) inf!

*^d^^UuDd −2.424243% (2) (−0.024242+/−0.000000) −inf!

*^DvUuDdduv 0.528543% (2) (0.005285+/−0.000000) inf!

*ud*vD^v**^DU 4.714012% (2) (0.047140+/−0.002672) 17.641618!

*D^UvuUDUu −0.821252% (3) (−0.008213+/−0.001947) −4.218773!

*vvuu^uU* 1.643214% (2) (0.016432+/−0.000767) 21.428132!

*Ud^^UUvuD*dD 2.039792% (2) (0.020398+/−0.000000) inf!

*D*D^d^^vdvD 2.579777% (2) (0.025798+/−0.005913) 4.363204!

*Uv*Du^UU^DD −1.600919% (2) (−0.016009+/−0.000000) −inf!

*vddDUd*dv 3.140487% (2) (0.031405+/−0.005533) 5.676059!

*^UdddddudD 0.870171% (2) (0.008702+/−0.000000) inf!

*udDDvUv*^dd −4.661885% (2) (−0.046619+/−0.000000) −inf!

*d^^^u^ −3.366419% (2) (−0.033664+/−0.003740) −9.001493!

*uu^d^UDDuuD 0.898467% (2) (0.008985+/−0.000000) inf!

*ddvDv*vv 14.143827% (2) (0.141438+/−0.026904) 5.257186!

**vUdduUD^dD −2.163268% (2) (−0.021633+/−0.000000) −inf!

*vUUUuUvD^^ −5.487563% (2) (−0.054876+/−0.005758) −9.531095!

*UUuvvdu^dD 0.638050% (2) (0.006380+/−0.000315) 20.242796!

*^DdDU^Dv 3.400052% (6) (0.034001+/−0.005545) 6.131481!

*Dv^^DUDUdUD 5.287275% (2) (0.052873+/−0.000000) inf!

*uu*U*^^UdUDv 1.022675% (2) (0.010227+/−0.000000) inf!

**vUuuvDdU^ −5.489529% (3) (−0.054895+/−0.005226) −10.505262!

*uuvu^U*v^ −0.876736% (2) (−0.008767+/−0.002750) −3.187902!

*dvdvvd −9.588281% (2) (−0.095883+/−0.040309) −2.378719!

*vD^^udDvDDD 4.680100% (2) (0.046801+/−0.000000) inf!

*dvUdvu*vD 2.352695% (2) (0.023527+/−0.010175) 2.312305!

*u^uUuvD^u −2.248471% (2) (−0.022485+/−0.004183) −5.374783!

*UUUuddUv^U −2.772632% (3) (−0.027726+/−0.006183) −4.484581!

*v^**uD^D^dU −4.063296% (3) (−0.040633+/−0.013702) −2.965514!

*UUDUUUD^dUu −1.406558% (2) (−0.014066+/−0.005628) −2.499285!

*UvvUvU^dv −1.308220% (2) (−0.013082+/−0.001658) −7.888471!

**^dUudUdDvD −1.150587% (2) (−0.011506+/−0.001426) −8.068857!

*DddvDdd^ −0.550887% (2) (−0.005509+/−0.000495) −11.136367!

*d*vUU^UUUU 0.602072% (2) (0.006021+/−0.002176) 2.766916!

*^duuu^UD 6.705301% (2) (0.067053+/−0.000000) inf!

**UdUvUDvU^ −1.894707% (2) (−0.018947+/−0.003294) −5.751359!

*v^vdUv^U −2.587168% (2) (−0.025872+/−0.007853) −3.294509!

*vvv^^Udv −3.295944% (3) (−0.032959+/−0.011231) −2.934779!

*DUDD*uduv^^ −5.177533% (2) (−0.051775+/−0.014277) −3.626561!

*DdDddDvUv 2.034665% (3) (0.020347+/−0.005252) 3.874137!

*vduu*D^vd 2.272597% (2) (0.022726+/−0.007353) 3.090584!

*^DdDUu*u^U*D 2.187442% (2) (0.021874+/−0.008739) 2.503117!

*DvuD*^vDUv^ −5.022306% (2) (−0.050223+/−0.000593) −84.627276!

*^v*dUUuDdv 0.818548% (2) (0.008185+/−0.002922) 2.801271!

*dUvdDvu^ 2.981252% (2) (0.029813+/−0.010358) 2.878128!
*Uv^Ud^UD^ 2.413153% (2) (0.024132+/−0.000000) inf!
*UdU^U^vUUd −1.591761% (2) (−0.015918+/−0.000000) −inf!
*UUd^vuuuv −0.452286% (2) (−0.004523+/−0.000000) −inf!
*Dd^u*^*vv −0.600977% (2) (−0.006010+/−0.000097) −62.087683!
*uUvdUdUv^ −2.550456% (3) (−0.025505+/−0.001962) −12.997285!
*uDud^dv^ 2.795572% (2) (0.027956+/−0.011279) 2.478483!
*UUdUdvUudU 0.932359% (2) (0.009324+/−0.001475) 6.320818!
*vDDddUD^uu −0.823944% (2) (−0.008239+/−0.001102) −7.477728!
*^^^^Ud −2.129542% (2) (−0.021295+/−0.005188) −4.104903!
**^vuD^dUd^ −4.854371% (2) (−0.048544+/−0.000000) −inf!
*duuvdduDDuU −4.166966% (2) (−0.041670+/−0.016180) −2.575340!
**v^*^dudDD −2.200574% (3) (−0.022006+/−0.006421) −3.426885!
*Dv^u^Uu^ −6.699541% (2) (−0.066995+/−0.018905) −3.543703!
*uuduvDUDu 1.948106% (3) (0.019481+/−0.004079) 4.775578!
*DD^Uv^Dv 4.102986% (4) (0.041030+/−0.014562) 2.817678!
*d^^UddU*dDD 1.942735% (2) (0.019427+/−0.006656) 2.918910!
*udvvvu −2.384062% (4) (−0.023841+/−0.008892) −2.681199!
*U^U*vu^d −1.331416% (3) (−0.013314+/−0.004509) −2.952601!
*D^U^U^vu −2.425151% (4) (−0.024252+/−0.005801) −4.180888!
**Dd^DUvdv 4.151918% (2) (0.041519+/−0.000000) inf!
*U*d^u^DUU −2.694771% (3) (−0.026948+/−0.011168) −2.412877!
*^duUUU*vv 2.459224% (3) (0.024592+/−0.010110) 2.432577!
*UdDv^^uuu 1.419475% (2) (0.014195+/−0.004974) 2.853814!
*vu^UUD*uud −1.727944% (2) (−0.017279+/−0.001466) −11.786587!
*uUvdvDDu 1.346944% (3) (0.013469+/−0.002805) 4.802545!
*uuD^^DUD^ 2.443888% (2) (0.024439+/−0.005734) 4.262431!
*UddduUddD^DD −0.619101% (3) (−0.006191+/−0.001997) −3.100613!
*u^^^vd −0.399682% (2) (−0.003997+/−0.000000) −inf!
*^D^*uvvu −0.256538% (2) (−0.002565+/−0.000000) −inf!
*^dUu^dDu^ −3.555044% (2) (−0.035550+/−0.000000) −inf!
*^*uUuu*^u 1.551373% (4) (0.015514+/−0.005889) 2.634242!
*ddUD^du^U −2.339505% (3) (−0.023395+/−0.002098) −11.153731!
*vv^uvu 3.192232% (2) (0.031922+/−0.006900) 4.626675!
*d^UDdvuUD 3.076708% (2) (0.030767+/−0.001904) 16.160896!
*UuDUd^D^Du −1.842330% (2) (−0.018423+/−0.002206) −8.350948!
*vUd^D*Dvu*D −4.089109% (3) (−0.040891+/−0.010564) −3.870674!
*vu^dD^u*vd −0.877809% (2) (−0.008778+/−0.000000) −inf!
*^v^DuUUD^ 1.051708% (2) (0.010517+/−0.000000) inf!
*^^^^dv 3.473249% (4) (0.034732+/−0.012497) 2.779294!
*UvD^dD*^*uUv* 3.665664% (2) (0.036657+/−0.007712) 4.753293!
*UvdDvuu^ −1.676156% (2) (−0.016762+/−0.000000) −inf!
*du^DUu*dv 1.490327% (4) (0.014903+/−0.004494) 3.316000!
*vUu^DudUvu −2.310142% (2) (−0.023101+/−0.002019) −11.441680!
*vvDDD^uDUd 2.759741% (3) (0.027597+/−0.008119) 3.399154!
*uD^UDvv*DD* 7.545215% (2) (0.075452+/−0.003376) 22.347971!
**dvd*^duuD 1.239498% (2) (0.012395+/−0.001693) 7.323125!
**uDuUv^Duu 1.073489% (2) (0.010735+/−0.000830) 12.932987!
*Dd*vddU^d −0.206759% (2) (−0.002068+/−0.000000) −inf!
*Dd^^uDuDUD 1.148495% (2) (0.011485+/−0.002843) 4.040291!
*dDuUu^vUuu 0.617826% (2) (0.006178+/−0.000000) inf!
*v**uuvvdD 2.083040% (2) (0.020830+/−0.000388) 53.701918!
*v^UUdu^u −0.377253% (2) (−0.003773+/−0.000063) −60.255562!
*^DU*U*UUdUUU^ −3.067221% (3) (−0.030672+/−0.006060) −5.061279!
*vdUd^Duv −1.299268% (2) (−0.012993+/−0.002529) −5.137670!
*dUuvUvud −2.970112% (2) (−0.029701+/−0.003640) −8.160253!
*^uuu*^dDuv −2.040774% (2) (−0.020408+/−0.001400) −14.572104!
*U^^^^u −4.946462% (2) (−0.049465+/−0.003390) −14.593420!
*vuuu*^D^^uU −0.878938% (2) (−0.008789+/−0.000000) −inf!
*^^^^Du −3.307757% (2) (−0.033078+/−0.010692) −3.093695!
*vvvddD 2.208955% (3) (0.022090+/−0.009139) 2.417029!
*uUddvuU^U −1.240819% (3) (−0.012408+/−0.003035) −4.088803!
*vuuuv^ddd 1.025508% (2) (0.010255+/−0.003459) 2.964961!
*^DvDD^uUd 0.809941% (3) (0.008099+/−0.003329) 2.432955!
*DD*DuvvuddDD 1.109388% (2) (0.011094+/−0.001704) 6.509282!
*vuu^uUUUdU 0.935266% (2) (0.009353+/−0.002084) 4.486897!
**d^vu^uu −0.450431% (2) (−0.004504+/−0.000289) −15.600238!
*vddUDDvDD −2.010904% (2) (−0.020109+/−0.007285) −2.760481!

*vU^dDuuU^ −0.415368% (2) (−0.004154+/−0.000000) −inf!
*Uvv^^udU −1.505360% (2) (−0.015054+/−0.001928) −7.808007!
*^vv^DUuU −3.486414% (4) (−0.034864+/−0.012317) −2.830628!
*D^^DduUDv 3.206318% (4) (0.032063+/−0.011498) 2.788693!
*dDDUUvDDdUUU 1.819858% (2) (0.018199+/−0.007748) 2.348757!
*vvD^^DUd^D −6.684244% (2) (−0.066842+/−0.012932) −5.168879!
*^D*uDDddDD^ −0.944879% (2) (−0.009449+/−0.000000) −inf!
*UDDDDuD*uvUd −2.051502% (3) (−0.020515+/−0.004282) −4.790939!
*^^^^Du −3.307757% (2) (−0.033078+/−0.010692) −3.093695!
*duDduvvu −2.105645% (2) (−0.021056+/−0.004057) −5.189783!
*Dv^vUuD^D 3.269272% (3) (0.032693+/−0.010253) 3.188457!
*v^^^*v^^ 2.851183% (2) (0.028512+/−0.001778) 16.033676!
*u^v*^^Du 0.443202% (3) (0.004432+/−0.001492) 2.970708!
*u*udud^Dv 1.474031% (3) (0.014740+/−0.000021) 703.636319!
*^UddudDuuDUu −1.806383% (2) (−0.018064+/−0.002764) −6.535864!
*udU^uvvD*d*U 1.139604% (2) (0.011396+/−0.000000) inf!
*UUvDvdD^v −6.287940% (2) (−0.062879+/−0.000000) −inf!
*udvvD^UDU −1.326190% (2) (−0.013262+/−0.005305) −2.499817!
*^^d*uD^vD*uDd 0.525728% (2) (0.005257+/−0.000000) inf!
*vD*^vvuvv 5.865590% (3) (0.058656+/−0.024489) 2.395150!
*DUU*uD^*uv^ −2.015468% (2) (−0.020155+/−0.006436) −3.131384!
*uuuuv^ 0.448637% (3) (0.004486+/−0.001538) 2.917343!
*v^Ud*d*DUUd 1.249058% (2) (0.012491+/−0.000001) 11481.201208!
*^u*DdDUU^dd −1.760562% (2) (−0.017606+/−0.000000) −inf!
**vUduDu*uuDDd −1.207587% (2) (−0.012076+/−0.004833) −2.498875!
*uUudUUuDDUv 1.232303% (3) (0.012323+/−0.004208) 2.928610!
*DDuu^D^^U 0.702901% (2) (0.007029+/−0.002013) 3.492366!
*D^Uddv^uU −0.417173% (2) (−0.004172+/−0.000000) −inf!
*d^vv^udd 0.769444% (3) (0.007694+/−0.002801) 2.747102!
*Dv^^dvuuU^ −0.415368% (2) (−0.004154+/−0.000000) −inf!
*u^U^^^ −1.074696% (2) (−0.010747+/−0.001216) −8.834334!
*dvDDvUudd 2.911381% (2) (0.029114+/−0.009967) 2.920899!
*ddd^D*UuvDD −2.077718% (2) (−0.020777+/−0.000000) −inf!
*vUDvvuvU −5.108408% (2) (−0.051084+/−0.016566) −3.083648!
*DdDdUv^UDD 0.846402% (2) (0.008464+/−0.003256) 2.599261!
*u^^^vd −0.399682% (2) (−0.003997+/−0.000000) −inf!
*dUDvUUudv −11.381753% (2) (−0.113818+/−0.000000) −inf!
*D^UuUu^DUD −1.967790% (2) (−0.019678+/−0.005252) −3.746518!
*udv*v^v^ 6.550283% (3) (0.065503+/−0.002678) 24.457441!
*vDDUdUuddUU 1.856003% (2) (0.018560+/−0.005552) 3.342857!
*dDvdUvuUUu −1.014984% (2) (−0.010150+/−0.003522) −2.882049!
*DUvvdUdD*D^D 1.135445% (2) (0.011354+/−0.000000) inf!
*D*dDD^ddUuUD 1.204580% (2) (0.012046+/−0.000372) 32.381993!
*UuuudUvv 2.232585% (3) (0.022326+/−0.002001) 11.156329!
*^UD^^DUvDD^ −2.249482% (2) (−0.022495+/−0.000000) −inf!
*DUUvUUUDdDU^ −1.145800% (2) (−0.011458+/−0.002913) −3.933092!
*uUuDU^DDv 1.545986% (2) (0.015460+/−0.001144) 13.511344!
*uDD^^Ud^UD −3.435745% (2) (−0.034357+/−0.011931) −2.879740!
*vvDdvUdu −0.585684% (2) (−0.005857+/−0.001494) −3.920749!
*DuDv^duud −2.631779% (3) (−0.026318+/−0.005699) −4.618127!
*UvuuDdDdUdDU 1.728678% (2) (0.017287+/−0.006462) 2.674947!
*u^uUu^u^ −2.688884% (2) (−0.026889+/−0.004046) −6.646547!
**vuv*v*DuvD −7.216463% (2) (−0.072165+/−0.008788) −8.212145!
*^u^DDd^vD 4.057468% (2) (0.040575+/−0.008704) 4.661855!
**v*DU^UU*uD^ −1.683137% (2) (−0.016831+/−0.002483) −6.777638!
*^^vDv*ddU* −0.438650% (2) (−0.004386+/−0.001533) −2.860930!
*u^^v^v −6.183409% (3) (−0.061834+/−0.009074) −6.814361!
*uuDdvu^^* −4.713424% (2) (−0.047134+/−0.000000) −inf!
*^^^^^u −4.946462% (2) (−0.049465+/−0.003390) −14.593420!
*U^vdUuuD*d −2.318559% (2) (−0.023186+/−0.003739) −6.201096!
*dDU*^DdUuv 0.486522% (2) (0.004865+/−0.001872) 2.599108!
*vUDUUDuDvUDD 1.056342% (2) (0.010563+/−0.004350) 2.428333!
*^DvdduuUd 3.023499% (2) (0.030235+/−0.002093) 14.443518!
*vu^uDuDvu −0.796502% (2) (−0.007965+/−0.000187) −42.622283!
*DDuvU^Uv^D 3.297861% (2) (0.032979+/−0.005532) 5.961710!
*UuuD*uv*u^U* −1.354719% (2) (−0.013547+/−0.001677) −8.078602!
*D^*ddUUUuUD −2.113147% (4) (−0.021131+/−0.006223) −3.395823 !

*uu^u^dDUUuU −3.372932% (2) (−0.033729+/−0.011375) −2.965168!
*uD*dU^dU*^U 0.568288% (2) (0.005683+/−0.001419) 4.005251!
*U^vU^d*uDv 1.758011% (2) (0.017580+/−0.005526) 3.181343!
*DUd^UDuu*^d −2.909089% (2) (−0.029091+/−0.000359) −81.100302!
*u^*DvUduu 2.686522% (2) (0.026865+/−0.008352) 3.216803!
*vUdUduUv −3.576478% (3) (−0.035765+/−0.013708) −2.609003!
*uuv*DUUU*Ddd^ 5.074406% (2) (0.050744+/−0.000000) inf!
*v^dvdUddD 2.460630% (2) (0.024606+/−0.000000) inf!
*^^dDud^v −3.020606% (2) (−0.030206+/−0.000000) −inf!
*dDvUvDUDvv −3.335125% (2) (−0.033351+/−0.005115) −6.520682!
*uuUUU^dDDUuU −2.297414% (2) (−0.022974+/−0.005294) −4.339662!
*UdDU^vU^Duv −0.475688% (2) (−0.004757+/−0.000000) −inf!
*dduD^uduv −1.353412% (2) (−0.013534+/−0.001723) −7.856894!
*d*uUuvUuuu −1.142243% (3) (−0.011422+/−0.001147) −9.958992!
*udDuduu^v 2.617075% (2) (0.026171+/−0.010060) 2.601552!
*Duu*uUD^vD 1.866106% (3) (0.018661+/−0.001229) 15.182633!
*uU^uvDvDD^ −5.336622% (2) (−0.053366+/−0.000000) −inf!
*DudD*Ud*^^ −1.817796% (3) (−0.018178+/−0.005420) −3.353909!
*U*vU^^^DD 3.569542% (5) (0.035695+/−0.014601) 2.444709!
*UD^UuDUv^u −2.746582% (2) (−0.027466+/−0.001363) −20.143998!
*vu^^v^ 2.622358% (3) (0.026224+/−0.004551) 5.761839!
*vdDud^dUU 3.201981% (3) (0.032020+/−0.005845) 5.478008!
*uuu**ddd^vd* −1.029586% (3) (−0.010296+/−0.004338) −2.373214!
*^^Ddd^^U −0.249198% (2) (−0.002492+/−0.000000) −inf!
**u^uDUDuDuUDD −1.260753% (2) (−0.012608+/−0.005121) −2.462106!
*d^u^^Dd^* 0.652261% (2) (0.006523+/−0.000933) 6.993722!
*u^^^vd −0.399682% (2) (−0.003997+/−0.000000) −inf!
**^uDDdUUD^d 1.725016% (2) (0.017250+/−0.004244) 4.064809!
*uuUuvDU*DuU 1.026631% (2) (0.010266+/−0.003915) 2.622248!
*uDUuDd^ddDUD* −0.112526% (2) (−0.001125+/−0.000153) −7.336246!
*u^u*DuU^duu* −0.149582% (2) (−0.001496+/−0.000560) −2.669041!
*Dvd^^*^^ −6.705226% (3) (−0.067052+/−0.022308) −3.005812!
*ud*DuDUU^^ 0.224815% (2) (0.002248+/−0.000896) 2.508776!
*vUdU^uDdDU −1.806969% (3) (−0.018070+/−0.005654) −3.195957!
*Uu*DduvvUu −4.753754% (2) (−0.047538+/−0.009467) −5.021294!
*uvUUU^DDu*Ud −1.326390% (2) (−0.013264+/−0.000027) −498.027779!
*vDdU*v^^uD −3.414768% (3) (−0.034148+/−0.006344) −5.383051!
*DvvUud*d^ −3.159767% (2) (−0.031598+/−0.004965) −6.363523!
*uvvv*uuu −0.719022% (2) (−0.007190+/−0.002779) −2.587329!
*^U*$_u$U^Dvu −2.975371% (2) (−0.029754+/−0.003793) −7.843361!
*D^duUUUDvD 1.914575% (2) (0.019146+/−0.001626) 11.777768!
*^uuu*ddDd^ −5.078681% (3) (−0.050787+/−0.019192) −2.646265!
*dU*^dDDu^v 1.931482% (2) (0.019315+/−0.000000) inf!
*DUDduD*U^Dudd 1.355125% (2) (0.013551+/−0.001616) 8.384611!
*dvuvuUvDU 4.103965% (2) (0.041040+/−0.000000) inf!
*uUDuUdduv^ −3.291137% (2) (−0.032911+/−0.005480) −6.006071!
*DvuUudvdU 1.962025% (2) (0.019620+/−0.004563) 4.299480!
*^D^dddDv −5.107602% (2) (−0.051076+/−0.012302) −4.151778!
*duUvuvU^Uv 2.495926% (2) (0.024959+/−0.000000) inf!
*DUD^^^d*DUD −5.524170% (2) (−0.055242+/−0.020386) −2.709848!
*^udv^^ −1.732582% (2) (−0.017326+/−0.000790) −21.933999!
*uvDUuuDD*Udu 1.316033% (2) (0.013160+/−0.005618) 2.342527!
*UdddUDudd^ −1.016460% (2) (−0.010165+/−0.002800) −3.630227!
*d^UvDvDDU −1.003622% (3) (−0.010036+/−0.004304) −2.332076!
*^ud^^^ −1.603708% (3) (−0.016037+/−0.006193) −2.589567!
*u^Uvuu^uU 2.044909% (2) (0.020449+/−0.000000) inf!
*vd*d^DdUduDd −3.346638% (2) (−0.033466+/−0.000000) −inf!
*vd^dDuvD 2.725489% (2) (0.027255+/−0.008281) 3.291177!
*^dd^^Uu* −2.976821% (2) (−0.029768+/−0.009250) −3.218328!
*uuDuvDu^U −2.167732% (2) (−0.021677+/−0.002716) −7.980290!
*vUvuUUuUvU 0.958300% (2) (0.009583+/−0.003464) 2.766136!
*vd^udu*UUU 1.089629% (2) (0.010896+/−0.000000) inf!
*vdUUvud^ −1.047563% (3) (−0.010476+/−0.004343) −2.412084!
*du^^U^ −3.222702% (3) (−0.032227+/−0.008424) −3.825467!
*U^^UDDDDd 1.289817% (2) (0.012898+/−0.003026) 4.263135!
*vv^vdDvUU −5.766081% (2) (−0.057661+/−0.014154) −4.073826!
*uvu^^uuu^d −2.739308% (2) (−0.027393+/−0.000000) −inf!
*DUv^uDddU^uU −0.849647% (2) (−0.008496+/−0.000000) −inf!

*Dv^duvuD 2.584384% (3) (0.025844+/−0.008481) 3.047366!
*U^dD^uuUu −2.704408% (2) (−0.027044+/−0.006827) −3.961465!
*Dv^u^vvU −4.292337% (2) (−0.042923+/−0.012921) −3.321958!
*DD^Du^u^D 1.132231% (2) (0.011322+/−0.000000) inf!
*vvvddD 2.208955% (3) (0.022090+/−0.009139) 2.417029!
*DD*U^vdDDuv −0.507665% (3) (−0.005077+/−0.001920) −2.644345!
*vdUD*u^*UuU −0.486408% (3) (−0.004864+/−0.001281) −3.797973!
*ddv^DDvu 1.936056% (4) (0.019361+/−0.003344) 5.789604!
*Dv^Dd^v^U −2.587168% (2) (−0.025872+/−0.007853) −3.294509!
*UvddddDdDU 1.603302% (2) (0.016033+/−0.004661) 3.439484!
*UUUDu*vUvu 1.477594% (3) (0.014776+/−0.004945) 2.987883!
*UvuvuD^vD 3.394475% (2) (0.033945+/−0.000260) 130.609007!
*^dvv^u 0.571691% (2) (0.005717+/−0.002393) 2.389007!
*^^^^dv 3.473249% (4) (0.034732+/−0.012497) 2.779294!
*UDDUv^^D^ −6.056114% (3) (−0.060561+/−0.023058) −2.626517!
*ud*Du^vD^ 4.129340% (2) (0.041293+/−0.001867) 22.115548!
*vD*^DDdvUDu −1.643945% (2) (−0.016439+/−0.000000) −inf!
*dDuvUuvDU 3.348345% (3) (0.033483+/−0.013088) 2.558386!
*UDDdu^DudUu 0.189481% (2) (0.001895+/−0.000720) 2.631794!
*dv^^Uud*D 0.497158% (2) (0.004972+/−0.001628) 3.054634!
*u^^dduuD −2.121497% (3) (−0.021215+/−0.005464) −3.882849!
*dd*UDUv^v −1.415659% (2) (−0.014157+/−0.002728) −5.188790!
*UUDdvuv^*D −1.853326% (3) (−0.018533+/−0.006160) −3.008754!
*UuDUUUUD^uDUU 1.137468% (2) (0.011375+/−0.000703) 16.188906!
*D^DdDdUudD −3.666958% (4) (−0.036670+/−0.007834) −4.680584!
*D^v^DDuu −0.795123% (2) (−0.007951+/−0.000912) −8.719906!
*uuudvDd^v 2.824552% (2) (0.028246+/−0.011035) 2.559734!
*d^uvUv*Ud −4.293482% (2) (−0.042935+/−0.015043) −2.854233!
*uv^*u^U*u −1.869618% (3) (−0.018696+/−0.005778) −3.235840!
*du^^ud^d −2.240101% (3) (−0.022401+/−0.003216) −6.965383!
*u*dU^du^ 0.845842% (2) (0.008458+/−0.000096) 88.179892!
*D*vvd^ud −2.767880% (2) (−0.027679+/−0.005882) −4.705812!
**^vdU^^Du 3.938292% (2) (0.039383+/−0.000000) inf!
*^v^vdv 4.886654% (2) (0.048867+/−0.007403) 6.601344!
*^U^^^u −4.116544% (3) (−0.041165+/−0.014573) −2.824766!
*Uu^*ddu^ −2.059708% (3) (−0.020597+/−0.002421) −8.508993!
*UuUUuv^u*U −0.626299% (2) (−0.006263+/−0.000000) −inf!
*vD*vUdvD^UU 3.825955% (2) (0.038260+/−0.016408) 2.331809!
*d*^uuu^u^ −2.688884% (2) (−0.026889+/−0.004046) −6.646547!
*^uvd^d −2.628488% (4) (−0.026285+/−0.010782) −2.437840!
*vUD^d*uU^ −1.161819% (2) (−0.011618+/−0.002864) −4.057323!
*vDDuduvUu −1.345681% (3) (−0.013457+/−0.005426) −2.480053!
*udu*v^^*U 3.111471% (2) (0.031115+/−0.004690) 6.634783!
*vdvuvv*U 0.702156% (2) (0.007022+/−0.001598) 4.394869!
*^dv^DuD^dD 3.131851% (2) (0.031319+/−0.000000) inf!
*Du^UUuvv^ 2.112454% (2) (0.021125+/−0.000839) 25.183960!
*uuuD^^dU −2.133543% (2) (−0.021335+/−0.001862) −11.458404!
*^vUdUdduu −2.150942% (2) (−0.021509+/−0.000000) −inf!
*D*UDuD*duv^* 1.477472% (5) (0.014775+/−0.006354) 2.325121!
*Uu^uvvDd*U**U 6.636574% (2) (0.066366+/−0.000000) inf!
*uUDDUddd^dUd −2.491003% (2) (−0.024910+/−0.002523) −9.873138!
*UUDD^vvUvv 8.728192% (2) (0.087282+/−0.010298) 8.475473!
*^*^D*uDudD −1.476466% (2) (−0.014765+/−0.001227) −12.031469!
*^u^vdU^U −1.410723% (2) (−0.014107+/−0.000000) −inf!
*Uu^uDDDvuDD 2.308184% (2) (0.023082+/−0.001953) 11.820853!
*UUdvd^vU 6.766296% (2) (0.067663+/−0.005021) 13.474716!
*^uDvDDDvD 13.916737% (2) (0.139167+/−0.056679) 2.455373!
*UDvU^**^dUd* 2.630826% (2) (0.026308+/−0.004207) 6.253109!
*DdvdvUDvD^ −1.409200% (2) (−0.014092+/−0.000011) −1336.082678!
*ddDudvu^*UD 2.689235% (2) (0.026892+/−0.003580) 7.512846!
*^UdUD^Ud^ −0.712860% (2) (−0.007129+/−0.000000) −inf!
*UddDDvUduDu −1.151620% (2) (−0.011516+/−0.000270) −42.604918!
*^dDdvdDUddD 1.097394% (2) (0.010974+/−0.001753) 6.260589!
**uUdDDdUd^^dU 1.220914% (2) (0.012209+/−0.000000) inf!
*UuDvUDv^D −7.021837% (4) (−0.070218+/−0.020855) −3.367042!
*^D^UudUu*U 1.026669% (2) (0.010267+/−0.000489) 20.980846!
*uDuU^d*Udud 1.481458% (2) (0.014815+/−0.003773) 3.926431!

**^vudd*dduv 0.680579% (2) (0.006806+/−0.000000) inf!
*^d^du**vDD^ −0.447908% (2) (−0.004479+/−0.001680) −2.665369!
*UDdvuvvU 5.625024% (2) (0.056250+/−0.013754) 4.089723!
*vuvUDUU**vU −5.967714% (3) (−0.059677+/−0.023152) −2.577677!
*vDDDDv^u −5.315522% (2) (−0.053155+/−0.001177) −45.161580!
*uuD^UuvDu −2.251042% (2) (−0.022510+/−0.005588) −4.028198!
*U*Dvdvuuud 2.141942% (2) (0.021419+/−0.005090) 4.207946!
*uudd^vUu −1.086210% (3) (−0.010862+/−0.002095) −5.185333!
*dUu^UUv^v* 1.795143% (2) (0.017951+/−0.000000) inf!
*D^v*uUDdv 3.781454% (5) (0.037815+/−0.007185) 5.263058!
**UddUDD^UDuu 0.264878% (4) (0.002649+/−0.000932) 2.840958!
**dDd^DvDu 4.473666% (3) (0.044737+/−0.008730) 5.124354!
*UDdDu^Ud*v −2.514026% (3) (−0.025140+/−0.009146) −2.748656!
*vvuvv^u^ 2.470023% (3) (0.024700+/−0.001436) 17.197364!
*UvvUdUu^vdD −0.898739% (2) (−0.008987+/−0.000000) −inf!
*D^^d^vdDUvv 9.275916% (2) (0.092759+/−0.000000) inf!
*DuudUUuvDDD* −1.009725% (2) (−0.010097+/−0.000000) −inf!
*vu^^^v −0.989315% (2) (−0.009893+/−0.000000) −inf!
*vd^dudUUU −1.037384% (2) (−0.010374+/−0.000326) −31.805337!
*uud^u^D*u 4.828222% (2) (0.048282+/−0.000000) inf!
*DvU*vDdUuu −4.046666% (2) (−0.040467+/−0.006281) −6.442977!
*U^UvvvUdd 1.602566% (2) (0.016026+/−0.000000) inf!
*^vuUDDDv 1.161922% (3) (0.011619+/−0.003834) 3.030755!
*dv^UvdvUdU −2.979987% (2) (−0.029800+/−0.000000) −inf!
*dUuvdUv*u 1.034331% (2) (0.010343+/−0.002862) 3.614383!
*DDduUD^^u −0.349579% (2) (−0.003496+/−0.000439) −7.970360!
*UduUvU^dD*u 1.383317% (2) (0.013833+/−0.004464) 3.098961!
*uDdduvu^ 1.372774% (2) (0.013728+/−0.001213) 11.317163!
*U^dD^dUUu 1.573419% (2) (0.015734+/−0.001570) 10.024703!
*dvvUd*^Du^ 1.727698% (3) (0.017277+/−0.006473) 2.668998!
*uUD^vD*Uv 2.574718% (3) (0.025747+/−0.007293) 3.530346!
*UDu^dvU^ −2.511987% (2) (−0.025120+/−0.005880) −4.271939!
*DuDuDdUuvUDu 2.167478% (2) (0.021675+/−0.007063) 3.068615!
*vDDUdudduv 1.131997% (2) (0.011320+/−0.000682) 16.588178!
*DudDuuUDUD^ 0.677565% (2) (0.006776+/−0.002451) 2.764461!
*uDU^^DvU −1.488936% (5) (−0.014889+/−0.006315) −2.357954!
*v^D^^UDU −2.888688% (2) (−0.028887+/−0.010025) −2.881600!
*dvdvvd −9.588281% (2) (−0.095883+/−0.040309) −2.378719!
*uuv^DDdU^ 0.842580% (2) (0.008426+/−0.002984) 2.823976!
*^uuuD^v* 0.801069% (2) (0.008011+/−0.000000) inf!
*^^UUvvudUdUU* −0.175781% (2) (−0.001758+/−0.000000) −inf!
*v^Ud*v*Ud^ 3.124920% (2) (0.031249+/−0.002550) 12.253766!
*U^^U^D^^ −4.253837% (2) (−0.042538+/−0.015596) −2.727445!
*^^^^^U −6.089361% (3) (−0.060894+/−0.019940) −3.053819!
*Ddddduu^dUud 1.347558% (3) (0.013476+/−0.004193) 3.213669!
*vduuduu^d −0.036431% (2) (−0.000364+/−0.000000) −inf!
*^v*Dv*D*U^d −0.657875% (2) (−0.006579+/−0.000105) −62.715729!
*vUu^dDDDd* 1.414196% (4) (0.014142+/−0.005320) 2.658240!
*uu*d*uU^*vDd 4.377662% (3) (0.043777+/−0.013837) 3.163659!
*UdD^dud^d −1.874618% (2) (−0.018746+/−0.000000) −inf!
*uUduD^Uuu^* −0.929814% (2) (−0.009298+/−0.002828) −3.288228!
*D^uvuUU^d −1.592559% (2) (−0.015926+/−0.001774) −8.976950!
*D*UvD^ddUuuDD 1.361817% (2) (0.013618+/−0.004752) 2.865612!
*u^DD^uuvD* −0.991848% (2) (−0.009918+/−0.000000) −inf!
*U*DDvdvuUuD −4.020932% (2) (−0.040209+/−0.010118) −3.974109!
*DuDUvUDudu −2.112915% (2) (−0.021129+/−0.007645) −2.763755!
*dv^DudUUDUuD −0.433166% (2) (−0.004332+/−0.000000) −inf!
*DvDDDvvD 23.244732% (3) (0.232447+/−0.074954) 3.101187!
*d^DDUUuDDDvU 1.033458% (2) (0.010335+/−0.002352) 4.394097!
*d*vv*d*^Uud −2.050568% (2) (−0.020506+/−0.003464) −5.919356!
*U^vuUv^^ −0.584407% (3) (−0.005844+/−0.002072) −2.820517!
**duuvvUuu*UD 1.341096% (2) (0.013411+/−0.001020) 13.150338!
*D^dU^^uuD* 0.618043% (2) (0.006180+/−0.001760) 3.511587!
*D^DD*uuDUvDv −3.393624% (2) (−0.033936+/−0.009517) −3.565672!
*UvD^^v*Dv^ 3.448178% (3) (0.034482+/−0.005390) 6.396908!
*u^^v^v −6.183409% (3) (−0.061834+/−0.009074) −6.814361!
*UU^d^^Uu −1.129125% (3) (−0.011291+/−0.004333) −2.605653!
*Uu^^UDddu* −0.944703% (2) (−0.009447+/−0.003599) −2.625015!

*vuv^D^UU −4.331033% (2) (−0.043310+/−0.008492) −5.100202!
*vUuD^DduD −0.608417% (2) (−0.006084+/−0.000520) −11.709373!
*dddUD*uDv^ −0.225628% (2) (−0.002256+/−0.000000) −inf!
*U^UdUuU^ −1.104799% (2) (−0.011048+/−0.003176) −3.478443!
*UuUUvdvD −0.558249% (2) (−0.005582+/−0.000000) −inf!
*^uvDDuDv 1.144276% (2) (0.011443+/−0.000000) inf!
*^*vUD^DUvd 0.908339% (3) (0.009083+/−0.003923) 2.315378!
*Uu^v*^Dd^ −3.154475% (4) (−0.031545+/−0.009100) −3.466480!
*vuuUD^U^D −6.823681% (2) (−0.068237+/−0.000000) −inf!
*Ud^vuUUv* −3.362107% (2) (−0.033621+/−0.000000) −inf!
*u^du^vDU 2.514099% (2) (0.025141+/−0.003676) 6.838888!
*vud^dUuuDD −1.620187% (2) (−0.016202+/−0.000000) −inf!
**^^DuuvDd 4.348351% (3) (0.043484+/−0.010264) 4.236369!
*v^^vUvUdd 0.623623% (2) (0.006236+/−0.002522) 2.472378!
*Ud^^u^UDd −2.822433% (2) (−0.028224+/−0.000000) −inf!
*v^UdvuDU 2.732296% (3) (0.027323+/−0.004001) 6.829882!
*u^vUvv*D^ −3.187663% (3) (−0.031877+/−0.003113) −10.240593!
*uUUdUUdDvduud 1.347901% (2) (0.013479+/−0.001955) 6.895635!
*uuD^UUddvu −1.681740% (2) (−0.016817+/−0.002562) −6.563993!
*DDUvvUUv*v −0.881302% (2) (−0.008813+/−0.000416) −21.167683!
*^UDDvuuv 3.942714% (2) (0.039427+/−0.010343) 3.811828!
*v^v^vvuv −4.273958% (2) (−0.042740+/−0.003159) −13.528050!
*vUDdu*vvd −2.931409% (2) (−0.029314+/−0.006266) −4.678253 !
*udv^v^ 2.569904% (2) (0.025699+/−0.002940) 8.741909!
U^uD^^dDDU −2.442530% (2) (−0.024425+/−0.000000) −inf!
*vDuvd*ddD^U −0.349515% (2) (−0.003495+/−0.000000) −inf!
*Udv^v^^v −0.589654% (2) (−0.005897+/−0.000160) −36.799640!
*du^uvDDdd 1.445671% (2) (0.014457+/−0.002468) 5.858347!
*v*DDU^u^^ −18.315475% (2) (−0.183155+/−0.036354) −5.038119!
*^U^^^u −4.116544% (3) (−0.041165+/−0.014573) −2.824766!
*vu^^UDDd 4.386907% (3) (0.043869+/−0.013677) 3.207457!
*DvDDuu^D*U 0.099554% (2) (0.000996+/−0.000000) inf!
*U^^u^^ −3.852472% (2) (−0.038525+/−0.002466) −15.621823!
*D^^U^u*Dd −3.712281% (2) (−0.037123+/−0.015896) −2.335374!
*duv^dv 0.208957% (2) (0.002090+/−0.000370) 5.642134!
*^Udv^vvUDv 8.728192% (2) (0.087282+/−0.010298) 8.475473!
*vvUuUU*v*D −2.737641% (2) (−0.027376+/−0.009580) −2.857602!
*DUv^vd*u^D 7.418706% (2) (0.074187+/−0.028841) 2.572238!
*vvUdU^dD*U 3.455261% (2) (0.034553+/−0.007473) 4.623538!
*v^^^du −1.761896% (2) (−0.017619+/−0.005239) −3.363211!
*U*u^*d^uvvd −0.436995% (2) (−0.004370+/−0.000000) −inf!
*uuvdvUuv 1.638037% (2) (0.016380+/−0.003212) 5.100169!
*UUUvvd^d* 3.965766% (4) (0.039658+/−0.010388) 3.817734!
*U^DUdU*UD^U −1.588462% (2) (−0.015885+/−0.005571) −2.851371!
*DD^*DDdDudUDv 0.745941% (2) (0.007459+/−0.000381) 19.568607!
*uu*Uuvuvu 1.401944% (2) (0.014019+/−0.004967) 2.822440!
*uUUDvD^uu −2.078804% (2) (−0.020788+/−0.005228) −3.976557!
*vu^uudDUd −1.117417% (2) (−0.011174+/−0.004309) −2.593376!
*Ud^^uvDU 2.398567% (2) (0.023986+/−0.008208) 2.922249!
*dU^UDUUvUUD 2.053097% (2) (0.020531+/−0.000000) inf!
*DUvUd*^DudU −2.568659% (3) (−0.025687+/−0.007385) −3.478299!
*Du*du^vv^ −0.733753% (2) (−0.007338+/−0.000286) −25.648322!
*DUvUDDvddu −2.477874% (2) (−0.024779+/−0.000000) −inf!
*duvUuDv^d −1.492537% (2) (−0.014925+/−0.000000) −inf!
**DUDDdDuvDd 1.811064% (3) (0.018111+/−0.003682) 4.918699!
*udvdUuDDdDu^ 1.585284% (2) (0.015853+/−0.005575) 2.843761!
*uU*DDv^D^ −1.366754% (2) (−0.013668+/−0.001957) −6.984831!
*UU^vd*^*U*u* −3.805229% (3) (−0.038052+/−0.015037) −2.530565!
*v^uUvUdv −0.847217% (2) (−0.008472+/−0.001624) −5.215859!
*U^^vUuuv^D 3.505594% (2) (0.035056+/−0.008274) 4.237075!
*UuDduuDuvUv 1.317650% (2) (0.013177+/−0.000000) inf!
*U^dUDuuvDD 2.088355% (2) (0.020884+/−0.000000) inf!
*DDdUDUDvuUvU 3.754979% (2) (0.037550+/−0.002406) 15.605803!
*uDDduD^^d −2.214513% (3) (−0.022145+/−0.005222) −4.240559!
*vvd^ud −2.140292% (4) (−0.021403+/−0.008003) −2.674307!
*^vuv^udud 4.723311% (2) (0.047233+/−0.004996) 9.454325!
*UDUdd^v^ −3.825076% (2) (−0.038251+/−0.007672) −4.985444!

*Dd^d^UvuU* 2.116677% (2) (0.021167+/−0.003472) 6.095802!

*^^DuD^Dd −0.803388% (2) (−0.008034+/−0.002583) −3.109921!

*^DdvvdUUU −1.658291% (2) (−0.016583+/−0.000000) −inf!

*vvDU^DD^^U 1.815882% (2) (0.018159+/−0.001095) 16.588363!

*UuUUdUD^v* 0.473984% (2) (0.004740+/−0.001765) 2.685116!

*dvDv^UUd 2.155907% (2) (0.021559+/−0.000770) 27.993078!

*DvUU^uDDuUuD 1.028952% (2) (0.010290+/−0.000607) 16.940623!

*uvdvuU^*uU 7.677166% (2) (0.076772+/−0.000000) inf!

*UdDUuUDdUD^U −1.088339% (2) (−0.010883+/−0.004140) −2.628796!

*uduvvuDD 1.690985% (3) (0.016910+/−0.007116) 2.376260!

*UDvUD^u^DD −0.089790% (2) (−0.000898+/−0.000000) −inf!

*uud^vUDv 0.710710% (2) (0.007107+/−0.001407) 5.052150!

*u^uUDuUDUv* −0.787949% (2) (−0.007879+/−0.002940) −2.679956!

*^vvud*^D −2.353989% (3) (−0.023540+/−0.000895) −26.292279!

**D^^U^*vuv*^ 2.649931% (2) (0.026499+/−0.000000) inf!

*dUDvdddvu −3.383608% (2) (−0.033836+/−0.006906) −4.899868!

*UDvd^^DDd −3.453215% (2) (−0.034532+/−0.008026) −4.302489!

*DuvvUD*u^ 1.416942% (3) (0.014169+/−0.000887) 15.973735!

*dduvvUdu^u 3.562657% (2) (0.035627+/−0.000000) inf!

*^^UDduu*v −1.265445% (2) (−0.012654+/−0.000246) −51.437954!

*^vvU*udd −1.686535% (3) (−0.016865+/−0.003556) −4.743286!

*vv*Uvvdv −6.541270% (3) (−0.065413+/−0.010025) −6.524781!

*UDDvvD*^^dUD 5.856781% (3) (0.058568+/−0.003709) 15.790058!

*d^v^ud −4.055277% (5) (−0.040553+/−0.011894) −3.409390!

**vuU^dudv 1.713493% (2) (0.017135+/−0.004747) 3.609396!

*UD^^uUUDu −2.345992% (3) (−0.023460+/−0.008252) −2.842865!

*vud^du^du −0.190209% (2) (−0.001902+/−0.000000) −inf!

*DuvUUDv^UD −2.397238% (2) (−0.023972+/−0.002491) −9.622411!

*vDdUv^vu 2.167563% (2) (0.021676+/−0.007065) 3.068215!

*ddD*dDuDdvuD 2.329327% (2) (0.023293+/−0.005246) 4.440239!

*uvDuvvvD −2.937741% (3) (−0.029377+/−0.006231) −4.714774!

*vvUUDuUd*u −2.729288% (3) (−0.027293+/−0.011084) −2.462401!

*DU^v^Dv^^ −4.681828% (3) (−0.046818+/−0.015647) −2.992215!

*u^UvuUDUd 2.059086% (3) (0.020591+/−0.004677) 4.402628!

*^DdvvDDvU −6.726384% (2) (−0.067264+/−0.010657) −6.311626!

*^UuuDDvDv −1.028031% (2) (−0.010280+/−0.000000) −inf!

*uDuvuvuud 3.440158% (2) (0.034402+/−0.000000) inf!

*vuUddD^DdvUu −2.240436% (2) (−0.022404+/−0.000000) −inf!

*d*D^DdU^duUD −1.001751% (2) (−0.010018+/−0.003110) −3.220990!

*uUU^U^uD 1.392603% (2) (0.013926+/−0.002740) 5.082915!

*UUD^DUuUuDUU 1.484940% (2) (0.014849+/−0.003609) 4.115056!

*^^u^DduU 3.212955% (3) (0.032130+/−0.011431) 2.810852!

*duU^UDUD^ −0.293398% (2) (−0.002934+/−0.001193) −2.460016!

*^v*vvvd^ −3.367379% (2) (−0.033674+/−0.000000) −inf!

*v*ddD^Dvu −7.283425% (3) (−0.072834+/−0.009049) −8.049188!

*v^UUDvud*u −1.132849% (2) (−0.011328+/−0.000000) −inf!

*D^^UdDvUU 1.233547% (3) (0.012335+/−0.003601) 3.425592!

*^v^vdv 4.886654% (2) (0.048867+/−0.007403) 6.601344!

*uDUdU*vD^du −1.656785% (2) (−0.016568+/−0.004272) −3.878420!

*v^Uuu*dvu 0.267662% (2) (0.002677+/−0.000000) inf!

*UvUvu^UDdU −0.427359% (2) (−0.004274+/−0.001648) −2.592587!

*Dv*dDdUDuuUvu 0.751274% (2) (0.007513+/−0.001316) 5.706817!

*UDuD^^vv^ 1.597198% (2) (0.015972+/−0.002312) 6.907244!

*UUDvUDDdU^ 2.447121% (3) (0.024471+/−0.010584) 2.312120!

*^^^^Du −3.307757% (2) (−0.033078+/−0.010692) −3.093695!

*^^^^dv 3.473249% (4) (0.034732+/−0.012497) 2.779294!

*dd^DU^dv* 2.922374% (2) (0.029224+/−0.011605) 2.518109!

*vUdv^Du*DD 0.831404% (3) (0.008314+/−0.001890) 4.399849!

*ddDduUUvUuv 0.099753% (2) (0.000998+/−0.000000) inf!

*^UdvU^vu −4.532510% (2) (−0.045325+/−0.002702) −16.772799!

*UvuUdUU*^^ −0.166602% (2) (−0.001666+/−0.000711) −2.343196!

***^uUdUddudUD −0.422809% (2) (−0.004228+/−0.000305) −13.873885!

*Uvvu^UDU^* 3.417259% (2) (0.034173+/−0.002679) 12.754051!

*^dD^DvDUd* −2.918721% (2) (−0.029187+/−0.010687) −2.730979!

*^vUvDvDUDD −5.363417% (2) (−0.053634+/−0.000000) −inf!

*^v^^Ud*d −1.027371% (2) (−0.010274+/−0.001926) −5.333138!

*vvdu^Ud* 1.599233% (2) (0.015992+/−0.001408) 11.358963!

*UDv*DUvDdv*D 0.582148% (2) (0.005821+/−0.000000) inf!

*vuuvuDdd 0.577351% (2) (0.005774+/−0.001937) 2.981410!

*^UdDu*Ud^uD 1.013946% (2) (0.010139+/−0.004223) 2.400848!

*vu^DvddU 0.347779% (2) (0.003478+/−0.000236) 14.766530!

*udvdvv 4.780590% (4) (0.047806+/−0.014368) 3.327176!

*vdDUudd*^* −1.928011% (2) (−0.019280+/−0.001626) −11.854280!

**dvvDUDu^D 2.448774% (3) (0.024488+/−0.009799) 2.499005!

*duuvUUUuDUD 0.621345% (2) (0.006213+/−0.000000) inf!

*Dv*dDvUvdd −8.471663% (2) (−0.084717+/−0.019812) −4.275921!

*dud^uDvd 0.755072% (2) (0.007551+/−0.000000) inf!

*vdudvuUu 0.470275% (3) (0.004703+/−0.001597) 2.944992!

*vv*DDuUDUDD 3.213227% (2) (0.032132+/−0.000262) 122.608680!

*^d^udDvD^ −2.964046% (2) (−0.029640+/−0.000000) −inf!

*UUu^DUuDv 1.769003% (2) (0.017690+/−0.000171) 103.365877!

*DUvUvD^^dD 4.392340% (2) (0.043923+/−0.000579) 75.887691!

*DduDdDu*Dvd 3.891614% (3) (0.038916+/−0.015911) 2.445921!

*dDUDudDvud −0.673006% (2) (−0.006730+/−0.002501) −2.690913!

*^UvuDD^^ −2.524697% (2) (−0.025247+/−0.010909) −2.314257!

*^DUd^^dU 2.180905% (2) (0.021809+/−0.003826) 5.699483!

*UDDvduvd 1.804957% (2) (0.018050+/−0.006778) 2.662774!

*dUd^ud^Duv 2.804016% (2) (0.028040+/−0.000000) inf!

*DvUUvUuvdvvuU 4.459862% (2) (0.044599+/−0.000000) inf!

*UvvdduUDv 0.659919% (2) (0.006599+/−0.000000) inf!

*^dd*dudDuv 2.933718% (2) (0.029337+/−0.000000) inf!

*vvd^ud −2.140292% (4) (−0.021403+/−0.008003) −2.674307!

*UDuDduD^Dvd 1.349789% (2) (0.013498+/−0.000000) inf!

*vvduUd*udU −2.324218% (2) (−0.023242+/−0.007489) −3.103426!

*ddUU*UuvdDu −1.902501% (2) (−0.019025+/−0.006837) −2.782744!

*vvUu^Ud*v −5.393808% (4) (−0.053938+/−0.007957) −6.778832!

*U*^Uu^*vv 2.246296% (2) (0.022463+/−0.009592) 2.341944!

**D^D*^Uv^^du −5.588826% (2) (−0.055888+/−0.000000) −inf!

*uvD^^udU −1.505360% (2) (−0.015054+/−0.001928) −7.808007!

*UdvUuU^Ddv 4.351662% (3) (0.043517+/−0.010102) 4.307560!

*dd^dUuD^* 0.534510% (2) (0.005345+/−0.001615) 3.310423!

*UDDUDu^vDuUD −0.252267% (2) (−0.002523+/−0.000000) −inf!

*vdDu^D^v 2.218925% (2) (0.022189+/−0.001963) 11.304306!

*dvUd^DD^vD^ 1.195213% (2) (0.011952+/−0.002955) 4.044035!

*vDU*^uD^u −1.718645% (3) (−0.017186+/−0.005799) −2.963945!

*u^^UUDv^D −2.508835% (2) (−0.025088+/−0.008134) −3.084520!

*UDuv^uuUd 2.267396% (3) (0.022674+/−0.003278) 6.917102!

*Dv^Udvudu 2.732296% (3) (0.027323+/−0.004001) 6.829882!

*Dd^uvdDDU 3.129978% (2) (0.031300+/−0.010554) 2.965667!

*Uu^DddddvU −1.491608% (2) (−0.014916+/−0.000000) −inf!

*^vvvuu 3.858323% (2) (0.038583+/−0.005052) 7.637178!

*^uDud^ud 2.888088% (3) (0.028881+/−0.005011) 5.763485!

*DuDd^dvdUDu −1.326131% (2) (−0.013261+/−0.004344) −3.052927!

*D^dUu^duuu −0.412466% (2) (−0.004125+/−0.000000) −inf!

*DUvudv*vu 1.013704% (2) (0.010137+/−0.003192) 3.175487!

*uD^^ddUvU 3.465980% (2) (0.034660+/−0.000000) inf!

*udUvudD^D −0.361533% (2) (−0.003615+/−0.000021) −170.747616!

*duvUuudDuv** −0.161808% (2) (−0.001618+/−0.000000) −inf!

*u^UUv*vv^ −0.632455% (2) (−0.006325+/−0.000770) −8.218680!

*vdDUdvd^ −2.027935% (2) (−0.020279+/−0.008761) −2.314787!

*uddd^UudDU −2.940941% (3) (−0.029409+/−0.010595) −2.775752!

*D*^Duv^dDU −5.075641% (2) (−0.050756+/−0.017357) −2.924300!

*dDdD^Du*udu 0.483115% (2) (0.004831+/−0.001073) 4.502352!

*^DuD^uu^ −1.710737% (3) (−0.017107+/−0.002308) −7.413347!

*^d^dUvuUd −0.762633% (2) (−0.007626+/−0.000154) −49.603269!

*uU*UDUDu^v −2.488667% (2) (−0.024887+/−0.009872) −2.521021!

**u^DUv^uDDd 3.700656% (2) (0.037007+/−0.000000) inf!

**DudvvUUd^v −0.309733% (2) (−0.003097+/−0.000000) −inf!

*^uDuUvuUd 2.053097% (2) (0.020531+/−0.000000) inf!

*d*uDvuvDDv −3.065793% (2) (−0.030658+/−0.008979) −3.414433!

*UUDD^duuv −3.554811% (2) (−0.035548+/−0.003358) −10.586386!

*uDdvU^U^D −0.989315% (2) (−0.009893+/−0.000000) −inf!

*DD^vDvdD^ 5.757339% (3) (0.057573+/−0.007481) 7.696194!

*u*vDvuuv 2.551450% (3) (0.025514+/−0.007229) 3.529339!

*u^dDU^DUDv* −0.426990% (2) (−0.004270+/−0.000000) −inf!

*^ddudddv 0.904771% (2) (0.009048+/−0.002364) 3.827873!
*uvDvUduuU^ 2.956049% (2) (0.029560+/−0.000000) inf!
*^d^u^dvU 2.757479% (2) (0.027575+/−0.000000) inf!
*v^v*UvD*d 2.985524% (4) (0.029855+/−0.012854) 2.322713!
*vD^Uudvvd^U 1.472076% (2) (0.014721+/−0.000000) inf!
*v^*d*D^vD**v −3.412116% (2) (−0.034121+/−0.009005) −3.788991!
*vUdUduUd**v −1.714072% (2) (−0.017141+/−0.004502) −3.807401!
*Du*dUD^*Uu^D −0.929814% (2) (−0.009298+/−0.002828) −3.288228!
*Ud*u^d^uDu −1.612262% (2) (−0.016123+/−0.000722) −22.319800!
*U*vv^vUUv −9.471420% (3) (−0.094714+/−0.017991) −5.264591!
*dvDuu^dUd*D 0.716094% (3) (0.007161+/−0.000367) 19.514418!
*DUDd^uD*vdU −2.038222% (2) (−0.020382+/−0.001685) −12.093585!
*dduvUd^dU 0.814663% (2) (0.008147+/−0.000000) inf!
*vUd^dDduu −2.135911% (2) (−0.021359+/−0.001211) −17.633682!
*vvD^DDUuU −3.348939% (3) (−0.033489+/−0.011591) −2.889241!
*^DdDDvDdu −1.609383% (2) (−0.016094+/−0.002363) −6.811270!
*Uv^DUU*dDUUvD −3.634321% (2) (−0.036343+/−0.011591) −3.135401!
**UvUDv^vdv 6.884506% (3) (0.068845+/−0.004474) 15.389230!
*dUU^ddudUDdU −0.672188% (2) (−0.006722+/−0.000000) −inf!
*Duv^UdDu 2.573704% (2) (0.025737+/−0.007890) 3.261838!
*^^UuvdUD −1.130019% (2) (−0.011300+/−0.003609) −3.130988!
*uuUD^^UdU −0.476497% (2) (−0.004765+/−0.000012) −404.958955!
*^Uv*u^U*^ −2.848425% (3) (−0.028484+/−0.007821) −3.642161!
*vvud^Udd 0.624998% (2) (0.006250+/−0.000000) inf!
*d*duvDUdd^ 2.325388% (2) (0.023254+/−0.001650) 14.094090!
*UUDDDuuU^Uuv 3.074386% (2) (0.030744+/−0.000000) inf!
*vd^u^*vd 4.229278% (2) (0.042293+/−0.002870) 14.736769!
*^UuD^vdUD 0.753901% (2) (0.007539+/−0.000000) inf!
*DduU^vvUDu 3.147953% (2) (0.031480+/−0.011890) 2.647516!
*^vvUdU^D −2.302298% (2) (−0.023023+/−0.000000) −inf!
*^vU*Uuv*^UU 2.363864% (3) (0.023639+/−0.002708) 8.728406!
*UUDdUd^v^ −2.484635% (3) (−0.024846+/−0.003102) −8.008871!
*d^uvuDuu 0.374362% (2) (0.003744+/−0.000664) 5.640904!
*^vuvd*DUUUU* 1.365918% (2) (0.013659+/−0.001225) 11.153297!
*vUU^dUdUv 1.271146% (2) (0.012711+/−0.002319) 5.481649!
*udDv^vUd 1.723156% (3) (0.017232+/−0.007300) 2.360453!
*^v^uvd −4.007093% (2) (−0.040071+/−0.016492) −2.429673!
*vDdu^^U^ −2.736323% (2) (−0.027363+/−0.000000) −inf!
*UdU^v^Dd −0.056582% (2) (−0.000566+/−0.000106) −5.318782!
*DUdUD*u*^vDd 1.238950% (3) (0.012389+/−0.001920) 6.453543!
*vuuDDd^U −2.040819% (4) (−0.020408+/−0.008113) −2.515621!
*DUU*DduUvDDuu 2.144812% (2) (0.021448+/−0.003200) 6.701903!
*^u^^dUvU* −2.956688% (2) (−0.029567+/−0.007922) −3.732264!
*v^Ud^dvD −1.718524% (2) (−0.017185+/−0.002570) −6.687422!
*^ddduDUduU −0.476646% (2) (−0.004766+/−0.000000) −inf!
*dvvud^ −2.319020% (2) (−0.023190+/−0.005010) −4.628905!
*UDdD*vDu^U 0.142107% (2) (0.001421+/−0.000000) inf!
*DdU^DUvUudd −0.549940% (3) (−0.005499+/−0.001795) −3.063150!
*^duv*Uu^d^ 1.786550% (2) (0.017865+/−0.000000) inf!
*vUd^^UUd 1.316447% (2) (0.013164+/−0.001672) 7.874474!
*Uvvud^^D −0.621116% (2) (−0.006211+/−0.000000) −inf!
*U^Ddd^^u −0.311269% (3) (−0.003113+/−0.001075) −2.895266!
*Dduvu^v^ −11.724143% (2) (−0.117241+/−0.000000) −inf!
*uDdd^u^uuU 2.742524% (2) (0.027425+/−0.005987) 4.580844!
*DuddD*du*dd^ −1.657279% (2) (−0.016573+/−0.000016) −1005.666004!
*DDDuDuDvU^ 3.588773% (2) (0.035888+/−0.011974) 2.997094!
*d^DUUudv −2.518905% (2) (−0.025189+/−0.009620) −2.618273!
*Dvu*uuDUd^ 1.335841% (2) (0.013358+/−0.005782) 2.310276!
*^^u*Du^DdUv^ −1.399912% (2) (−0.013999+/−0.000000) −inf!
**Uduu^D^d −4.099260% (2) (−0.040993+/−0.014574) −2.812694!
*Uv^UuvvU −0.256538% (2) (−0.002565+/−0.000000) −inf!
*d^UvvDd^ −0.532291% (2) (−0.005323+/−0.000000) −inf!
*^vduDUv^D −2.269943% (2) (−0.022699+/−0.009137) −2.484374!
*vUuuvDdU^ −5.489529% (3) (−0.054895+/−0.005226) −10.505262!
*dUvudv*dU 1.284306% (2) (0.012843+/−0.002414) 5.319393!
*uu*D^UDD*uv −2.945431% (2) (−0.029454+/−0.000000) −inf!
*u^^^Ddd^^ 1.997092% (2) (0.019971+/−0.000000) inf!
*dUUudU^vD −2.140962% (2) (−0.021410+/−0.007756) −2.760469!
*Du^dUU^u 3.065510% (2) (0.030655+/−0.005459) 5.615924!

*UDuvUUU^d 2.376516% (4) (0.023765+/−0.003453) 6.881597!

*v*^^duD^U −0.756546% (2) (−0.007565+/−0.000510) −14.826093!

*^^Ddu*D^^U −3.478162% (2) (−0.034782+/−0.002741) −12.687455!

*DUDu^^v^^ 4.656551% (2) (0.046566+/−0.000000) inf!

*vDuDUvUDUD^ −2.040814% (2) (−0.020408+/−0.000000) −inf!

*v*duvvUUu 0.142107% (2) (0.001421+/−0.000000) inf!

*^DD^uDDuUUd 1.484570% (2) (0.014846+/−0.003427) 4.331737!

*uUvddDv^ 2.762071% (2) (0.027621+/−0.009951) 2.775795!

*u^v^dudD* 1.345334% (2) (0.013453+/−0.005717) 2.353055!

*DuD^Dd^v 2.695167% (2) (0.026952+/−0.000000) inf!

*^Uduvdd^ −2.249482% (2) (−0.022495+/−0.000000) −inf!

*uv^uDdvu 1.381358% (2) (0.013814+/−0.004390) 3.146427!

*Duv^UDu^U 0.891526% (2) (0.008915+/−0.001737) 5.132113!

*u^^^Uu −1.268514% (3) (−0.012685+/−0.002954) −4.294342!

*DuduvdDvDd 0.582148% (2) (0.005821+/−0.000000) inf!

*Ud^vv^dvU −0.365783% (3) (−0.003658+/−0.000652) −5.613058!

*uvdu^^ −1.456276% (2) (−0.014563+/−0.000432) −33.727230!

*^uDUv*U^Ud −1.756201% (2) (−0.017562+/−0.000581) −30.239100!

*^v^^DDvvd 3.856906% (2) (0.038569+/−0.000000) inf!

*UduuU^DddUd 1.898191% (2) (0.018982+/−0.005659) 3.354266!

*Uvudd^UD −0.729023% (3) (−0.007290+/−0.002234) −3.263950!

*du^vdvdu 2.346141% (2) (0.023461+/−0.005655) 4.148896!

*uu^UuD^DDuD 0.753901% (2) (0.007539+/−0.000000) inf!

*^*vvUuUv 3.491389% (3) (0.034914+/−0.007795) 4.479187!

*u^duUduD*du 0.743740% (3) (0.007437+/−0.002060) 3.610955!

*uvD*dvvd 1.874034% (2) (0.018740+/−0.000941) 19.909364!

**dUUu^^UD 0.603241% (2) (0.006032+/−0.002167) 2.783579!

*^vv*Ud^U^**D* −2.231374% (2) (−0.022314+/−0.000427) −52.254074!

*uUvdvu^^U −4.713424% (2) (−0.047134+/−0.000000) −inf!

*du^*^udv 2.241943% (3) (0.022419+/−0.001178) 19.025451!

*UUuDdduu^d −1.474415% (2) (−0.014744+/−0.000000) −inf!

*^uUvUvdUv 0.650844% (3) (0.006508+/−0.001785) 3.646199!

*v^^UDU*DuD 0.283398% (3) (0.002834+/−0.001104) 2.566442!

*^^Dvvd −1.136790% (2) (−0.011368+/−0.002921) −3.891638!

*ddUuuvUUv −4.185959% (2) (−0.041860+/−0.015092) −2.773578!

*uDDvDDdUUdu* 0.922242% (2) (0.009222+/−0.002946) 3.130336!

*U*d^Uu^*U^ −1.202591% (2) (−0.012026+/−0.000000) −inf!

*vdu^dUu^u 3.065510% (2) (0.030655+/−0.005459) 5.615924!

*U^Du*dU^*Dv −1.087273% (2) (−0.010873+/−0.002594) −4.191715!

*dvduvU*^uU −3.226372% (2) (−0.032264+/−0.004299) −7.505336!

*vDUdUdUvdd 2.703679% (2) (0.027037+/−0.004462) 6.059514!

*Dvd*vDDdv 2.354896% (2) (0.023549+/−0.000000) inf!

*u^vUd^Dud −1.437213% (2) (−0.014372+/−0.001209) −11.888581!

*vUU^*vdu^ 2.003499% (2) (0.020035+/−0.007226) 2.772600!

*d*v^^DvU 2.064013% (2) (0.020640+/−0.000682) 30.253982!

*^vDdDuuvUu 1.533304% (2) (0.015333+/−0.003394) 4.517253!

*v^vUdduD 2.086415% (2) (0.020864+/−0.007692) 2.712470!

*vU^UddvDu −1.332367% (3) (−0.013324+/−0.004632) −2.876521!

*dDdduUvdUU 1.357493% (3) (0.013575+/−0.005179) 2.620971!

*dD^UdDdv^ 1.617786% (2) (0.016178+/−0.006742) 2.399667!

*U^v^Uu^v −1.875629% (2) (−0.018756+/−0.004468) −4.198341!

*Udv*^UuDvd 2.280526% (2) (0.022805+/−0.007454) 3.059494!

*vUv^D^DD 1.903462% (2) (0.019035+/−0.007786) 2.444856!

*uv^vv^ 0.646013% (2) (0.006460+/−0.000171) 37.737941!

*DuU*uvvUdDu −0.917341% (2) (−0.009173+/−0.001879) −4.881857!

*vD^^Uud^D −5.399870% (2) (−0.053999+/−0.008318) −6.492019!

*vuUuuDU*vu −3.105341% (4) (−0.031053+/−0.011564) −2.685287!

*uudv^^dDDD^D −2.424406% (2) (−0.024244+/−0.006329) −3.830558!

*vdUu^*^v −3.667588% (2) (−0.036676+/−0.001986) −18.466242!

*U^*uv^D^D^ −4.854371% (2) (−0.048544+/−0.000000) −inf!

*u^^v^^*^^ −4.820695% (2) (−0.048207+/−0.001978) −24.375695!

*UDDDDdvvv 2.459390% (3) (0.024594+/−0.003817) 6.442668!

*UDD^DuUDvd 2.884945% (3) (0.028849+/−0.005341) 5.401612!

*vU^vUddddd 1.681610% (2) (0.016816+/−0.000000) inf!

*^uvDduvv* 3.344812% (2) (0.033448+/−0.000000) inf!

*dud^^v −2.052066% (3) (−0.020521+/−0.005732) −3.580215!

*uudDd^Dvu −2.385911% (3) (−0.023859+/−0.009513) −2.508055!

*^dv^^dDd −4.598678% (2) (−0.045987+/−0.011867) −3.875321!

*vD^D^vDUd −3.536068% (2) (−0.035361+/−0.000000) −inf!

**Dv^Dvvv^U 4.712254% (2) (0.047123+/−0.005393) 8.737620!
*ddUUUUDUd^^ −1.756677% (2) (−0.017567+/−0.006263) −2.804725!
*vD^uuUvu 1.846373% (3) (0.018464+/−0.006755) 2.733307!
*DUdDU^UdDdUD 0.247843% (3) (0.002478+/−0.000147) 16.857777!
*vu^^dUUD 3.590742% (2) (0.035907+/−0.013015) 2.758925!
*d^Dv*U*DUUDUU 0.899486% (2) (0.008995+/−0.003693) 2.435545!
*Duudd^vd −0.256378% (2) (−0.002564+/−0.001084) −2.364996!
*^DDdudUvU 1.715555% (4) (0.017156+/−0.004173) 4.110870!
*DvUU^^D^DU −5.179404% (2) (−0.051794+/−0.013492) −3.838742!
*Uu*vdvdU −1.396603% (4) (−0.013966+/−0.004153) −3.362594!
*d^vDDUvD^ −0.996100% (2) (−0.009961+/−0.000000) −inf!
*v*UduvuUdv 0.080445% (2) (0.000804+/−0.000000) inf!
*dDd*vdvdDud 0.445430% (2) (0.004454+/−0.000000) inf!
*D*uuUDvUDuD^ −0.804743% (2) (−0.008047+/−0.002832) −2.841136!
*duUU^U*uU^D −3.124539% (2) (−0.031245+/−0.009795) −3.189999!
*uv*U^uuuDvdD 6.384779% (2) (0.063848+/−0.000000) inf!
*vvUdU^du 6.617134% (2) (0.066171+/−0.001509) 43.847466!
*^U^u^^ −3.852472% (2) (−0.038525+/−0.002466) −15.621823!
*uu^DdDuDDu 0.314505% (2) (0.003145+/−0.000575) 5.472063!
*ddd*^D*v^ −2.349379% (2) (−0.023494+/−0.008943) −2.627139!
*uD*DDd*^vu 0.529622% (2) (0.005296+/−0.001438) 3.682848!
*d^^U^UuDu −3.874384% (3) (−0.038744+/−0.016741) −2.314262!
*dU^^U^vd −1.600919% (2) (−0.016009+/−0.000000) −inf!
*vDUDv^dDDU 3.277308% (3) (0.032773+/−0.012993) 2.522373!
*DvuUuuUdv*d 1.315708% (2) (0.013157+/−0.004098) 3.210327!
**UvDDuvU^d 1.221037% (3) (0.012210+/−0.000636) 19.201455!
*udv^v^ 2.569904% (2) (0.025699+/−0.002940) 8.741909!
*Uu^*Uuv^d 0.965183% (2) (0.009652+/−0.001377) 7.007579!
*DD^UdUDUU^U −5.250349% (2) (−0.052503+/−0.000000) −inf!
*DvuD^uddU 1.863461% (2) (0.018635+/−0.007135) 2.611703!
*U^DDvUDUd^ 1.798522% (3) (0.017985+/−0.005920) 3.038222!
*^dvU^d*uU 0.793413% (2) (0.007934+/−0.001030) 7.706760!
*Dud*d^UUUuv 1.337320% (2) (0.013373+/−0.003076) 4.347610!
*^^u*vdud −1.671709% (2) (−0.016717+/−0.004052) −4.126141!
*dvd^DUvdu −0.877955% (2) (−0.008780+/−0.002371) −3.702505!
*vvD^DuuU 3.460759% (2) (0.034608+/−0.000000) inf!
**vdduvvDv 2.213629% (2) (0.022136+/−0.009137) 2.422810!
*UU^UvdD^^ud 1.070661% (2) (0.010707+/−0.000000) inf!
*Uuvvv^du 0.122244% (2) (0.001222+/−0.000000) inf!
*d*DUvdD^^D −2.037420% (2) (−0.020374+/−0.000596) −34.179470!
*D^d*d^dD*^u 2.226629% (3) (0.022266+/−0.003358) 6.630796!
*D^dDvv^u^* 3.022564% (2) (0.030226+/−0.010235) 2.953198!
*uu*vvDUuUuD −1.481692% (2) (−0.014817+/−0.003398) −4.360516!
*uudUuduDuv −1.916769% (2) (−0.019168+/−0.001818) −10.543482!
*Dvu^u^vd −0.539771% (2) (−0.005398+/−0.001911) −2.824115!
*D*dvu*ddD^D 2.779818% (2) (0.027798+/−0.000000) inf!
*DD^DUU^*dD*d −2.277629% (2) (−0.022776+/−0.000000) −inf!
*vv^Dddvv 4.375466% (2) (0.043755+/−0.007866) 5.562849!
*Uuvv^U^^* 2.457329% (2) (0.024573+/−0.004662) 5.270776!
*^D^uuuDvUD 1.728790% (2) (0.017288+/−0.002403) 7.193039!
*dD^*^UUUuv 1.757546% (2) (0.017575+/−0.000000) inf!
*D*^DUUuUd*D^ −1.894685% (2) (−0.018947+/−0.005475) −3.460539!
*uUUvd^UvD 2.636670% (2) (0.026367+/−0.003412) 7.727264!
*uvd^^^Ud 1.021226% (2) (0.010212+/−0.001277) 7.996217!
*DUvuDDUDvU −1.223800% (2) (−0.012238+/−0.001850) −6.613790!
*udUU^Duuvv* 4.170131% (2) (0.041701+/−0.008259) 5.048899!
*dU^^u^ −3.366419% (2) (−0.033664+/−0.003740) −9.001493!
*uUUvUDuU^UU*^ −1.005478% (2) (−0.010055+/−0.000000) −inf!
*d^^uvdU^D* −3.209289% (4) (−0.032093+/−0.007699) −4.168605!
*u*^dDd^Uu 0.042231% (2) (0.000422+/−0.000000) inf!
*d^ud^duv 2.804016% (2) (0.028040+/−0.000000) inf!
*dUvUDudvv 2.525066% (2) (0.025251+/−0.000000) inf!
*vd^du^d^D 2.195246% (2) (0.021952+/−0.005409) 4.058472!
*U^v^Uuv^D 3.505594% (2) (0.035056+/−0.008274) 4.237075!
*DvUvDdDUUv −0.816186% (2) (−0.008162+/−0.002770) −2.947003!
*u^vv*UdUUu −4.290015% (2) (−0.042900+/−0.005831) −7.357230!
*Uddd^uvUdU −0.921172% (2) (−0.009212+/−0.001313) −7.015591!
*v*vvdDUu 0.176364% (2) (0.001764+/−0.000000) inf!
*Ud^vUvU^ −2.395127% (2) (−0.023951+/−0.005837) −4.103287!

*dUd^v^vu −0.439562% (2) (−0.004396+/−0.000000) −inf!
*uv^^uv 2.095552% (3) (0.020956+/−0.005008) 4.184814!
*^^vvd^ 7.942470% (3) (0.079425+/−0.010071) 7.886733!
*uUv^UDdDuvdd 2.248877% (2) (0.022489+/−0.000000) inf!
**dvd^vD^ −1.844671% (2) (−0.018447+/−0.005480) −3.366338!
*^vdDD*dD 2.267511% (4) (0.022675+/−0.008551) 2.651847!
*DDDDd^dDUDu −1.133882% (3) (−0.011339+/−0.002329) −4.867905!
*uU^*uvDv^ 3.233458% (3) (0.032335+/−0.010220) 3.163714!
*^D^U^dvu 2.693467% (3) (0.026935+/−0.001109) 24.293625!
*vvduDuU^ −0.705389% (2) (−0.007054+/−0.000634) −11.133330!
*vU^^*^U^u −2.969095% (2) (−0.029691+/−0.000000) −inf!
*DDUvvvUuU 2.998714% (2) (0.029987+/−0.009672) 3.100446!
*UvddDd^vd 3.169323% (3) (0.031693+/−0.000140) 227.183414!
*Uu*UUDdv^d* −2.076989% (2) (−0.020770+/−0.002123) −9.784718!
*uvuUUdv^ −0.862625% (3) (−0.008626+/−0.001960) −4.401192!
*vvDDDdU*U*UD −0.837708% (2) (−0.008377+/−0.000763) −10.973833!
*vuuUU^d^^ 0.685132% (2) (0.006851+/−0.000000) inf!
*Dv^uUud*vvU 1.516168% (2) (0.015162+/−0.004344) 3.489973!
*u^DuDUvuDU −0.362196% (2) (−0.003622+/−0.000535) −6.774384!
*vv^UvUdD 2.872931% (2) (0.028729+/−0.000000) inf!
*uuvDvuuuu −0.719022% (2) (−0.007190+/−0.002779) −2.587329!
*uuvuvdD^v 2.214417% (2) (0.022144+/−0.004792) 4.620595!
*dUuduUUDvu 1.925532% (2) (0.019255+/−0.002062) 9.340381!
*vUuUUvU^D −4.678874% (2) (−0.046789+/−0.000087) −534.956979!
*UDuuvDD^du 2.183205% (2) (0.021832+/−0.004363) 5.004222!
*udUU*u^^ −1.375054% (3) (−0.013751+/−0.004190) −3.281846!
*^^v^U^uD −2.959620% (2) (−0.029596+/−0.000000) −inf!
*DUuU^DvD^ −3.100309% (3) (−0.031003+/−0.005064) −6.121920!
*DUvDdUvduD −0.669627% (3) (−0.006696+/−0.001898) −3.527724!
*dv^UUuUvv*^ −6.637378% (2) (−0.066374+/−0.010503) −6.319323!
*v^Dvv^d^ −4.694047% (2) (−0.046940+/−0.005759) −8.151320!
*U^v^DDdv −6.588563% (2) (−0.065886+/−0.001997) −32.994884!
*U^DuuDddUu 1.533355% (2) (0.015334+/−0.004755) 3.224534!
*udDdvdUvU 1.516980% (3) (0.015170+/−0.006353) 2.387859!
*Uuv^vUU^D −0.872471% (2) (−0.008725+/−0.001438) −6.067513!
*^DDUd^uUu −2.687942% (3) (−0.026879+/−0.010142) −2.650266!
*uD^uddduDD −0.133613% (2) (−0.001336+/−0.000345) −3.870446!
*DUUv^UvUu −3.896540% (2) (−0.038965+/−0.003272) −11.908359!
*dDU*^Uuv^v −0.210743% (2) (−0.002107+/−0.000000) −inf!
*vvUUUD*Uud −2.086417% (2) (−0.020864+/−0.001623) −12.855500!
*u^v^vvvD^ −3.367379% (2) (−0.033674+/−0.000000) −inf!
**UD*vUuuv**^ −2.224239% (2) (−0.022242+/−0.000000) −inf!
*uvdDUUDdDDuud −1.559344% (2) (−0.015593+/−0.000000) −inf!
*Uu*UD^U^d −1.343327% (2) (−0.013433+/−0.005221) −2.572942!
*vU^dddUvD −0.854699% (2) (−0.008547+/−0.000000) −inf!
*du^UDdD^dU* 1.944714% (3) (0.019447+/−0.005550) 3.504174!
*uUDUv*^uUDD 3.541702% (3) (0.035417+/−0.012604) 2.809966!
*UUdudDv^v −1.283290% (2) (−0.012833+/−0.003249) −3.949952!
**DdudDu^U*^d −2.404372% (3) (−0.024044+/−0.009657) −2.489683!
*dUdddUdud^ud* −0.290502% (2) (−0.002905+/−0.000370) −7.853669!
*d^uvUudv −1.255946% (2) (−0.012559+/−0.004171) −3.010857!
*vU*^vUudUd 3.324459% (5) (0.033245+/−0.012966) 2.563989!
*Dd^dvdvd 1.839180% (2) (0.018392+/−0.006667) 2.758751!
*DDdD^DdUDUu 2.058928% (2) (0.020589+/−0.000000) inf!
*uDdvv^DD 2.646660% (6) (0.026467+/−0.002093) 12.647431!
*u*vU^vuu 1.080671% (2) (0.010807+/−0.001405) 7.690896!
*DU^duUDv^ 1.707918% (3) (0.017079+/−0.006899) 2.475662!
*u^^v^v −6.183409% (3) (−0.061834+/−0.009074) −6.814361!
*vDDvUDdDD^ −2.053978% (2) (−0.020540+/−0.000000) −inf!
*D^^vDUDd −4.012941% (3) (−0.040129+/−0.013173) −3.046426!
*uuduuDUu*DUvD −1.238989% (2) (−0.012390+/−0.001756) −7.057726!
*Uvv^^^Dv −1.231160% (2) (−0.012312+/−0.004263) −2.888334!
*uUUDuuDdD^U 1.334039% (2) (0.013340+/−0.002270) 5.877912!
*vDDd^dUUu 3.112756% (2) (0.031128+/−0.000000) inf!
*uuDu^UUd^ −1.198457% (2) (−0.011985+/−0.001954) −6.132556!
*ddvUuu^D*v −2.126547% (2) (−0.021265+/−0.008340) −2.549788!
*^uDvd*ddd −0.386473% (2) (−0.003865+/−0.000000) −inf!

*U^uUDUDdud^ 1.566558% (2) (0.015666+/−0.004326) 3.621122!
*D^dvUDDuU −0.191622% (2) (−0.001916+/−0.000000) −inf!
*duu^uU*^U −3.425661% (2) (−0.034257+/−0.000298) −114.779811!
*^UDdvvvv −3.288957% (2) (−0.032890+/−0.012255) −2.683708!
*D^*uDudvv^ 1.376310% (2) (0.013763+/−0.000000) inf!
*Du^uUuUd^ −4.693806% (2) (−0.046938+/−0.001720) −27.294425!
*uvdd*d^duu 1.445675% (2) (0.014457+/−0.004710) 3.069203!
*d^DDU^dvUdU 2.501327% (2) (0.025013+/−0.000000) inf!
*uvDU^uu^ −1.098332% (2) (−0.010983+/−0.000000) −inf!
*d^^^u^ −3.366419% (2) (−0.033664+/−0.003740) −9.001493!
**^UDvvu^u* −0.400200% (2) (−0.004002+/−0.000000) −inf!
*^vv^*^u^v −2.224168% (2) (−0.022242+/−0.000000) −inf!
*DDUDdd**vu*v 1.759042% (2) (0.017590+/−0.001681) 10.462001!
*^DUUduuvv 2.028255% (2) (0.020283+/−0.001704) 11.901599!
*uUuuDd^uU −2.240764% (5) (−0.022408+/−0.005769) −3.884313!
*uvuUd*vuv −2.577129% (2) (−0.025771+/−0.000612) −42.128824!
*UDu^U^udv 2.427265% (2) (0.024273+/−0.000697) 34.847405!
*vduU^uU^U*^ 1.464033% (2) (0.014640+/−0.000000) inf!
*Uu^^^v −3.434289% (2) (−0.034343+/−0.001313) −26.151261!
*U^^^vdDu* 1.445164% (2) (0.014452+/−0.000000) inf!
*^duduU^U −2.081081% (2) (−0.020811+/−0.002529) −8.229586!
*^uuUvdU^ 3.224486% (2) (0.032245+/−0.002760) 11.682745!
*^uDDUvuuDU −3.704949% (2) (−0.037049+/−0.006176) −5.998493!
*UDD^dv^dd −1.326628% (2) (−0.013266+/−0.000000) −inf!
*Udv^udD^ −4.045575% (2) (−0.040456+/−0.008589) −4.710401!
*d^Dv^udvU −3.120837% (4) (−0.031208+/−0.008368) −3.729417!
*^UUvu^UD −2.536905% (3) (−0.025369+/−0.008539) −2.971112!
*uddUdUUD^uU −4.740909% (2) (−0.047409+/−0.014053) −3.373568!
*vu^^^u −2.444474% (3) (−0.024445+/−0.005026) −4.863505!
*Uu^dvUudDU −1.029493% (3) (−0.010295+/−0.001696) −6.071529!
*Dvd^duUU^ −1.811572% (2) (−0.018116+/−0.001745) −10.383581!
*Dv^u^*Udv −5.952580% (2) (−0.059526+/−0.017708) −3.361595!
*^^ud^udud 0.330933% (3) (0.003309+/−0.000790) 4.186599!
**dvdvUDUUudv −4.121816% (2) (−0.041218+/−0.009841) −4.188247!
*^^^^^U −6.089361% (3) (−0.060894+/−0.019940) −3.053819!
*v^ddv^*Du −7.283425% (3) (−0.072834+/−0.009049) −8.049188!
*u**UDv^uvD 7.976536% (2) (0.079765+/−0.006003) 13.288406!
*vuv*uddDD 1.251895% (2) (0.012519+/−0.000311) 40.248786!
*U^vUUdUU^D −5.582251% (2) (−0.055823+/−0.013674) −4.082523!
*U^Uuu^dvU −0.865797% (2) (−0.008658+/−0.000000) −inf!
*^D**Uuv^^ −1.086407% (2) (−0.010864+/−0.004169) −2.605794!
*vUUdvDuu 1.862142% (2) (0.018621+/−0.000453) 41.136108!
*dDDDuUvuddU 0.592052% (3) (0.005921+/−0.001849) 3.201734!
*^du*uv^^ 0.708075% (2) (0.007081+/−0.001756) 4.031541!
*vDu^vDuD 1.832740% (2) (0.018327+/−0.002789) 6.570851!
*dUv^uUdU^u −0.377253% (2) (−0.003773+/−0.000063) −60.255562!
*UUU*uudUdDuv 0.705359% (3) (0.007054+/−0.000611) 11.553510!
*UuUvUduDdduD 0.872354% (2) (0.008724+/−0.000000) inf!
*Uvd^uDuu −0.549025% (2) (−0.005490+/−0.000968) −5.669794!
*vdUuv^uDu 0.945986% (2) (0.009460+/−0.000352) 26.873739!
*vD^u^uD*v −5.540973% (2) (−0.055410+/−0.011887) −4.661527!
*dUDdd*uDdv^ −1.882108% (2) (−0.018821+/−0.004879) −3.857586!
*UduvdvUU*DdD 1.820450% (2) (0.018204+/−0.003021) 6.025224!
*d*vvUDuU**DU^ 3.981966% (2) (0.039820+/−0.000000) inf!
*uuD^uUuUDUd^d* 1.475241% (2) (0.014752+/−0.000000) inf!
*Uv^^dDDvdU 3.226150% (4) (0.032261+/−0.001433) 22.512612!
*D**^UDvDDdUDv 2.498838% (2) (0.024988+/−0.000000) inf!
**^Uvv^d^ −4.689155% (3) (−0.046892+/−0.010061) −4.660826!
*uvDUUuDvuU 1.135629% (2) (0.011356+/−0.003336) 3.404540!
*uUDU^uUuvUD 1.205792% (2) (0.012058+/−0.000000) inf!
*^*dUu*UUvv 0.199103% (2) (0.001991+/−0.000796) 2.501652!
*uvvDDUdDu −1.792226% (3) (−0.017922+/−0.002449) −7.319479!
*^d^^*DddvD −2.903820% (2) (−0.029038+/−0.000000) −inf!
*Duuduv*^udu −2.705590% (2) (−0.027056+/−0.000000) −inf!
*^UuD^uUUu −2.275987% (3) (−0.022760+/−0.003152) −7.220213!
*vvDUDvDdv 2.354896% (2) (0.023549+/−0.000000) inf!
*vDuvDU^*D^ −1.538859% (2) (−0.015389+/−0.002402) −6.407341!

*^D^*^Udvd −2.824520% (2) (−0.028245+/−0.009844) −2.869266!
*vUuuDDvd^DD 1.946030% (2) (0.019460+/−0.006497) 2.995493!
*dD^DvU*DD^Uu* −0.558659% (2) (−0.005587+/−0.000000) −inf!
*DdvDvd^dd 0.961531% (2) (0.009615+/−0.000000) inf!
*uDDUdD^^Uvdu 2.457698% (2) (0.024577+/−0.000000) inf!
*dvdvvd −9.588281% (2) (−0.095883+/−0.040309) −2.378719!
*uDU*uudu^^ −1.530777% (2) (−0.015308+/−0.000454) −33.747118!
*uv*d^udvD^ −1.988115% (2) (−0.019881+/−0.007465) −2.663206!
*U^DD^^U*^uD 3.826564% (2) (0.038266+/−0.009836) 3.890423!
*^UDuDdD^v −1.724704% (3) (−0.017247+/−0.001833) −9.407976!
*^duUU^^D^ −0.775798% (2) (−0.007758+/−0.000000) −inf!
*ududuUu^dd 0.038278% (2) (0.000383+/−0.000000) inf!
*UdduUUdv^D −1.600028% (2) (−0.016000+/−0.002215) −7.225197!
*^dD*v^^U −1.503396% (2) (−0.015034+/−0.000191) −78.765747!
**DvUD*^DdDvD 3.856906% (2) (0.038569+/−0.000000) inf!
*UvdvdU^u 1.819858% (2) (0.018199+/−0.007748) 2.348757!
*ududUduUD^ 0.478004% (2) (0.004780+/−0.000951) 5.025686!
*^UU^uuD*u −0.786718% (2) (−0.007867+/−0.002213) −3.555459!
*udvD^Udd 0.403813% (2) (0.004038+/−0.000354) 11.409804!
*duUDdud^DduU −1.162325% (2) (−0.011623+/−0.004111) −2.827135!
**^UUUvuvU^ 3.207256% (3) (0.032073+/−0.009653) 3.322494!
*Udu^d^duu −0.962551% (2) (−0.009626+/−0.001855) −5.187657!
*v^vudUvD −2.616787% (2) (−0.026168+/−0.010150) −2.578239!
*Uvuu*duvUDd −0.724087% (2) (−0.007241+/−0.000000) −inf!
*uvd*UU^^ −3.856405% (3) (−0.038564+/−0.014844) −2.597954!
*ddUvUvddu 2.751535% (2) (0.027515+/−0.010182) 2.702219!
*^^DU^vUD*U 7.798702% (2) (0.077987+/−0.008715) 8.948895!
*Dd^ddUDd^*D −4.737939% (2) (−0.047379+/−0.002706) −17.506294!
*Ddvud*^DuUd −2.580717% (2) (−0.025807+/−0.000283) −91.307337!
*dUv*uddvu 0.883025% (3) (0.008830+/−0.001698) 5.201902!
*uUvDdDD*d*dU −0.875665% (3) (−0.008757+/−0.001428) −6.133775!
*UuUvdDd^ −1.456093% (2) (−0.014561+/−0.002790) −5.218288!
**UvDdUvvDv 2.213629% (2) (0.022136+/−0.009137) 2.422810!
*uuu^dv^D 0.155955% (2) (0.001560+/−0.000000) inf!
*dddUDDUUUuv −1.017097% (2) (−0.010171+/−0.000769) −13.218930!
*UDD*^uvu^ 2.189138% (2) (0.021891+/−0.000623) 35.159817!
*UU^U*uv*^*ud −1.756201% (2) (−0.017562+/−0.000581) −30.239100!
*DudDvdd*vU 2.110263% (3) (0.021103+/−0.001696) 12.440164!
*UvvUU^Du 2.655243% (2) (0.026552+/−0.001125) 23.605321!
*vv^D^DU^ −6.604573% (2) (−0.066046+/−0.023967) −2.755652!
*vvv^D^^u 8.366095% (2) (0.083661+/−0.000832) 100.586525!
*DUD^UDdU*u^uv −4.315357% (2) (−0.043154+/−0.000000) −inf!
*v^UudD*d^U 1.472076% (2) (0.014721+/−0.000000) inf!
*duUduUvdU^U 2.677615% (2) (0.026776+/−0.000000) inf!
*^DDdu^vv 2.974717% (2) (0.029747+/−0.000000) inf!
*^UDUv^d^d 5.287275% (2) (0.052873+/−0.000000) inf!
**vDudUD^U^ −0.219216% (3) (−0.002192+/−0.000752) −2.913908!
**vDDvUuudv −2.414951% (2) (−0.024150+/−0.006214) −3.886189!
*vuU^D^^U 0.953650% (3) (0.009537+/−0.000939) 10.155524!
*uvu^DdudU −1.228816% (3) (−0.012288+/−0.004688) −2.620942!
**v*^uuvD^ 3.748556% (2) (0.037486+/−0.000000) inf!
*v*u^D^UDU^ −5.994751% (2) (−0.059948+/−0.005259) −11.399701!
*^dDD*uD^*u^ −3.573109% (2) (−0.035731+/−0.000000) −inf!
*dvvUUUuv −2.214962% (2) (−0.022150+/−0.000000) −inf!
*UduddvvvUd* −0.906818% (3) (−0.009068+/−0.001660) −5.464139!
*^D*^dD^dU −1.189488% (3) (−0.011895+/−0.002542) −4.679178!
*U^DddDv*v −0.741075% (2) (−0.007411+/−0.001277) −5.801888!
*v^^^vu −3.517609% (3) (−0.035176+/−0.006819) −5.158254!
*^dvv^u 0.571691% (2) (0.005717+/−0.002393) 2.389007!
**^Dvuvuuu −0.794249% (2) (−0.007942+/−0.001691) −4.696391!
*vddd^UDD 4.762658% (2) (0.047627+/−0.012681) 3.755769!
*^DvU^ddDv 2.409537% (2) (0.024095+/−0.000875) 27.526616!
*^^UvDduuU 2.420405% (3) (0.024204+/−0.001137) 21.293471!
*Uu^^uD^u −0.104557% (2) (−0.001046+/−0.000000) −inf!
*vu^^v^ 2.622358% (3) (0.026224+/−0.004551) 5.761839!
*uDU^DuUDDDdU 3.931283% (2) (0.039313+/−0.012076) 3.255418!
*dDDduvUuUUD −1.736603% (2) (−0.017366+/−0.003689) −4.708052!
*^*v^ud^^U −1.516330% (2) (−0.015163+/−0.005349) −2.834745!
*D^vdUUDDv 3.431868% (2) (0.034319+/−0.006989) 4.910053!

*U^U*UD^dUvU 2.876694% (2) (0.028767+/−0.001177) 24.430796!
*vDuDdv^vv* −5.372884% (3) (−0.053729+/−0.009218) −5.828889!
*^^Ddv*d^ 3.121636% (2) (0.031216+/−0.000000) inf!
*^*dU^uDDUd 1.817511% (2) (0.018175+/−0.001574) 11.545832!
*DdDU^^DUdd 0.335503% (2) (0.003355+/−0.000138) 24.269374!
*^duD^vUdU −0.437999% (2) (−0.004380+/−0.000537) −8.150768!
*U^*^vU*UuDD 4.172775% (4) (0.041728+/−0.012934) 3.226310!
*du*dv^^*Dd −1.509521% (2) (−0.015095+/−0.004182) −3.609703!
*Duu^u^UUd 2.746898% (2) (0.027469+/−0.000000) inf!
**v^^^*vdD −1.229925% (2) (−0.012299+/−0.002591) −4.746482!
*ddUUudUv*DuD −1.801357% (2) (−0.018014+/−0.002211) −8.145878!
*UdUvuDu*uv −2.252326% (2) (−0.022523+/−0.000476) −47.358538!
*DvD^uudv 3.807927% (2) (0.038079+/−0.003345) 11.385272!
*ud^^uUDU^ −1.202591% (2) (−0.012026+/−0.000000) −inf!
*^u^^UD^udu −1.361948% (2) (−0.013619+/−0.000000) −inf!
*vD^dDuvUv 1.950845% (2) (0.019508+/−0.002441) 7.993293!
*Uvu*UUUD^U*D −0.878938% (2) (−0.008789+/−0.000000) −inf!
*dvUUDDuUUv 4.104029% (2) (0.041040+/−0.010219) 4.016188!
**^dudUuu^ −1.129339% (2) (−0.011293+/−0.004454) −2.535649!
*dDv^DDuD*^v −2.302298% (2) (−0.023023+/−0.000000) −inf!
*uDd*ud^vD 3.938223% (5) (0.039382+/−0.002083) 18.904432!
*^uu^v^ −3.103725% (3) (−0.031037+/−0.011283) −2.750895!
*UvDvv^vD 2.267189% (2) (0.022672+/−0.009005) 2.517686!
**d^d^uDuv* −3.158798% (2) (−0.031588+/−0.007873) −4.012196!
*udd^udd*v 1.248827% (3) (0.012488+/−0.001371) 9.110421!
*vUvdv^D^U* −1.141562% (2) (−0.011416+/−0.004084) −2.794966!
*^Ud^UvvD −0.447743% (3) (−0.004477+/−0.000186) −24.051317!
*vuuDUUuUvuU −1.202591% (2) (−0.012026+/−0.000000) −inf!
*DDDvD^D^d*Du −1.318097% (2) (−0.013181+/−0.005622) −2.344635!
*uU^u^^ 1.442772% (3) (0.014428+/−0.001396) 10.333820!
*u^D^uUdvu 2.757479% (2) (0.027575+/−0.000000) inf!
*^vDUvdD*d −4.507483% (2) (−0.045075+/−0.006009) −7.500759!
**d^uDduvu* 1.264455% (2) (0.012645+/−0.000979) 12.913907!
*^UdD^vvUD −6.425382% (3) (−0.064254+/−0.022065) −2.912005!
*^vDdvU^Ud 1.655817% (2) (0.016558+/−0.004623) 3.581531!
*uvvddUddu −1.650858% (2) (−0.016509+/−0.000000) −inf!
*dDu*u^dd^ −0.999109% (2) (−0.009991+/−0.004232) −2.360923!
*DDDUdDu^UvD 3.029221% (2) (0.030292+/−0.006805) 4.451432!
**dd^^uddd −2.231169% (3) (−0.022312+/−0.007867) −2.836201!
*^vvuUvD^ −2.188474% (2) (−0.021885+/−0.003426) −6.387189!
*duUUUvDv 2.515056% (3) (0.025151+/−0.007370) 3.412637!
**vddvuvd −0.497876% (2) (−0.004979+/−0.000000) −inf!
**u*ddDD*uvdv −0.966448% (2) (−0.009664+/−0.003701) −2.611123!
*U^uvuUuDUu −1.241827% (2) (−0.012418+/−0.004779) −2.598325!
*Uu^UvDvDd 6.097568% (2) (0.060976+/−0.000000) inf!
*ddvuv^Du −3.538305% (3) (−0.035383+/−0.006724) −5.262225!
***vD^*DU*^uU −3.336220% (5) (−0.033362+/−0.011183) −2.983338!
*UdvdUd^DU −2.585650% (2) (−0.025856+/−0.005398) −4.789942!
*vvvddD 2.208955% (3) (0.022090+/−0.009139) 2.417029!
*DdDDuvuD^d −1.896597% (2) (−0.018966+/−0.006881) −2.756395!
*UuuUD^DUvDU −2.053780% (2) (−0.020538+/−0.008378) −2.451420!
*UdDUdUvuvu 2.176208% (2) (0.021762+/−0.001427) 15.254161!
*^^DDdUD*^d −2.525671% (4) (−0.025257+/−0.005277) −4.786041!
*uvdu^^ −1.456276% (2) (−0.014563+/−0.000432) −33.727230!
*Uv^vdUDuU −5.396431% (3) (−0.053964+/−0.014954) −3.608755!
*DDd^^vd*u −1.925560% (2) (−0.019256+/−0.007060) −2.727244!
*dvDDDuDuud −1.921562% (3) (−0.019216+/−0.005599) −3.431682!
*vDU*DU^dDv −2.702777% (2) (−0.027028+/−0.003065) −8.817026!
*^U*u^vvd −1.844717% (3) (−0.018447+/−0.005847) −3.154981!
*UDU^^UDvd 1.402327% (2) (0.014023+/−0.005619) 2.495818!
*dudu^DUDuu −0.878324% (2) (−0.008783+/−0.000664) −13.221500!
*Uud^*dud^ −2.331445% (2) (−0.023314+/−0.009738) −2.394137!
*vudv^vdD 5.453501% (2) (0.054535+/−0.015050) 3.623616!
**uvD^d^vuu 5.322645% (2) (0.053226+/−0.009269) 5.742402!
*UDvdDu^du −1.056747% (2) (−0.010567+/−0.001614) −6.547432!
*dvud^duUUD 0.349824% (2) (0.003498+/−0.000000) inf!
*uuDdvDduDu −0.976824% (2) (−0.009768+/−0.002876) −3.396759!
*vUuuvDu^v −0.667026% (2) (−0.006670+/−0.001425) −4.682491!

*uDvdvduu* 1.463570% (2) (0.014636+/−0.005540) 2.641707!

*^u^vDDDDvUD 1.451101% (2) (0.014511+/−0.000000) inf!

*vddvdv*U −4.697801% (2) (−0.046978+/−0.007559) −6.214940!

*vuvUUdUd^dv 3.522625% (2) (0.035226+/−0.004997) 7.049511!

*DvUv*vUUd^ −0.766091% (3) (−0.007661+/−0.002050) −3.736793!

*DuuDv^vD 2.283468% (3) (0.022835+/−0.005203) 4.388777!

*U^uvuvdu 0.783379% (3) (0.007834+/−0.000997) 7.856115!

**uDUu^^vU 1.490966% (2) (0.014910+/−0.001917) 7.778177!

*dU^DU^Ud 3.003093% (2) (0.030031+/−0.012234) 2.454794!

*^d^^uD*d −2.263969% (4) (−0.022640+/−0.002332) −9.709091!

*uuDvduDUUDU 1.834307% (3) (0.018343+/−0.001323) 13.865003!

*^dvv^u 0.571691% (2) (0.005717+/−0.002393) 2.389007!

*^U^Ddu^^ −1.410723% (2) (−0.014107+/−0.000000) −inf!

*^^^^Ud −2.129542% (2) (−0.021295+/−0.005188) −4.104903!

*D^UD^D^ud −2.284309% (2) (−0.022843+/−0.002762) −8.269838!

*d^^UU^vU −2.810738% (2) (−0.028107+/−0.005870) −4.788328!

**v^*DdDvvd 0.985620% (2) (0.009856+/−0.001939) 5.081993!

*dU^vUdUDU −0.893117% (3) (−0.008931+/−0.003010) −2.966728!

*DuuUUUD^^uU −0.878938% (2) (−0.008789+/−0.000000) −inf!

*uDUu^^uDu −1.614278% (2) (−0.016143+/−0.000000) −inf!

*UD*vUU^DDDd −2.365779% (2) (−0.023658+/−0.009425) −2.510232!

*DDDuduDvU*U^ 0.890378% (2) (0.008904+/−0.001882) 4.730144!

*UdDUU*vduv −0.445790% (2) (−0.004458+/−0.000022) −201.551813!

*vdUDUUvv 5.183171% (2) (0.051832+/−0.009072) 5.713144!

*vDdd^vvU 6.636574% (2) (0.066366+/−0.000000) inf!

*U^^u^^ −3.852472% (2) (−0.038525+/−0.002466) −15.621823!

*vv^Uv^Dv 2.872931% (2) (0.028729+/−0.000000) inf!

*dUUdv*vDuD −0.949467% (2) (−0.009495+/−0.003984) −2.383083!

*dU^dd*Dvv 3.158926% (2) (0.031589+/−0.003210) 9.839433!

*uUD^DuUUvD −3.362107% (2) (−0.033621+/−0.000000) −inf!

***vU^dvD^ −2.235420% (4) (−0.022354+/−0.009191) −2.432160!

*^*Ddduvv 1.197905% (4) (0.011979+/−0.000672) 17.821192!

*UDdududUvD −1.985447% (3) (−0.019854+/−0.006520) −3.044938!

*UUd^DUv^^ −1.010926% (2) (−0.010109+/−0.000000) −inf!

*DuUvUvD*^ −2.705762% (3) (−0.027058+/−0.005454) −4.961104!

*Uu*^dvDuvDud −0.293869% (2) (−0.002939+/−0.000000) −inf!

*^u*vDu^u 1.472076% (2) (0.014721+/−0.000000) inf!

*D^U*Du*dudvv −1.238849% (2) (−0.012388+/−0.003067) −4.039881!

*vDDvuvdd −0.400300% (2) (−0.004003+/−0.000000) −inf!

*UdDv^u*DUDUU −1.744845% (2) (−0.017448+/−0.005136) −3.397096!

*dvuDuvdv 4.948027% (2) (0.049480+/−0.000000) inf!

*vdUUUuuduDDD 1.428409% (2) (0.014284+/−0.000422) 33.883827!

*^UduUd^v −1.471225% (2) (−0.014712+/−0.000000) −inf!

*u^du*UdUuU^ 1.420111% (3) (0.014201+/−0.005931) 2.394497!

**DuvDuvvUU 1.899934% (3) (0.018999+/−0.008031) 2.365690!

*uD*^DvU*d*^UU −2.285909% (2) (−0.022859+/−0.000000) −inf!

*d*DDUuDD^D^D 1.565679% (2) (0.015657+/−0.000707) 22.132863!

*uudvuDDuv 2.981181% (3) (0.029812+/−0.002498) 11.936300!

*d*d^u^duud 1.220289% (2) (0.012203+/−0.002584) 4.722238!

*Uvv*Udd*d^v −1.600376% (2) (−0.016004+/−0.002730) −5.862667!

*DDU^*duud*^UD 4.551495% (2) (0.045515+/−0.012901) 3.527950!

**ud^UDvv 5.381691% (2) (0.053817+/−0.007010) 7.676979!

*DUu*^DDDvD*v −3.542035% (2) (−0.035420+/−0.004944) −7.163593!

*u^UD^DuUUd 0.636555% (2) (0.006366+/−0.000879) 7.243575!

*UuvDDDD^vv 2.498838% (2) (0.024988+/−0.000000) inf!

*uDDUUDudud^uU 0.325946% (2) (0.003259+/−0.000000) inf!

*^^DuvUuD*d^ −1.029332% (2) (−0.010293+/−0.002411) −4.269488!

*UDduvDUDDv*v 5.644570% (2) (0.056446+/−0.006341) 8.901428!

*DUvdU^UdD* −0.834525% (2) (−0.008345+/−0.002839) −2.939230!

*dDU^v*uD^ 2.504556% (3) (0.025046+/−0.007619) 3.287381!

*DU^uUD^v −6.371173% (2) (−0.063712+/−0.005419) −11.757976!

*U^uvvuD^d 5.528903% (2) (0.055289+/−0.000000) inf!

*uUuUuvuU*d^ −0.248182% (2) (−0.002482+/−0.000225) −11.037228!

*vdUUdU^v 1.709215% (2) (0.017092+/−0.004758) 3.592579!

**UvDud^^D −0.621116% (2) (−0.006211+/−0.000000) −inf!

*v^DDUdvDUUD 3.947375% (2) (0.039474+/−0.000000) inf!

*^DdduD^D −1.761382% (4) (−0.017614+/−0.003959) −4.449192!

*uDUdUd^vud 0.977315% (2) (0.009773+/−0.000000) inf!

*^^vvD*D^u 1.470717% (2) (0.014707+/−0.004544) 3.236762!

*vvdDU^D^ −2.775463% (2) (−0.027755+/−0.007445) −3.728077!
D^UuddDuv 2.320109% (2) (0.023201+/−0.000000) inf!
*dUuvdU*vv 3.355428% (2) (0.033554+/−0.013048) 2.571559!
*UvUuUvvUDDu −1.128567% (3) (−0.011286+/−0.000074) −152.161208!
*^vUdDddd 1.681610% (2) (0.016816+/−0.000000) inf!
*UDv*U^^Dv 3.832434% (3) (0.038324+/−0.012402) 3.090251!
*UU^^vUDdUD −5.433448% (3) (−0.054334+/−0.022512) −2.413608!
*DvDu^uu*^ 2.154098% (4) (0.021541+/−0.001319) 16.328536!
*dDddduuUvu 1.797505% (2) (0.017975+/−0.000000) inf!
*DvdUdvD^ 2.191003% (3) (0.021910+/−0.008557) 2.560502!
*uv^Ud^uU 1.150041% (2) (0.011500+/−0.004828) 2.382213!
*DvDduvuuvd −6.267158% (2) (−0.062672+/−0.000000) −inf!
*vuDvu^DDU −4.296753% (2) (−0.042968+/−0.007769) −5.530597!
*^D^Uu^Uvuv 1.507352% (2) (0.015074+/−0.000000) inf!
*^D^vUuDDDUUu^ −0.849647% (2) (−0.008496+/−0.000000) −inf!
*Uu^^^v −3.434289% (2) (−0.034343+/−0.001313) −26.151261!
*dUuDDduDd*d*^ 3.211085% (2) (0.032111+/−0.006172) 5.202587!
*uUd^^u*vU 4.697343% (2) (0.046973+/−0.000000) inf!
*^^u^DU*v 3.993213% (2) (0.039932+/−0.015079) 2.648227!
*DuDUDddvDDUuv 0.066891% (2) (0.000669+/−0.000000) inf!
*dvDdDvdu* −3.828368% (2) (−0.038284+/−0.000129) −297.304756!
*^^UU^vU^DU 9.617016% (3) (0.096170+/−0.033704) 2.853372!
*dd^dduUv −0.618555% (3) (−0.006186+/−0.001114) −5.554123!
*^UduDUdv^ 2.795572% (2) (0.027956+/−0.011279) 2.478483!
*d^UdvudD −2.682268% (2) (−0.026823+/−0.006343) −4.228502!
*dUUUDd^^Dd −3.298433% (2) (−0.032984+/−0.007887) −4.182128!
*UvvuDdUuD 0.697191% (3) (0.006972+/−0.001685) 4.138501!
*D^DduvuUd 1.338399% (2) (0.013384+/−0.005283) 2.533263!
*u^dDvdvD 4.149029% (2) (0.041490+/−0.017213) 2.410454!
*UUD^u^dvu 2.757479% (2) (0.027575+/−0.000000) inf!
**uu^Dddvdd 1.754092% (2) (0.017541+/−0.000190) 92.222504!
*dDdUD*vdv^U −1.072299% (2) (−0.010723+/−0.000000) −inf!
*v^dvDv*u 4.712254% (2) (0.047123+/−0.005393) 8.737620!
*UvdUuDv^D −1.329054% (2) (−0.013291+/−0.005291) −2.511704!
*uuu*D^UD^ 2.381587% (2) (0.023816+/−0.009460) 2.517621!
*u^UuD^d^ −2.388862% (3) (−0.023889+/−0.007898) −3.024720!
*UdUUv*u**^UD^ 1.094527% (2) (0.010945+/−0.000000) inf!
*ddDd^*Uuv 2.686003% (3) (0.026860+/−0.003727) 7.206756!
*^vDDd*vvvD −6.482636% (2) (−0.064826+/−0.000000) −inf!
*uDd^uUUdDU 3.851459% (2) (0.038515+/−0.012001) 3.209192!
*vDDu^U*UvDdu 2.141828% (2) (0.021418+/−0.000000) inf!
*D^DdDvd^DU −1.269561% (2) (−0.012696+/−0.001368) −9.278064!
*dvUvUd*Du^ −0.910573% (2) (−0.009106+/−0.000721) −12.631823!
*vvvddv 2.208955% (3) (0.022090+/−0.009139) 2.417029!
*vuuddd^u −2.569026% (2) (−0.025690+/−0.002971) −8.647844!
*dD^dd*uDdv 1.761455% (2) (0.017615+/−0.006955) 2.532549!
*vvDddvuv 6.646702% (2) (0.066467+/−0.002367) 28.084470!
*DUUddDv*vu*D 1.788824% (2) (0.017888+/−0.001260) 14.195003!
*vddUuv*vvd −3.880725% (2) (−0.038807+/−0.012700) −3.055803!
*vuU^vv*duU −3.253101% (3) (−0.032531+/−0.012175) −2.671924!
*d*vdD^UUdU 1.131986% (2) (0.011320+/−0.002560) 4.422345!
*^U^u^^ −3.852472% (2) (−0.038525+/−0.002466) −15.621823!
*UUvvvDDDU 10.110786% (3) (0.101108+/−0.033425) 3.024905!
*DdUU*d^^^ −1.908885% (3) (−0.019089+/−0.005752) −3.318520!
*Ud^dUddvv* 5.184742% (2) (0.051847+/−0.019235) 2.695532!
*vDu*^*dduvU 4.015636% (3) (0.040156+/−0.009520) 4.217956!
**uU^UdDU^^ −1.595868% (2) (−0.015959+/−0.002233) −7.147401!
*UddvUudU*D^ 1.165290% (2) (0.011653+/−0.000000) inf!
*DUvuD^DDUvv −1.775954% (2) (−0.017760+/−0.000000) −inf!
**UUv^^DdDuDDD 2.248877% (2) (0.022489+/−0.000000) inf!
*v^DDdu^*v 3.279022% (3) (0.032790+/−0.005271) 6.221199!
*v^^Dd*Uvd −0.854699% (2) (−0.008547+/−0.000000) −inf!
*^dDuddvv 3.492703% (2) (0.034927+/−0.000000) inf!
*uDU^ddUvU^ 2.109182% (2) (0.021092+/−0.000000) inf!
*^*D^vdv^U 5.246083% (3) (0.052461+/−0.006370) 8.235254!
*d^*^DDuU^ −1.410723% (2) (−0.014107+/−0.000000) −inf!
*UvDUvdD^v −4.548445% (4) (−0.045484+/−0.013666) −3.328276!
*u^uDU^*vDD 1.239427% (2) (0.012394+/−0.004150) 2.986475!
*U*UvUDDdvu^ −5.758996% (2) (−0.057590+/−0.008687) −6.629074!

*vDuUD^Ddu 2.547127% (3) (0.025471+/−0.003435) 7.415307!

*Dvud^UDv −0.982301% (2) (−0.009823+/−0.002168) −4.530802!

*Dv^UdD^Dv^DD 8.728192% (2) (0.087282+/− 0.010298) 8.475473!

*UDDvdDuUDU*u 1.376112% (3) (0.013761+/− 0.000504) 27.299951!

**vD^d^D^Uv −1.032435% (2) (−0.010324+/−0.004369) −2.362835!

*DvdvU^vuv^ −1.984406% (2) (−0.019844+/−0.000000) −inf!

*v^vddddu 2.827789% (2) (0.028278+/−0.009506) 2.974591!

*Ud^uU*^ud 1.050415% (3) (0.010504+/−0.003922) 2.678298!

*^^vdUdUU 0.851549% (2) (0.008515+/−0.001932) 4.407385!

*dUvDv^^^ 0.760678% (2) (0.007607+/−0.002272) 3.347533!

*v^dD^DdDu 4.027456% (2) (0.040275+/−0.000000) inf!

*uD^DvuvUv 2.069790% (2) (0.020698+/−0.001814) 11.408995!

*^v^vUUd*d^ 2.601979% (3) (0.026020+/−0.008501) 3.060777!

*U^vU*uuUv −5.527835% (2) (−0.055278+/−0.013893) −3.978869!

*^uDDdUUD^d 1.725016% (2) (0.017250+/−0.004244) 4.064809!

*vd^duvdu −0.877955% (2) (−0.008780+/−0.002371) −3.702505!

*^uuDUv^d 2.507236% (3) (0.025072+/−0.007443) 3.368765!

*uvU^UD^^^*DD 0.284313% (2) (0.002843+/−0.000000) inf!

*u^^v^v −6.183409% (3) (−0.061834+/−0.009074) −6.814361!

*vdd^uDuuD 1.601090% (2) (0.016011+/−0.003168) 5.053836!

*Uvv^DvUv^ −5.022306% (2) (−0.050223+/−0.000593) −84.627276!

*uvuUUvUvd 0.567719% (2) (0.005677+/−0.000000) inf!

*uvD*DdDUUDUu 1.614049% (3) (0.016140+/− 0.002904) 5.557235!

*^Dv^^*du* 1.049954% (3) (0.010500+/−0.004503) 2.331853!

*Du^DuUvdD* 1.383265% (2) (0.013833+/−0.000000) inf!

*^dvv^u 0.571691% (2) (0.005717+/−0.002393) 2.389007!

*U^^D*vvUD −1.286781% (3) (−0.012868+/−0.001451) −8.870639!

*^dddv^DU* −1.956793% (2) (−0.019568+/−0.000000) −inf!

*vvd^ud −2.140292% (4) (−0.021403+/−0.008003) −2.674307!

*dvUUDDDUv*Du −3.969652% (2) (−0.039697+/− 0.005754) −6.898515!

*d^uUvDUU^ −1.410723% (2) (−0.014107+/−0.000000) −inf!

*UuUvduDu^U 1.502181% (2) (0.015022+/−0.001101) 13.641566!

**DvUuvdud −3.174401% (3) (−0.031744+/−0.009786) −3.243752!

*Dv^uDUDUdv 2.235854% (2) (0.022359+/−0.007925) 2.821404!

*uuUvdvUduU −0.395014% (3) (−0.003950+/− 0.000136) −29.048681!

*u^^^vd −0.399682% (2) (−0.003997+/−0.000000) −inf!

**uD^UvuD^D −1.251418% (2) (−0.012514+/− 0.005161) −2.424585!

*uUu^dU*vD −0.456257% (2) (−0.004563+/−0.000834) −5.468231!

*D^UuDUduUUDD −0.182821% (2) (−0.001828+/− 0.000561) −3.260644!

*UuU^DUvvUv −1.577273% (3) (−0.015773+/− 0.003612) −4.366289!

*uvUuvUDuU*^ −3.766482% (2) (−0.037665+/− 0.007401) −5.089471!

*^uD^DUvUUd 3.698593% (2) (0.036986+/−0.000000) inf!

**uu^DDUvdu −1.587688% (2) (−0.015877+/−0.006614) −2.400470!

*dUuvd^^v 3.590994% (2) (0.035910+/−0.015484) 2.319139!

*DD^u^DuvU 3.586209% (2) (0.035862+/−0.014918) 2.403958!

*vddDdDU^*^ −3.503945% (2) (−0.035039+/−0.003573) −9.807545!

**D^Ud*u^D*^DU −1.436811% (2) (−0.014368+/− 0.005393) −2.664063!

*D^UU^uDuDUU 2.380803% (3) (0.023808+/− 0.004661) 5.107457!

*UU^^vdD*v 10.867127% (2) (0.108671+/−0.029817) 3.644661!

*u*Uv^u^UD 0.905656% (2) (0.009057+/−0.002260) 4.007776!

*vu^Ddd^d* −2.173862% (2) (−0.021739+/−0.006120) −3.552328!

*vDvDUvDvDv 2.354896% (2) (0.023549+/−0.000000) inf!

*dD^Dvu*uD 1.793177% (2) (0.017932+/−0.003787) 4.735627!

*^Uvvdu^d −3.090615% (2) (−0.030906+/−0.002347) −13.170033!

*UddvU^^u −1.537565% (2) (−0.015376+/−0.005296) −2.903257!

*vDDDuu*uUudu −0.229445% (2) (−0.002294+/− 0.000886) −2.589471!

*^UDDvuuD 3.314865% (4) (0.033149+/−0.009621) 3.445543!

*ddvuuuddDUU −1.867640% (2) (−0.018676+/− 0.002966) −6.296283!

*uu*dUdDu^Dv 3.357859% (2) (0.033579+/−0.002499) 13.435764!

*UDd^vd^D −0.543067% (2) (−0.005431+/−0.002297) −2.364525!

*u^DdduuUuu 1.700478% (3) (0.017005+/−0.003718) 4.573795!

*D*vU^vvDu 1.840681% (3) (0.018407+/−0.006091) 3.021795!

*^U^Duvud −3.241529% (2) (−0.032415+/−0.011896) −2.724917!

*uu^d^uDdv −2.852999% (2) (−0.028530+/−0.000000) −inf!

*D*UuD^^DD^ 1.142038% (2) (0.011420+/−0.000271) 42.094921!

*dU^UuvvDu 1.731267% (2) (0.017313+/−0.003660) 4.730617!

*^*vDDU^dD 0.655636% (3) (0.006556+/−0.000377) 17.371055!

The invention claimed is:

1. A method for monitoring and event-triggering reporting regarding a dynamic system containing aggregated data, wherein said aggregated data are analyzed without a priori postulation as to which data, thresholds, trends or patterns will prove important, comprising: a) randomly generating i) at least two charts; or ii) at least two thresholds pertaining to a single chart, wherein each of said thresholds and said charts is a collection of one or more data field definitions in which a datum from a database is defined as to registration (presence or absence) of nominal data or as to threshold quantity or rate of change of quantifiable data without requiring any specific data field definition; as to at least two real-world events in a dynamic system, completely without postulating as to significance of said charts or said thresholds and chart prior to their random generation; b) providing input including data of said real-world events, together with said charts or said thresholds and chart, to analytical software capable of describing said input in dataset reflecting said at least two events without a priori postulation as to which data, thresholds, trends or patterns will prove important; c) calculating, using said analytical software, any coordination between said at least two events and said charts or said thresholds and chart, to identify, without a priori postulation of what any pattern present might be, whether a trend or a pattern is present relevant to said charts or said thresholds and chart; and d) providing an output to a user in a precipitated, triggering way regarding any identification of said trend or said pattern if present to create either a real world transformational triggering event or the absence of a real world transformational triggering event when no trend or pattern has been identified.

2. The method for monitoring according to claim 1 wherein said chart includes at least three parameters measured over at least four consecutive repeating time units.

3. The method for monitoring according to claim 1 wherein said chart includes at least four parameters measured over at least five consecutive repeating time units.

4. The method for monitoring according to claim 1 wherein said output to a user includes an alarm or event which invites the participation of a human intellect.

5. A method of identifying, by random hypothesis generation without a priori postulation as to which data, thresholds, trends or patterns will prove important, whether a trend or pattern is present in data and creating a triggering event when so, consisting essentially of:

a) designing a database comprising any collection of data pertaining to any system, wherein said data is neither limited to time lapse nor non-time lapse data, and generating a hypothesis describing a pattern or trend if present, further randomly generating said hypothesis by randomly generating i) at least two charts; or ii) at least two thresholds pertaining to a single chart, wherein each of said thresholds and said charts is a collection of one or more data field definitions in which a datum from said database is defined selected from the group consisting of the value of nominal data, threshold quantity of quantifiable data, and rate of change of quantifiable data as to at least two real-world events without a priori postulation as to which data, thresholds, trends or patterns will prove important;

b) providing both said database and said charts or said thresholds and chart to analytical software;

c) calculating, using said analytical software, whether said generated hypothesis has identified any actual trend or any actual pattern in said data; and d) providing an output to a user in a precipitated, triggering way regarding any identification of a trend or pattern if present to create either a real world transformational triggering event or an absence of any real world transformational triggering event when no trend or pattern has been identified.

* * * * *